United States Patent [19]

Hardy

[11] Patent Number: 4,584,639

[45] Date of Patent: Apr. 22, 1986

[54] COMPUTER SECURITY SYSTEM

[75] Inventor: Norman Hardy, Portola Valley, Calif.

[73] Assignee: Key Logic, Inc., Cupertino, Calif.

[21] Appl. No.: 565,194

[22] Filed: Dec. 23, 1983

[51] Int. Cl.$^4$ .............................................. G06F 1/00
[52] U.S. Cl. .................................................. 364/200
[58] Field of Search ........................ 364/200 MS File

[56] References Cited

U.S. PATENT DOCUMENTS

| | | | |
|---|---|---|---|
| 4,433,392 | 2/1984 | Beaven | 364/200 X |
| 4,439,830 | 3/1984 | Chueh | 364/200 |
| 4,456,952 | 6/1984 | Mohrman et al. | 364/200 |

OTHER PUBLICATIONS

Levy, H. M., "Capability-Based Computer Systems", Digital Press, 1984.
Rajunas et al., "Preliminary Security Review of Gnosis: A Capability-Based Operating System", *Mitre Report*, Aug. 1980.
TymShare, Inc., "Proceedings of Share 52", vol. 1, Mar. 1979.

*Primary Examiner*—Raulfe B. Zache
*Attorney, Agent, or Firm*—Flehr, Hohbach, Test, Albritton & Herbert

[57] ABSTRACT

A capability based computer system includes means, called a factory, for allowing two domains to share resources in a secure manner. Factories are special domains which, in combination with corresponding kernel functions, allow a first domain (called a builder domain) to install a program and other components in a factory for use by other domains, and then to seal the factory, thereby leaving the builder domain with no keys to the factory except a special type of entry key called a requestor key.

The holders of requestor keys can use the program in the factory by invoking the requestor key. This causes the factory to set up a new special domain for the requestor which allows the requestor to use the program in the factory to process data without being able to inspect the program. Further, the factory mechanism includes means for the requestor to confirm that the factory includes no keys which could compromise the confidentiality of the requestor's data.

A second aspect of the present invention is the ability to provide different memory fault resolution mechanisms (called segment keeper domains) for different memory segments.

39 Claims, 36 Drawing Figures

SYSTEM CONFIGURATION

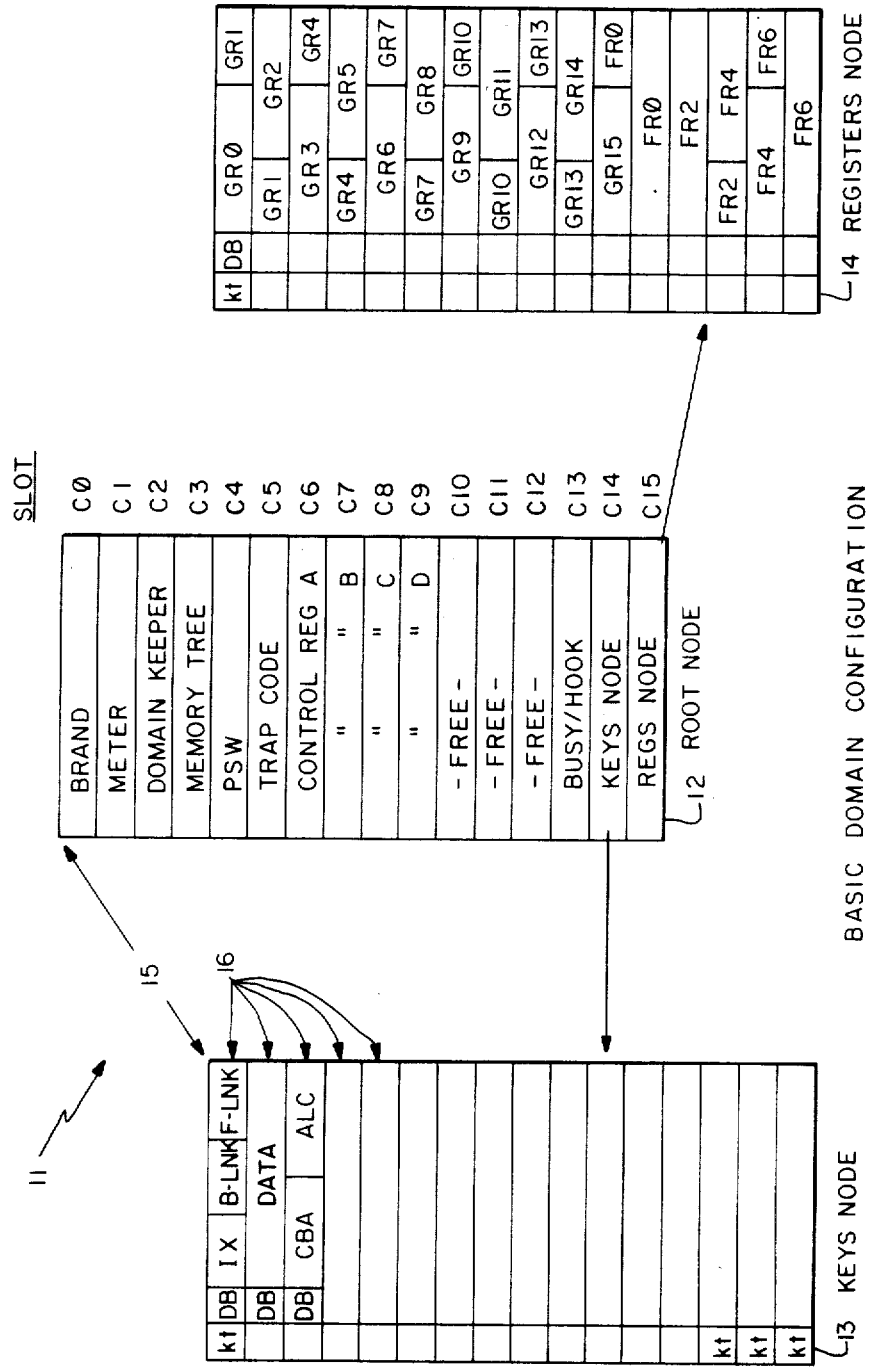
FIG.—1 BASIC DOMAIN CONFIGURATION

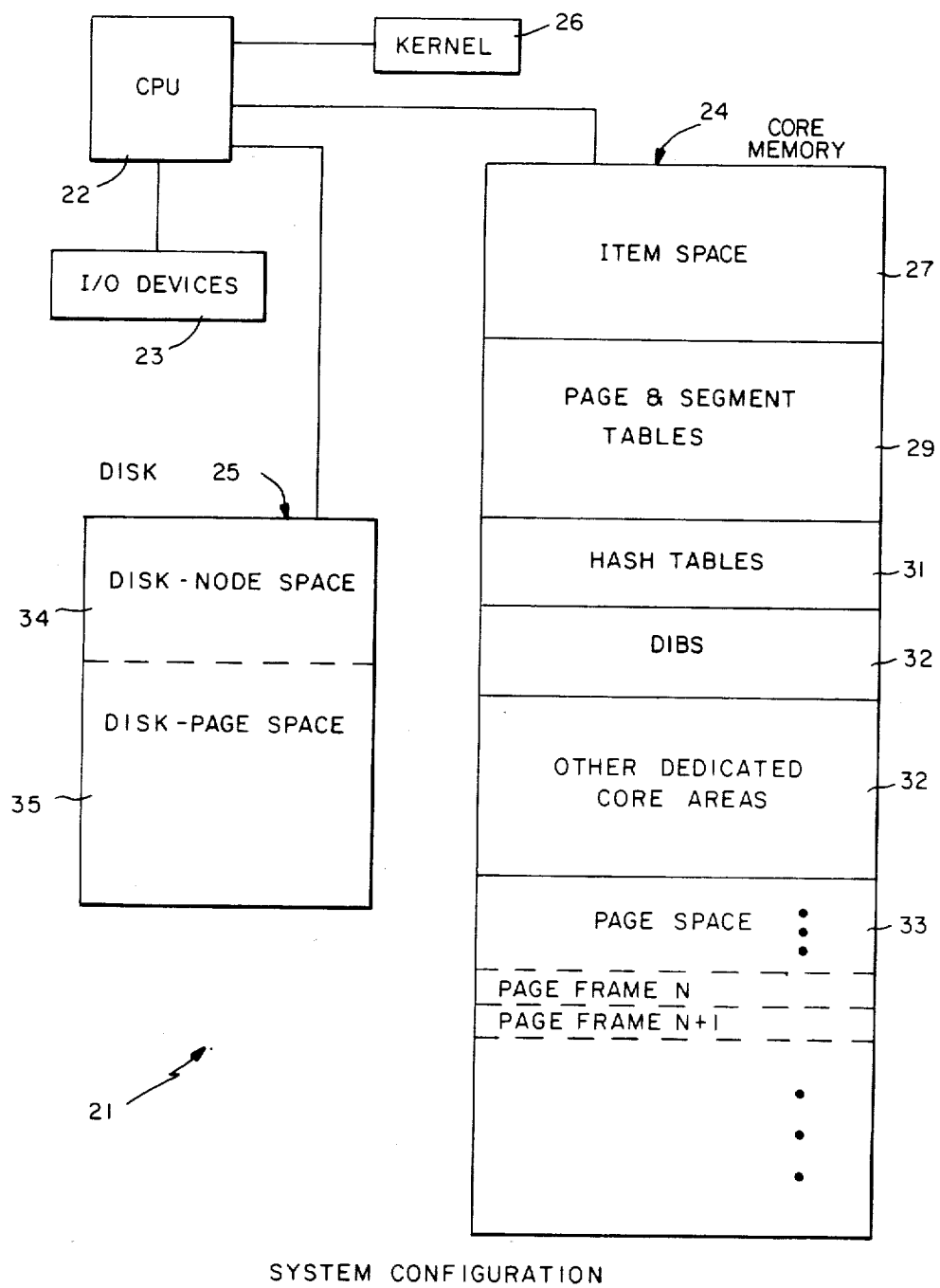
SYSTEM CONFIGURATION
FIG.—2a

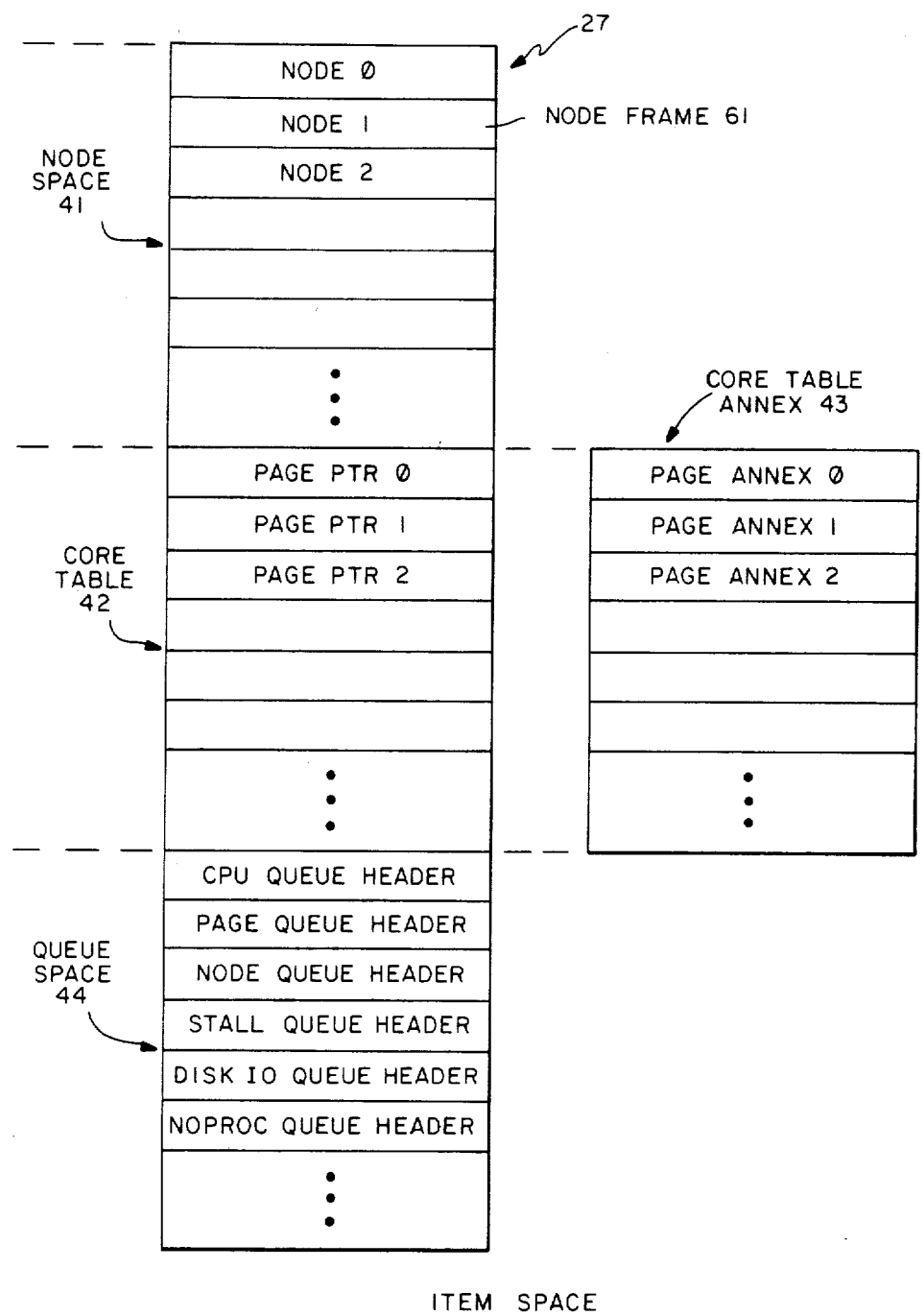
FIG.—2b

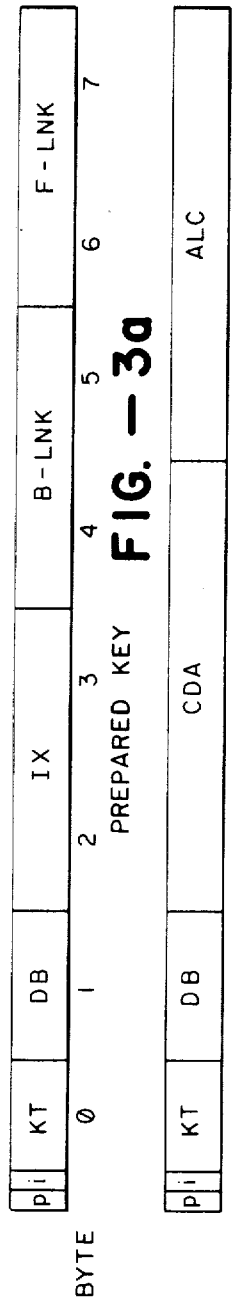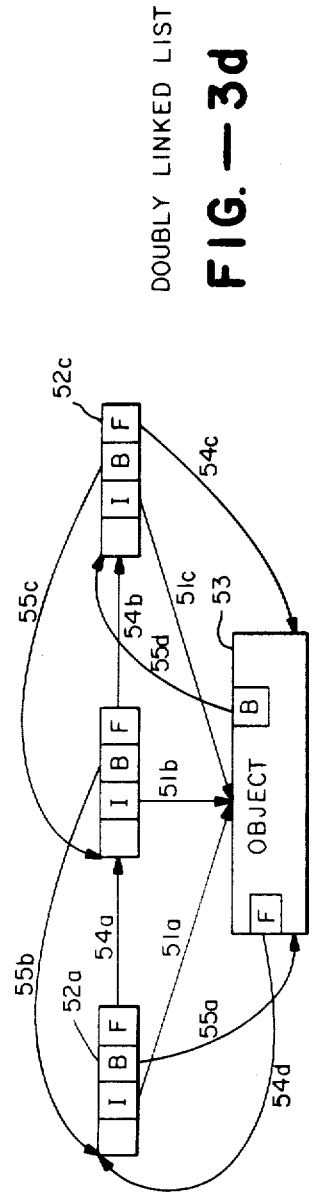

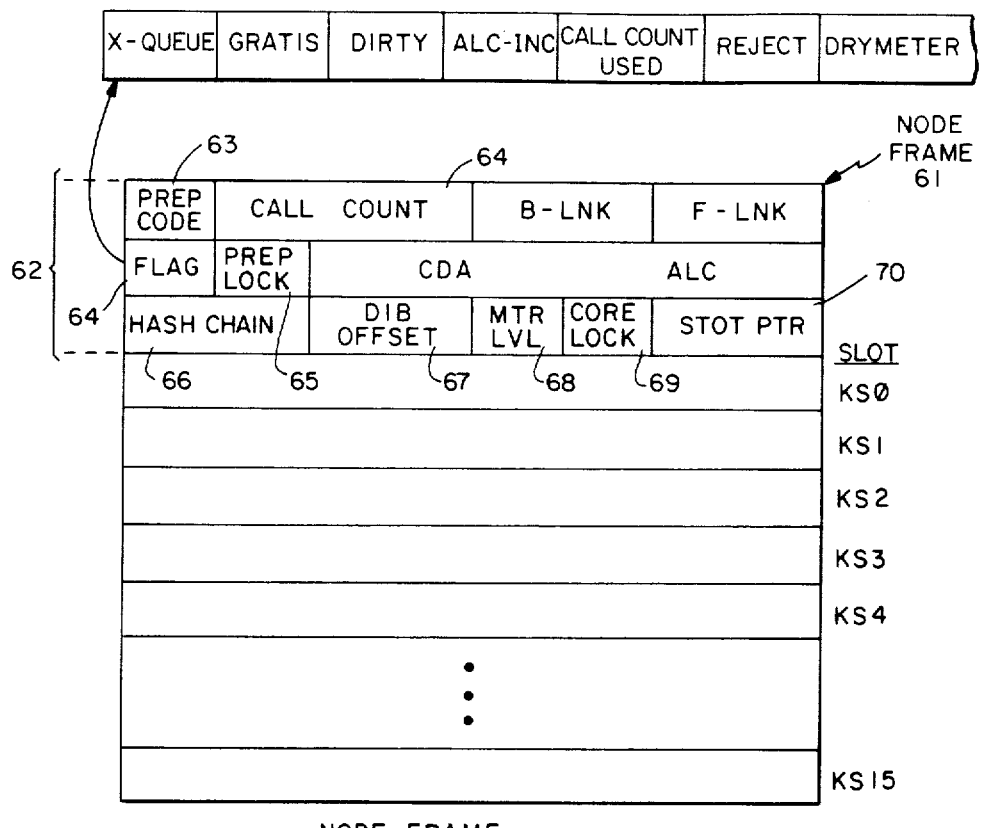
FIG.—4a
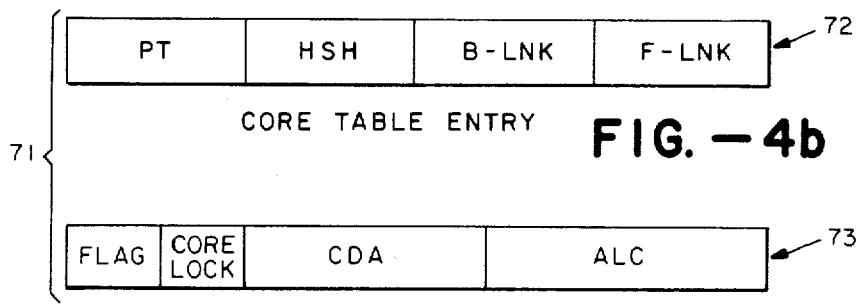
FIG.—4b
FIG.—4c
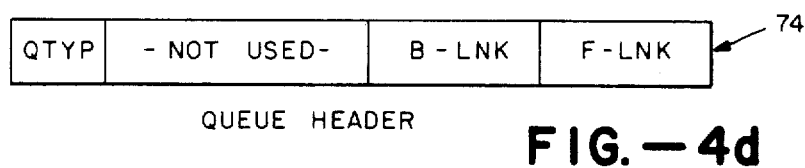
FIG.—4d

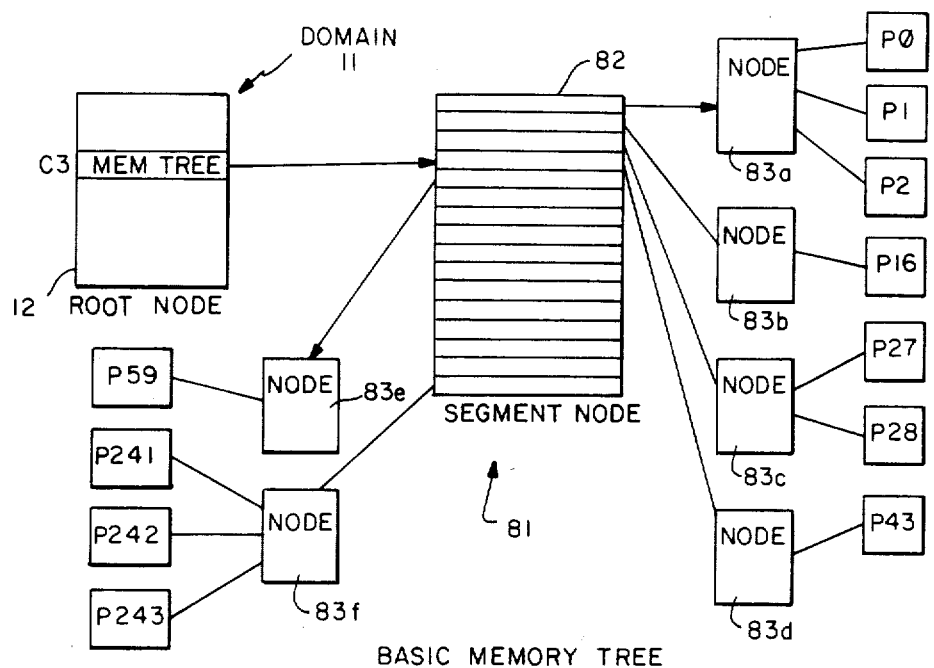
FIG.—5a BASIC MEMORY TREE
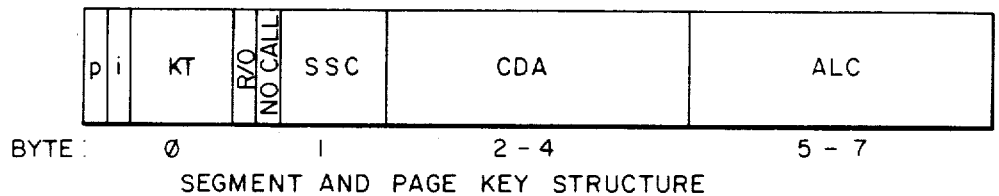
FIG.—5b SEGMENT AND PAGE KEY STRUCTURE
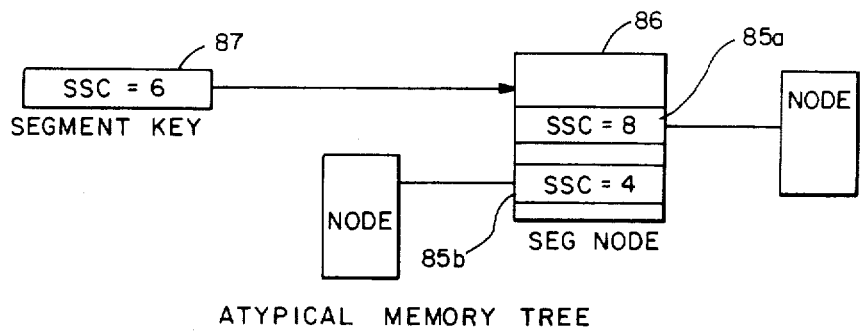
FIG.—5c ATYPICAL MEMORY TREE

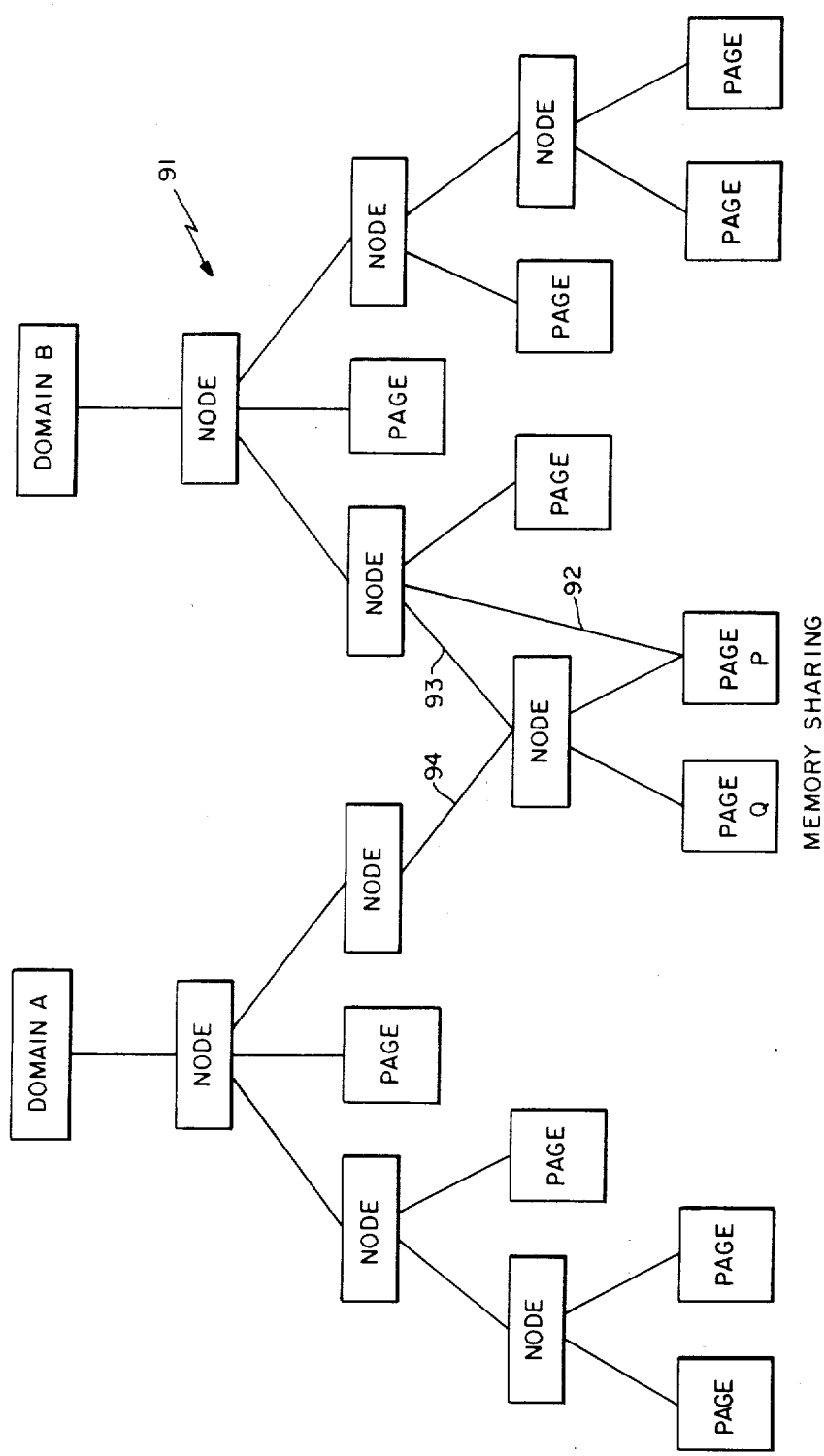
FIG.—5d

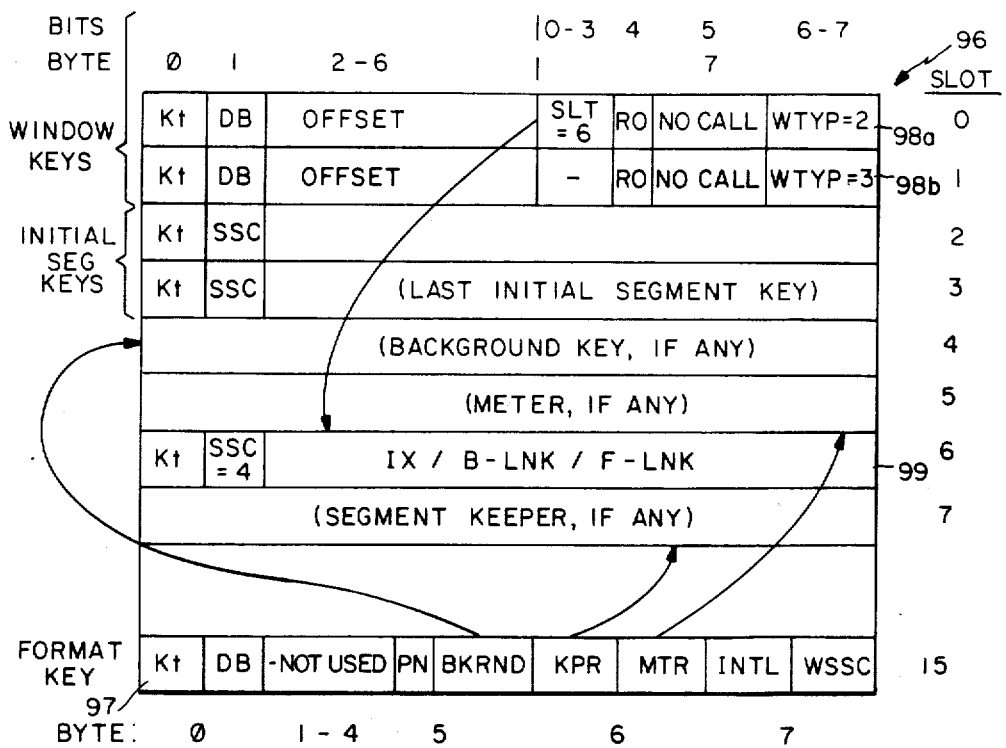
FIG.—5e  RED SEGMENT NODE
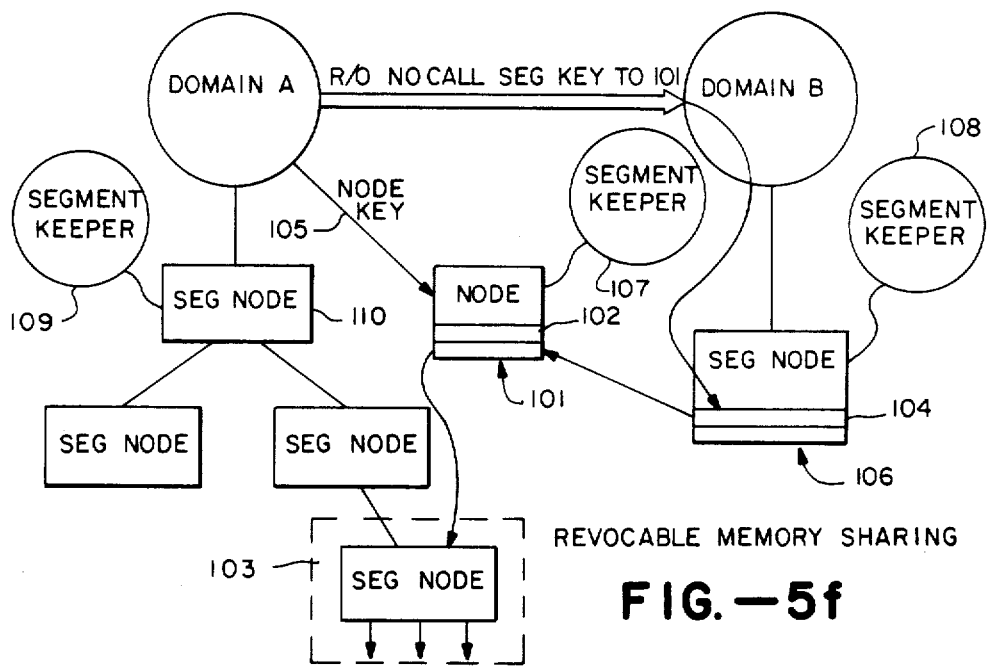
FIG.—5f  REVOCABLE MEMORY SHARING

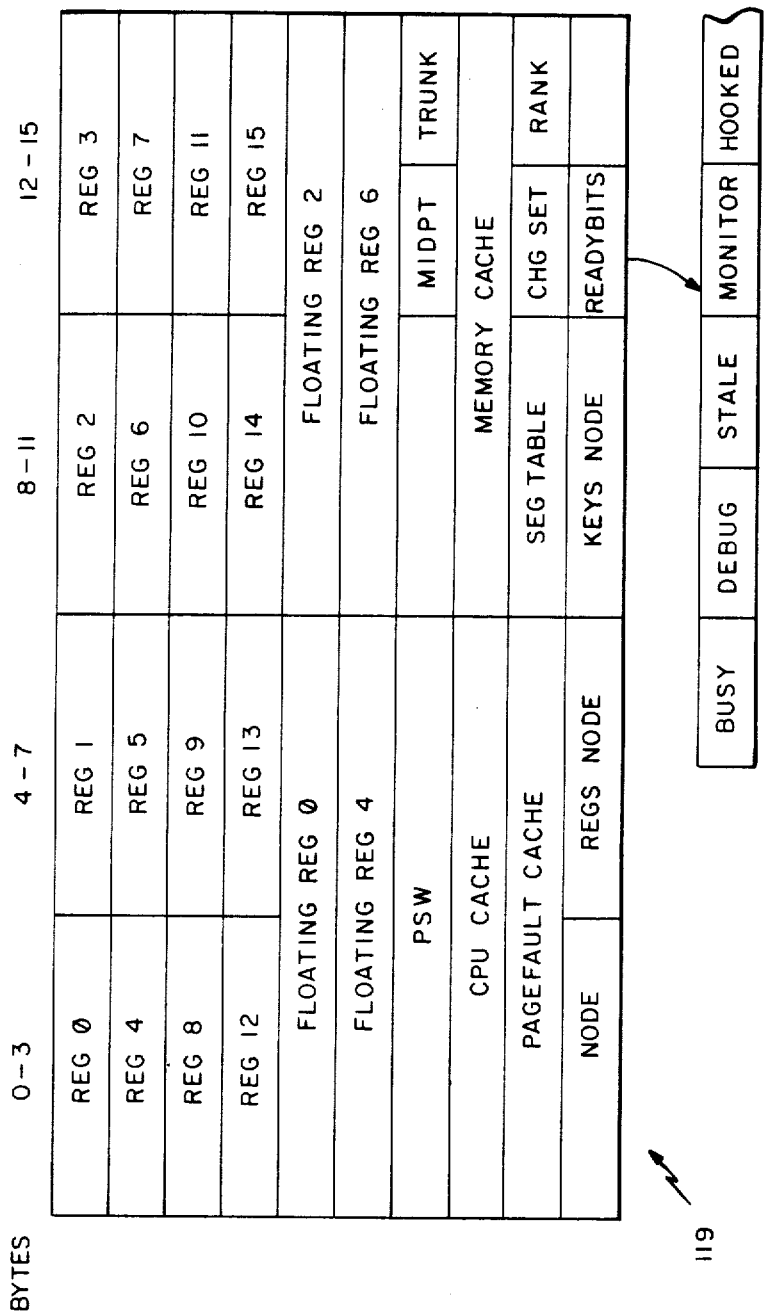
FIG.—6

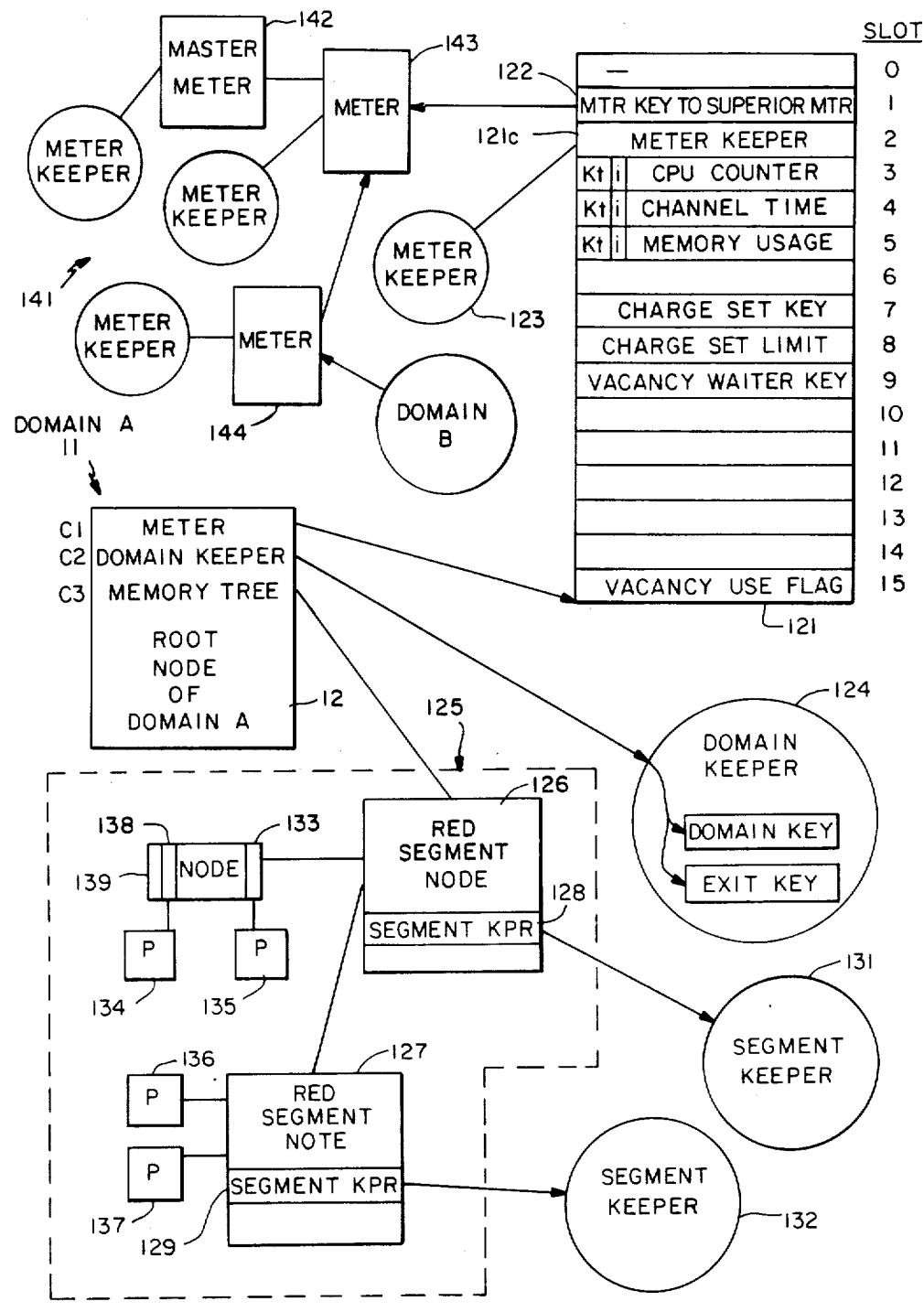
DOMAIN AND ITS KEEPERS
FIG. —7

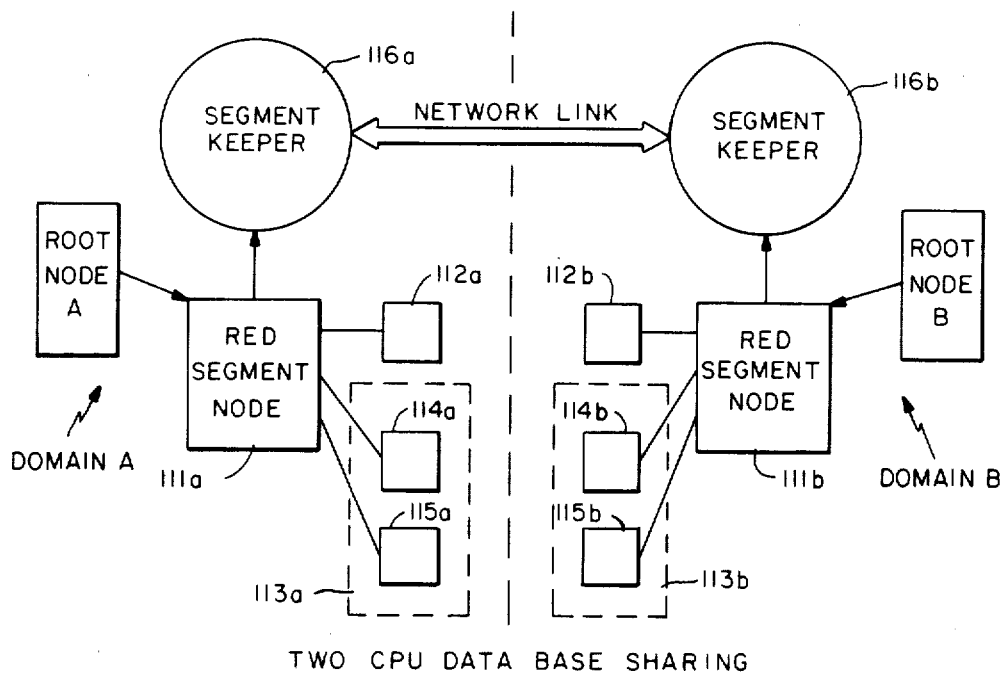
TWO CPU DATA BASE SHARING
FIG. —8a
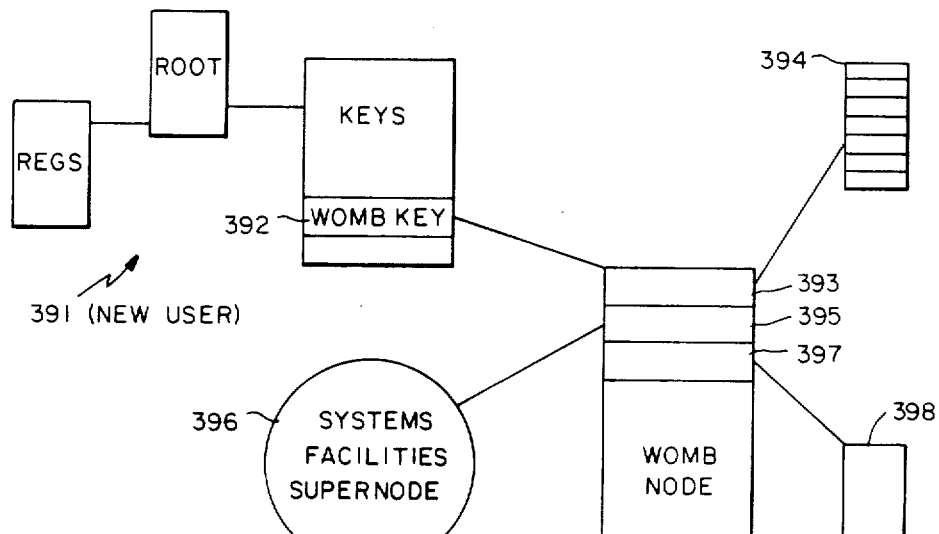
WOMB KEY AND SUPERNODE
FIG. —12

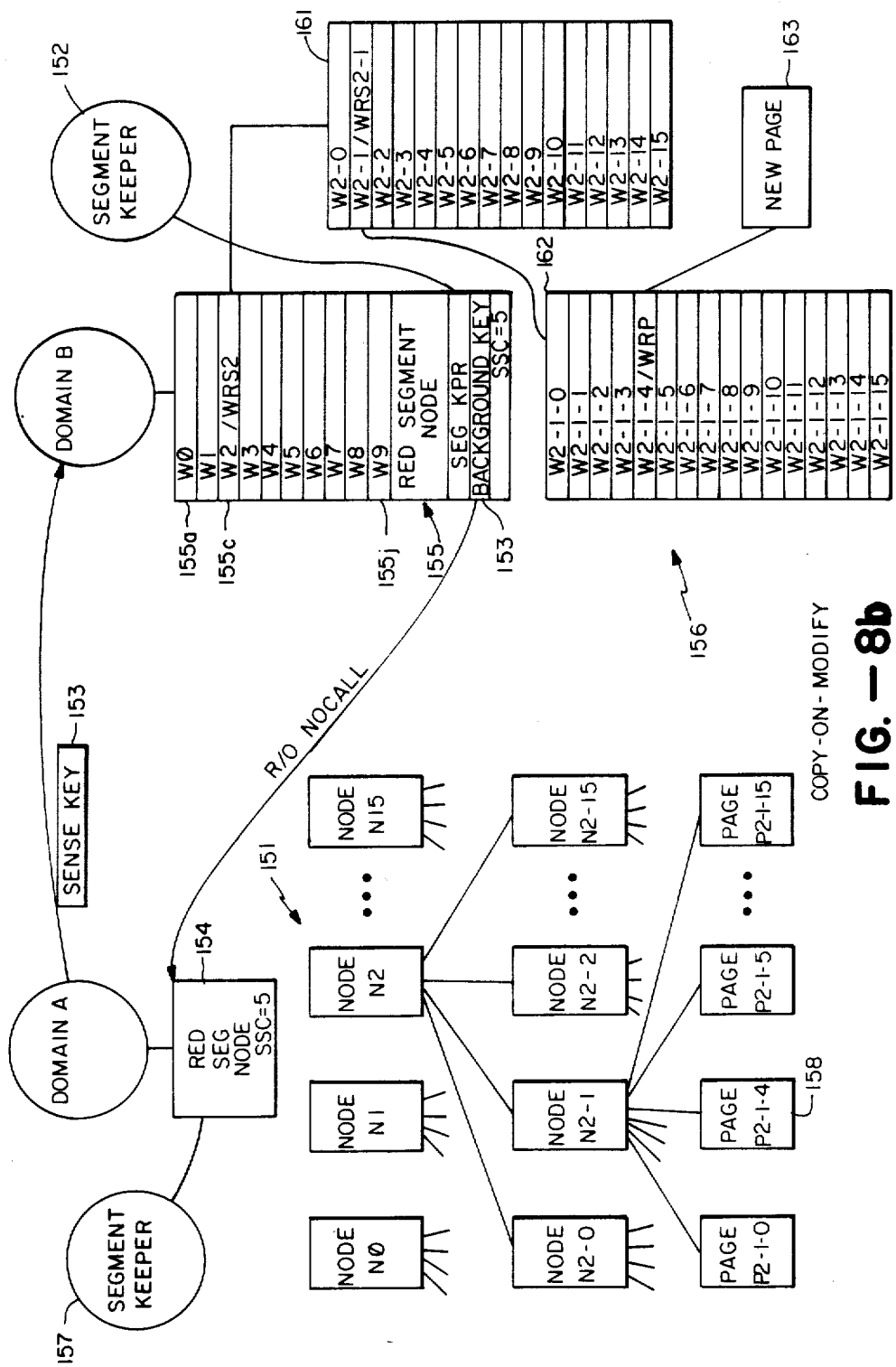
FIG.—8b

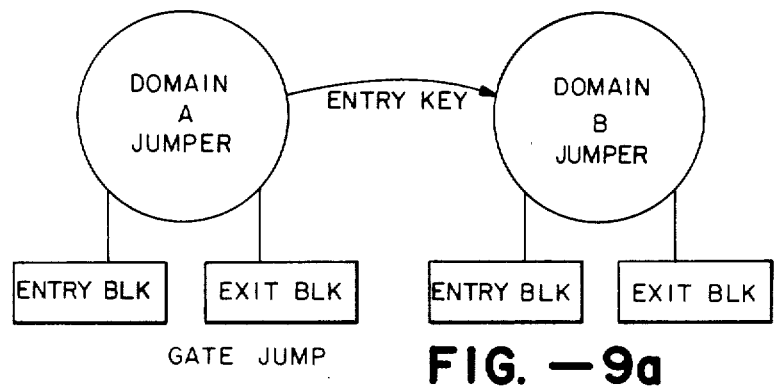
GATE JUMP FIG. —9a
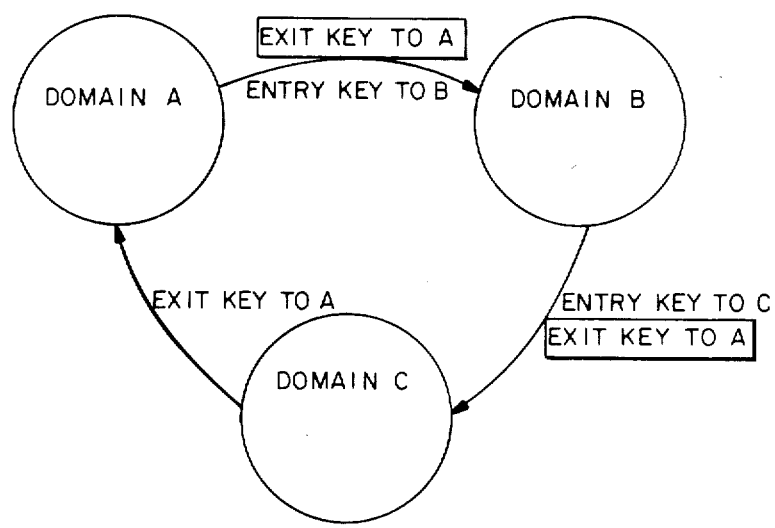
GATE JUMP WITH INDIRECT RETURN FIG. -9b
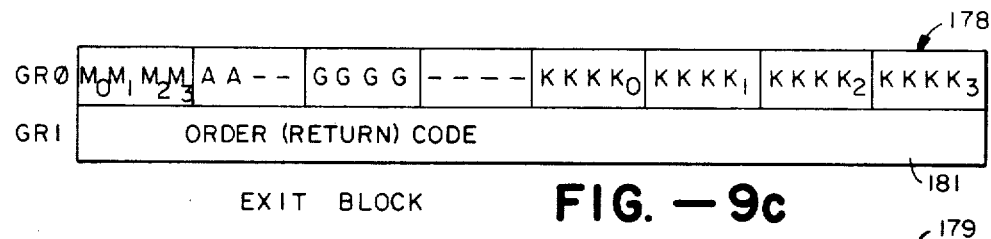
EXIT BLOCK FIG. —9c
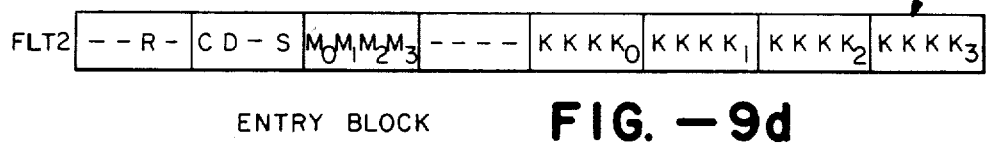
ENTRY BLOCK FIG. —9d

DOMAIN CREATOR

DOMAIN CREATOR CREATOR

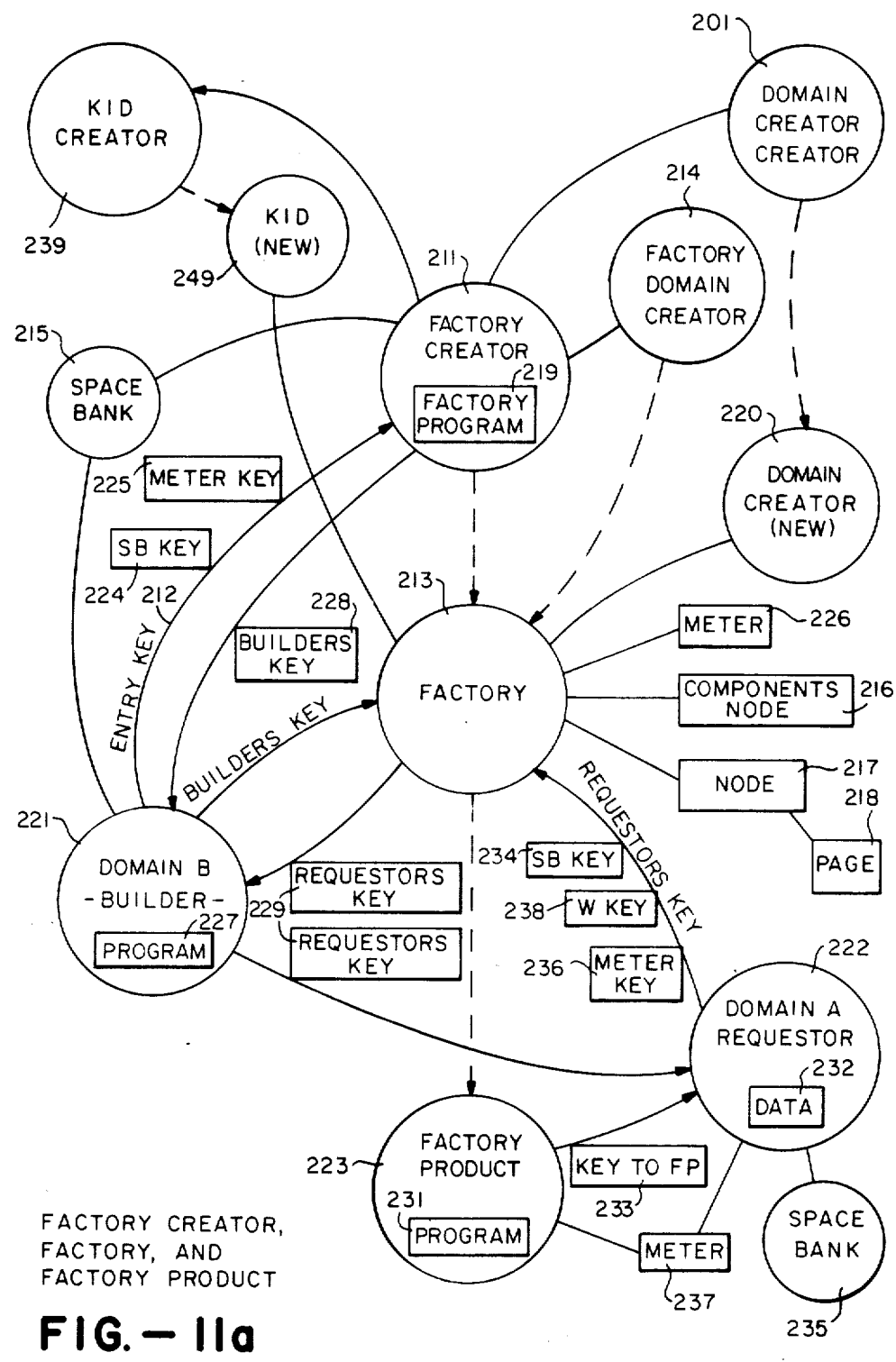
FACTORY CREATOR,
FACTORY, AND
FACTORY PRODUCT
FIG.—11a

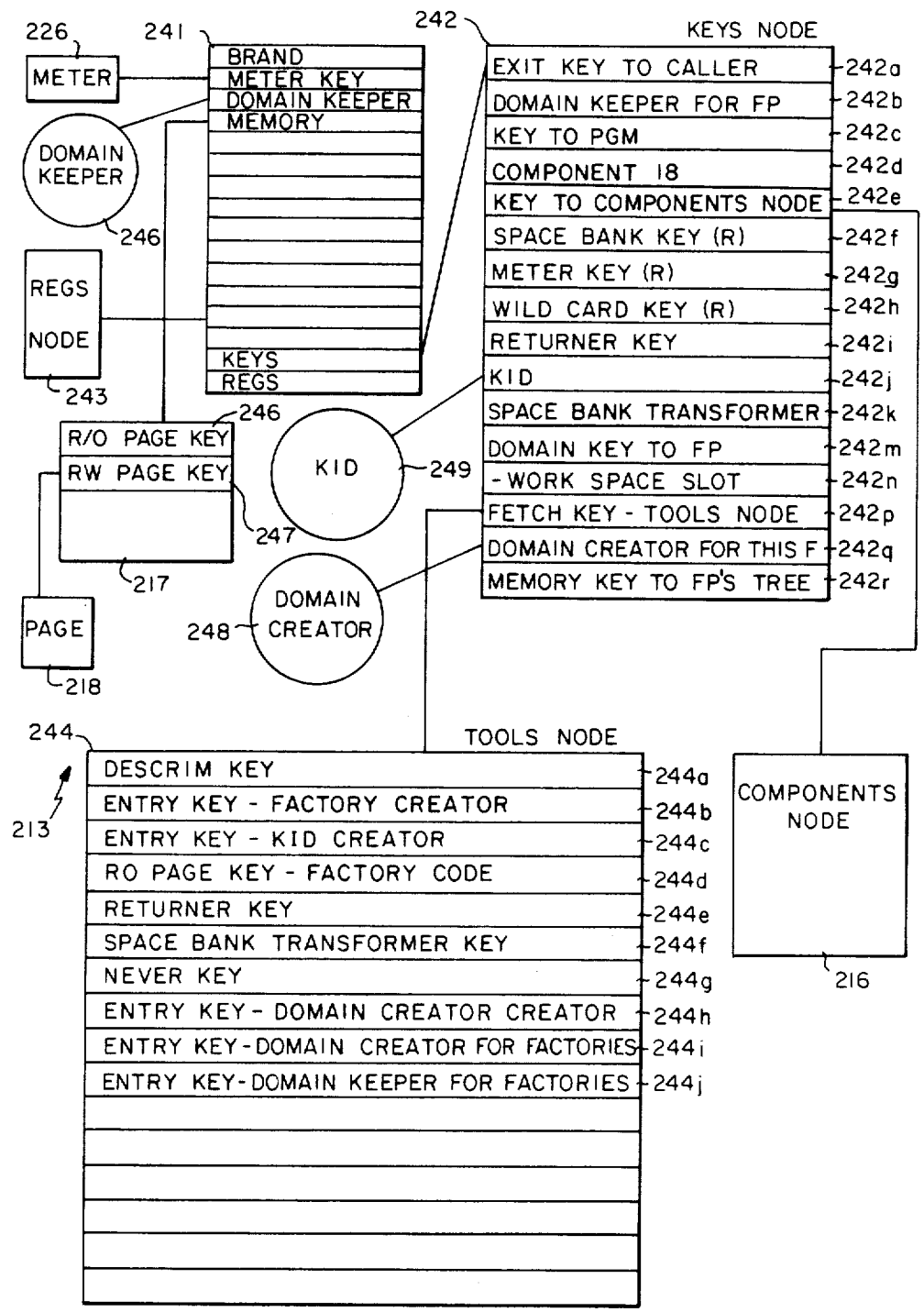
FIG. —11b

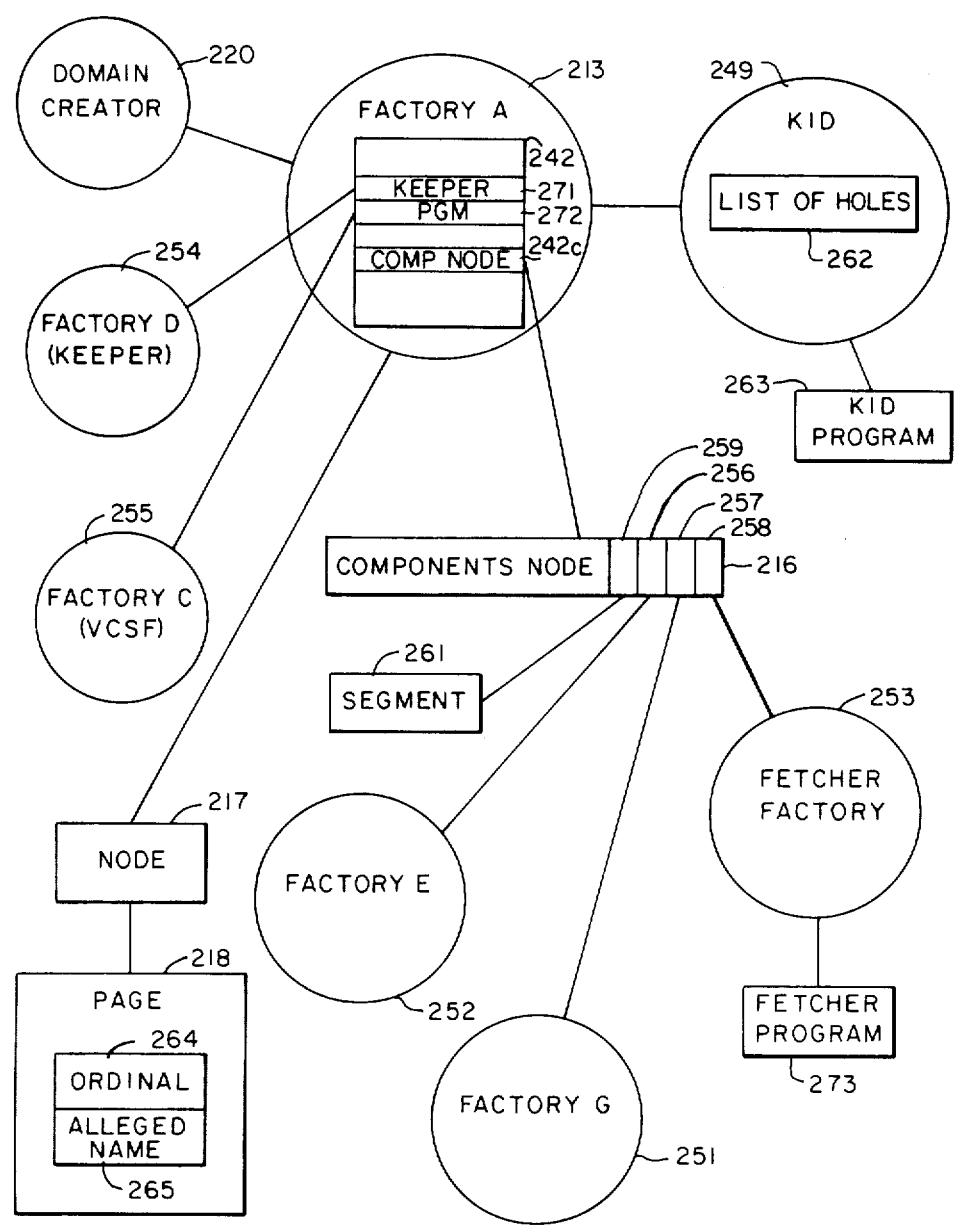
EXAMPLE OF FACTORY STRUCTURE
FIG.—11c

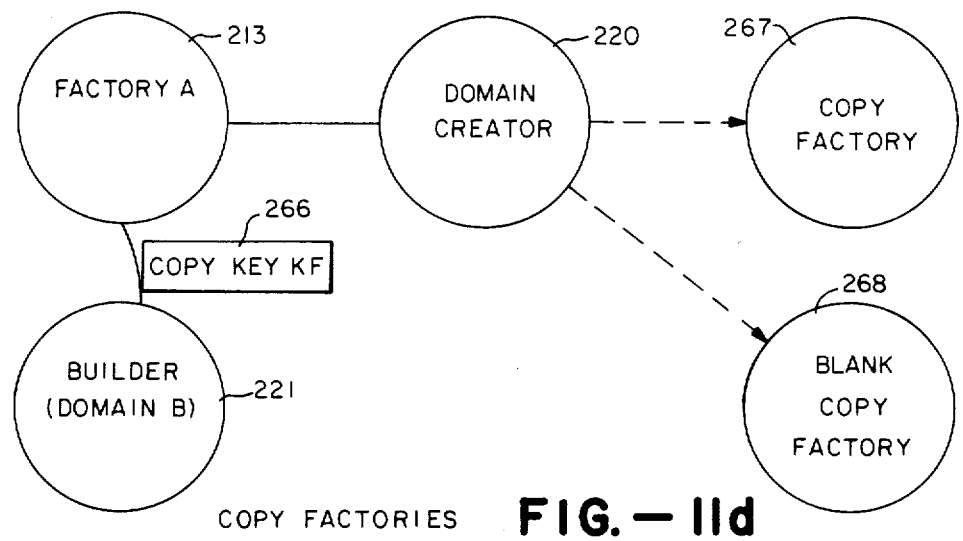
COPY FACTORIES  FIG.—11d
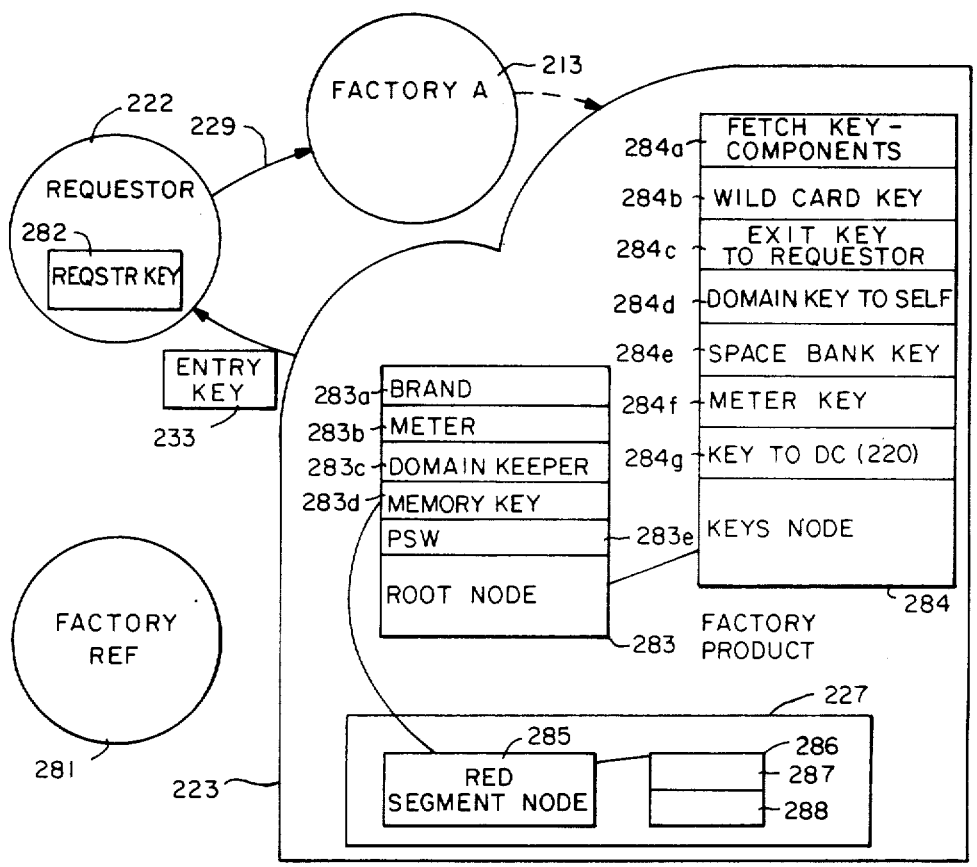
FACTORY PRODUCT  FIG.—11e

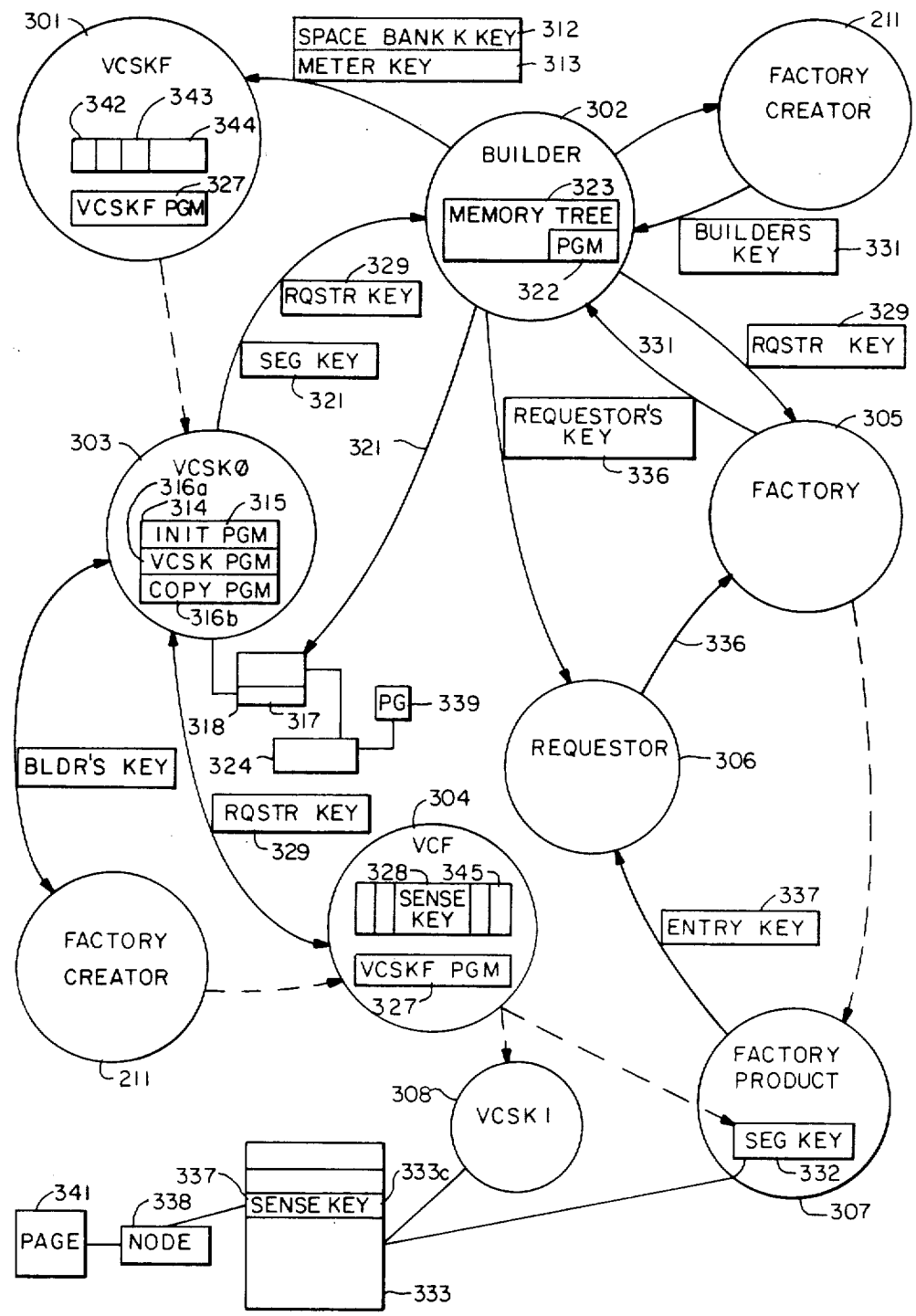
VIRTUAL COPY SEGMENT KEEPER FACTORY    FIG.—11f

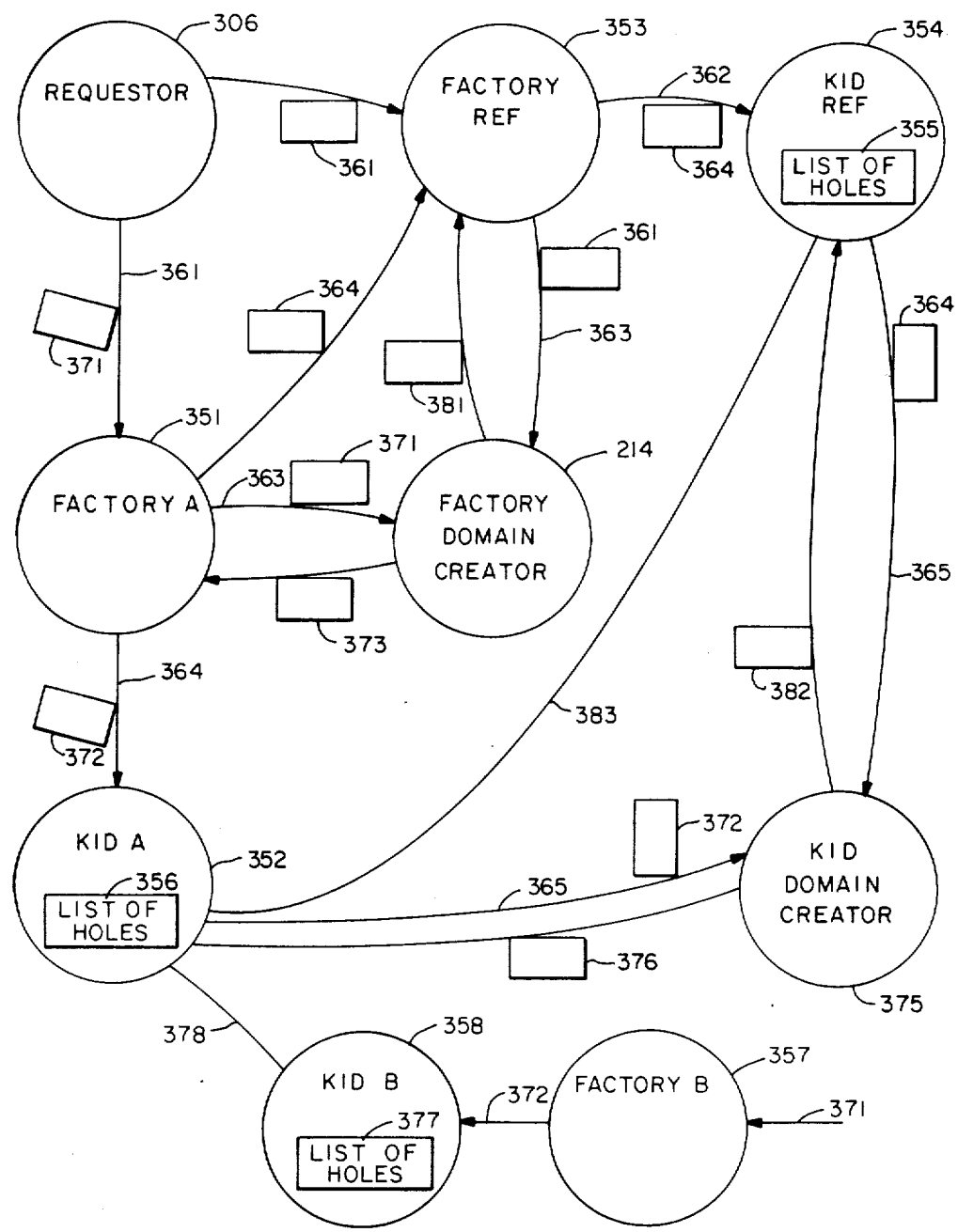
FACTORY PROCESSES FIG.—11g

COMPUTER SECURITY SYSTEM

This invention relates generally to a data processing system and more specifically to an apparatus and method for ensuring the confidentiality of data and data processing in a data processing system.

BACKGROUND OF THE INVENTION

The security of data and processes in a data processing system depends on many features of the system. In one aspect, security is implemented through the use of usernames and passwords. In a more fundamental aspect, security is implemented through the design of the internal architecture of the computer system. This architecture is typically implemented with hardware, firmware and software. The present invention involves the use of a new fundamental architecture designed on the principal of "mutual distrust". That is, each user is assumed to have interests inimical to all other users of the computer system, including some of the system programmers. The structure of the system is such that a user can use system utilities without having to trust the author of the utility; i.e., the utility cannot steal a copy of the user's data, or make any other use thereof, without the user's permission.

Traditional prior art computer systems have three types of deficiencies which are addressed by the present invention: lack of protection between programs or users, the method of delegating authority to access facilities, and the method of implementing "policies", i.e. system rules about who can do what to whom.

The prior art has generally accorded each user a level, the lower levels providing services for the higher levels, and with a defined interface between the levels. Most contemporary systems are implemented in two or three (and sometimes four) distinct levels. The lowest level, often called the supervisor, interfaces directly with the hardware and input/output devices, supports multi-programming, and provides other "basic" services. The supervisor provides an execution environment for the higher levels, which are variously called an address space, job, virtual machine, partition, or virtual memory.

The (optional) second level runs within a protected part of this virtual memory and is often called a monitor. It usually contains such facilities as command language interpreters, access methods, directory support and debugging tools. In most systems the code that implements these facilities is common to all virtual memories, but each has private working storage provided by the supervisor. The third layer contains all user-level programs, including user written programs, compilers, and many system-provided utility functions that do not require the privileges of the lower layers. Note that the three layers exist in a hierarchical relationship. The second layer controls the third, and the first layer supervisor controls all occurrences of virtual memory.

Strong mechanisms provide firewalls between the three layers, but all programs within a layer run in a common area, with common authority to execute functions allocated to that layer. For example, if an application package contained several programs including some mathematical subroutines, an interface to a graphics system, and a data base management system interface, all the code supporting these functions would co-exist in a single virtual memory. Since all share the same memory, there is no assurance that the code in any one of these components will not destroy or alter data belonging to any of the other components.

The inability to protect programs from each other exists at each of the three levels of the operating system. In each case, the consequences are propagated throughout the level in which the failure occurs. At the third level an application program is terminated or produces incorrect results. At the second level a job or file is compromised. At the first level the entire computer system can be disabled by a simple error. As systems become more complex and interrelated, debugging and maintenance require an increased level of resources to reduce the frequency of these failures.

Reliability, integrity and security can be attained by separating each layer into individual isolated entities which can only communicate with each other through explicit and controlled interfaces. In such an environment, the graphics package, for example, could exist in its own virtual memory with its code and data completely protected. If any failure occurred in the graphics package, it would be possible to know with great certainty that the failure was due to a flaw in that graphics package, and those parts of the application that did not depend upon the performance of the graphics package would continue to run. This architecture is inherently more reliable because it provides a fail-soft capability, thus reducing the scope and intensity of any failure. If all levels of the data processing system are structured in this manner, the entire system will be more secure and flexible than the prior art systems.

The second problem referred to above is that the authority to do things (e.g. run programs, access files) is associated with an individual username or address space. Thus if the data base manager has the authority to access a data base, any part of the application may access that data base directly (if it knows the passwords), completely bypassing internal security mechanisms and filters of the data base manager. Similarly, all of a user's files are accessible by any program run by the user. While some systems install monitors to keep logs of who accessed what file in order to detect people doing things that they shouldn't, few, if any, prior art systems provide an explicit mechanism to prevent this kind of penetration and none are believed to be as effective as a system incorporating the invention described herein.

The third difficulty referred to above is that rules or system policies are often implemented in firmware or software that is diffused in many obscure modules. Examples of this class of rules are "any program which runs under a username may have access to all of the files owned by the user," or "anyone who can produce the correct password may access the file," or "no one except the owner may access the file." (Note that typically a file can be owned only by a user, not by a program.)

In each of these three areas—system organization, authority control, and policy implementation—prior art systems have built-in architectural barriers. It is generally not possible to correct them, retrofit them, or add selected facilities which remove the deficiencies without completely redesigning and reimplementing the systems. However, it should be noted that the problems addressed by the present invention are not necessarily inherent in three-layer supervisor-monitor-user type systems; rather they are generally found in prior art systems due to a common underlying viewpoint in their design.

At least some of the prior art concerning capability based computer systems and corresponding operating systems is described in the following articles: P. J. Denning, "Fault-Tolerant Operating Systems," ACM Computing Surveys, vol 8, no. 4, pp. 359-390 (Dec. 1976); T. A. Linden, "Operating System Structures to Support Security and Reliable Software," ACM Computing Surveys, vol. 8, no. 4, pp. 409-445 (Dec. 1976); G. Cox, W. Corwin, K. Lai, F. Pollack, "A Unified Model and Implementation for Interprocess Communication in a Multiprocessor Environment," Proc. Eighth Sympsm. Operating Systems Principles, vol. 15, no. 5, pp. 125-126 (Dec. 1981); K. C. Khan, W. M. Corwin, et al., "iMAX: A Multiprocessor Operating System for an Object-Based Computer," Proc. Eighth Sympsm. Operating Systems Principles, vol. 15, no. 5, pp. 127-136 (Dec. 1981); and F. Pollack, K. Kahn, R. Wilkinson, "The iMAX-432 Object Filing System," Proc. Eighth Sympsm. Operating Systems Principles, vol. 15, no. 5, pp. 137-147 (Dec. 1981). See also the sources cited in these articles.

The capability systems described in the above cited articles describe capability based structures and methods for at least theoretically preventing unauthorized use of system resources. As noted in the article by Denning, there has been a paucity of actually working capability based systems, and even fewer that have been used commercially, indicating that certain problems involved in the use or implementation of capability systems have either not yet been recognized or not yet solved. There is also the problem that computer designers and operating system programmers are generally less familiar with capability systems than with conventional computer architectures.

The present invention is directed primarily at one problem not even recognized as a problem in the cited articles and at several other problems involved in the practical implementation of a capability system. The major problem not recognized as such in the prior art is: that merely using a capability system to prevent unauthorized uses of system resources does not solve the practical problem that the user of an application may not trust the author of the application not to steal a copy of his data. In other words, in prior art systems either (a) a first user has to give to a second user a key (i.e., a capability) to the data that the first user wants to be processed by the second user's program, or (b) the second user has to pass to the first user a key to his program. In either case, if the two users do not trust each other, the result is entirely unsatisfactory because one user can steal a copy of the other user's proprietary information (i.e. data or program). In other words, the mere use of a capability system does not solve basic security problems because, in order to get anything useful done, the prior art systems required that users share their capabilities with others who they do not necessarily trust.

SUMMARY OF THE INVENTION

It is therefore a primary object of the present invention to provide a capability based computer system that permits mutually untrusting users to cooperate in well defined ways that do not compromise the security of any user's data and/or programs.

It is a second object to provide a capability based computer architecture of practical design that is capable of implementation in either hardware, firmware, software or a combination thereof.

In accordance with these objectives there is provided a capability based computer system including a plurality of domains, each including at least one node, where domains are the basic operational unit or virtual machine in the system. Each node has a number of slots for holding keys, also known as capabilities. Keys are used as tokens of authority to use a specified portion of the system's resources. A domain's capabilities are defined entirely by the keys it holds. Each key includes a pointer to an object in the system corresponding to the identity of the key and also includes a tag indicating its key type and the scope of authority provided thereby. A kernel has the exclusive means for creating keys and the exclusive means for resolving the authority conveyed by each key. A limited number of kernel functions are available to all domains; but the invocation of each kernel function requires the possession of a corresponding key. The kernel functions limit the generation of keys in accordance with predefined policies which guarantee the security of domains and other objects in the system. A plurality of factories, which are special domains having an ascertainable set of non-sensory keys, enable other domains to share resources without trusting one another. A "hole comparator" can be used to determine if a particular factory has the ability to invoke, directly or indirectly, any non-sensory keys which are not included in a first predefined set, whereby a domain can determine if the specified factory is trustworthy or at least potentially untrustworthy.

Additional objects and features of the invention will be more readily apparent from the following detailed description and appended claims when taken in conjunction with the drawings, in which:

DESCRIPTION OF DRAWINGS

FIG. 1 is a block diagram of a basic domain configuration.

FIG. 2a is a block diagram of a computer system incorporating the present invention. FIG. 2b is a block diagram of a memory structure called item space.

FIGS. 3a-3c are block diagrams of three basic key structures. FIG. 3d is a block diagram of a doubly linked list of keys, all of which point at the same object. FIG. 3e is a block diagram of a device i/o key.

FIG. 4a is a block diagram of a node frame. FIGS. 4b and 4c are block diagrams of a core table entry and a core annex entry. FIG. 4d is a block diagram of queue header.

FIG. 5a is block diagram of a memory tree. FIG. 5b is a block diagram of page and segment keys. FIG. 5c is a block diagram of an atypical memory tree. FIG. 5d is a block diagram of memory sharing. FIG. 5e is a block diagram of a red segment node. FIG. 5f is a block diagram of revocable memory sharing.

FIG. 6 is a block diagram of a derived information block.

FIG. 7 is a block diagram of the relationship between a domain and its meter, meter keeper, domain keeper and segment keeper.

FIG. 8a is block diagram of two domains in remote computer systems sharing a data base. FIG. 8b is a block diagram of two domains sharing memory using a copy-on-modify scheme.

FIGS. 9a through 9d are block diagrams of gate jumps between domains and of the exit and entry blocks used to effect gate jumps.

FIG. 11a is a block diagram of the relationship between a factory creator, a builder domain, a factory, a requestor domain, and a factory product. FIG. 11b is a detailed block diagram of a factory. FIG. 11c is a partial block diagram of a particular factory. FIG. 11d is a block diagram of a factory and its copies. FIG. 11e is a detailed block diagram of a factory product. FIG. 11f is a block diagram showing the use of a virtual copy segment keeper factory. FIG. 11g is a block diagram of two factory processes.

FIG. 12 is a block diagram of a new user domain with a womb key which references a supernode.

DESCRIPTION OF THE PREFERRED EMBODIMENT

Figure 10A:
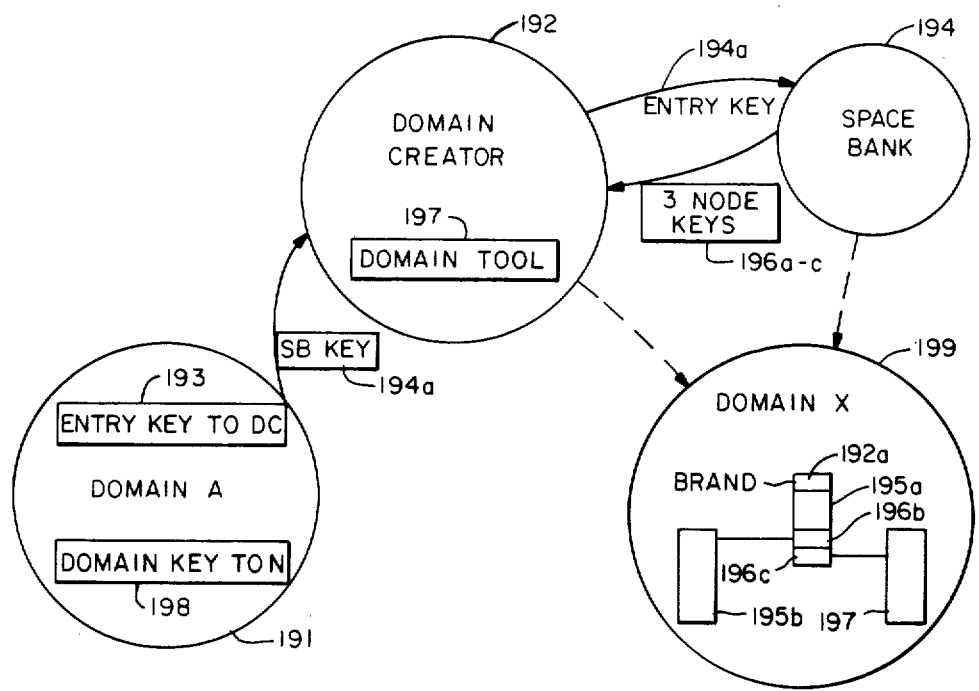
FIG. 10a is a block diagram of the process of forming new domains.

Basic Concepts. The present invention falls in the class of data processing systems known as capability systems. As a capability system, however, the invention does not comprise an operating system in the conventional sense. The invention instead provides an architecture, including a set of primordial objects with which the architecture is implemented, upon which an operating system can be built.

In the following descriptions, the terms computer and data processing system are used interchangeably. The term "object" refers to any basic system construct, such as a key, node, domain, page, or segment.

Whenever bit or byte positions are described using numbers, position 0 is the leftmost and most significant position and the positions proceed rightwards and towards the least significant bit or byte as the position number increases.

The objects, methods and functions described herein can be implemented in either hardware, firmware or software or some combination thereof. It is anticipated, but without any intended limitation on the scope of the invention, that the most efficient implementation of the invention will be such a combination, with many of the kernel functions (described below) implemented in firmware and with some of the most fundamental kernel functions implemented in hardware.

For the purposes herein, the computer system's memory is considered to be split into two major portions: core memory and disk memory. The term core memory refers to high speed memory used by the data processing system for current calculations, i.e., memory to which the computer has relatively direct access. High speed memories currently have access times typically ranging from 3 nanoseconds to 250 nanoseconds. More generally, high speed or "core" memory has an access time of no more than 20 times (and typically no more than 3 times) the length of the basic instruction cycle of the computer's central processing unit (CPU). Using current technology, core memory typically includes 1 Megabyte (1 Mbyte) to 1 Gigabyte (i.e., $10^9$ bytes) of high speed semiconductor memory, possibly including a mix of very high speed cache memory and medium speed memory. The term core memory does not imply the use of magnetic core technology memories. Furthermore, the system's core memory may be either physically and/or logically divided into many components corresponding to different objects and sets of objects in the system.

The term disk memory refers to relatively slow memory, generally having an access time in excess of 20 times (and typically at least 1000 times) the length of the basic CPU instruction cycle. Using current technology, disk memory typically includes one or more magnetic disk memory units having a total capacity of anywhere from 20 to 10,000 megabytes. The term disk memory is not limited to magnetic disk technology and may include bubble memory, slow semiconductor memory, laser disks, magnetic tapes, and other storage technologies.

For most purposes herein, the preferred embodiment is described in the context of a single CPU computer system. However the architecture of the system lends itself to multiple CPU systems, and certain modifications for multiple CPU systems are described below.

The basic or primordial objects used in the invention are domains, nodes, keys and pages. A page is a unit of memory that is used to hold data or computer programs, but generally is not used to hold nodes or keys. A node is a memory array having a number of slots for holding keys. Keys are the basic unit for holding and conveying authority to use the system's resources. Each key has a key type indicating its general function. Most keys act as pointers to the object for which they convey authority. Domains are the basic operational unit in the system, similar in some ways to a virtual machine or user in conventional computer systems. However, domains are, at least initially, much smaller objects than conventional virtual machines. A typical user application will use more than one, and often many, domains to perform its functions. A well formed domain can comprise just a few linked nodes. More complicated domains are built up using keys to memory segments and keys to other domains.

Each domain is completely protected from unauthorized access or modification by programs in other domains. A first domain can be affected only by domains which have a key to the first domain or to one of that domain's objects. For domains without such keys, the first domain is not only an impervious black box, its very existence is not discernible.

All domain functions and key functions are supervised by a kernel. The kernel comprises either hardware, firmware, and/or software which filters all domain and key functions and thereby ensures the integrity of the system. Keys and nodes cannot be directly accessed or manipulated by domains. Only the kernel can create, copy and alter keys, and only the kernel can create and alter the structure of domains. It is impossible for a domain to randomly generate keys or to construct keys to an object to which a domain does not already have a key, because the set of predefined key functions in the kernel provide no mechanism capable of producing such a result. The kernel can be thought of as a small subsystem with a limited number of predefined functions (described below) wherein the integrity of the subsystem can be mathematically proved. The integrity of the kernel ensures that unauthorized access to one domain by another domain is impossible.

In addition to the memory structures for holding nodes and certain other tables described below, the other predominant memory structure is the memory tree. Memory trees comprise one or more pages of memory whose relationship to a domain's address space is defined by a hierarchy of nodes called segment nodes. Normally, within the address space of a domain, only a fraction of the pages needed to fill the address space are actually used or even defined. Each domain can use one or more linked segment nodes to define its address space and to provide keys to those memory pages and segments that are defined.

Basic Domain Structure. Referring to FIG. 1, in the preferred embodiment a domain 11 includes at least three linked nodes 12, 13, and 14. All nodes 15 contain sixteen slots for holding keys 16. For convenience, the slots of the root node 12 are labeled C0 to C15. The root node 12 is the root of the domain 11 and contains several keys whose functions will be discussed below. The keys node 13 is used to hold keys 16 to be invoked by the domain 11 or passed as key parameters. It is also used to receive key parameters. The registers node 14 is used to hold up to 16 data keys that define the contents of the general registers of the domain (e.g. general registers 0 to 15 and floating point registers 0 to 6 of an IBM 370 computer). In other embodiments a basic domain could comprise a single node with the ability to link to other nodes as needed. One way to implement such an embodiment would be through the use of variable size nodes, thereby reducing the number of nodes that need to be addressed for many basic system functions but making each node reference somewhat more complicated, as will be appreciated by those skilled in the art.

The registers node 14 primarily serves the purpose of preserving the state of a process in the domain 11 while the domain is not resident in the computer's central processing unit (CPU). There is no reason inherent to the invention that the state of the domain be preserved in a node in this manner, so long as there is provided some such mechanism, which is essential to the implementation of a multi-tasking computer system. Other components of the state of the domain are preserved in the root node 12, including: the program status word (PSW) indicating the address of the next instruction in the domain's process, if any, in slot C4; a trap code used to indicate what type of fault occurred when a fault is detected, in slot C5; some control registers in slots C6, C7, C8 and C9; and a busy flag indicating whether the process in the domain, if any, is ready, busy or waiting, in slot C13.

System Configuration. Referring to FIGS. 2a–2b and FIGS. 3a–3e there is shown the basic memory structure and architecture of the invention and the four data structures used for keys. As shown in FIG. 2a, the computer system 21 includes a CPU 22, input and output (I/O) devices 23 (e.g. printers, tape drives, cathode ray tube terminals, telephone and data line ports), core (i.e. fast access) memory 24, disk memory 25, a kernel 26, and item space 27 in core 24. In the preferred embodiment there are also special memory areas in core 24 called: the page and segment tables 28, used by the CPU 22 hardware to address pages in the core memory 24; hash tables 29; DIB area 31; other dedicated core areas 32; and page space 33. The kernel 26 may be implemented as part of the CPU 22 (in hardware and/or firmware), as a special computer program resident in the core memory 24, or as a combination of hardware, firmware and/or software. Disk memory 25 is also divided into a disk-node space 34 and a disk-page space 35.

Item space 27, as shown in FIG. 2b, is a special memory area, typically comprising a dedicated portion of core-type memory, for holding node space 41, a core table (also called a resident page map) 42, a core table annex 43, and a queue header table 44. Item space 27 is controlled by the kernel 26 and is not directly accessible by domains 11. The function of each portion of item space 27 is discussed after the next discussion on the basic structure of keys. All nodes and keys in core are stored in node space 41. The basic purpose of item space and nodes in general is to provide a means for segregating data from keys so that these cannot be interchanged, except under the explicit control of the kernel.

Key Structures. Referring to FIGS. 3a and 3b, keys can point to nodes and pages that are either in core 24 or on disk 25. If the object that the key references is in core 24, and the key is in core 24 (i.e., in item space 27), then the key 16 is prepared and is in the format shown in FIG. 3a. If the object that the key 16 references is on disk and not in core, or the key 16 is in disk memory 25, then the key 16 is not prepared and is in the format shown in FIG. 3b.

All keys in the preferred embodiment are 8 bytes (64 bits) long. The first byte identifies the key type. For all keys except device I/O keys, the second byte, called the data byte, is used to further identify the type and authority of the key. The use of last 6 bytes depends on whether the key is a data key, and on whether the key is prepared or unprepared. Data keys, shown in FIG. 3c, are not used to convey authority to use other system objects and do not point at other objects in the system. Instead, data keys are used as a convenient small unit of storage. In particular slots of the root node 12 of a domain 11 (e.g., the PSW in slot C4), the value of the six bytes of a data key, or a certain portion thereof, is used to hold parameters indicative of the state of the domain 11.

The format of an unprepared key is shown in FIG. 3b. As stated above, all keys which reference objects not in core and all keys which are in disk memory 25 (i.e., not in node space 41) are unprepared. Bytes 2–4 contain a coded disk address (CDA) which uniquely identifies the location of the item in the disk memory 25. Bytes 5–7 contain an allocation number (ALC), which must match the allocation number of the referenced disk object. Every page and object stored in disk memory 25 has an associated ALC.

The usage of the allocation count (ALC) is as follows. All nodes and pages in the system 21 have an associated page or node frame on disk 25 and all such page and node frames have a corresponding allocation count (ALC). The ALC of a disk node or page frame is generally incremented each time the node or page corresponding to the frame is deleted. Keys referring to the deleted item will therefore have an ALC that does not match the current ALC of the item's corresponding node or page frame. Such keys have no authority to access the object currently stored in the disk node or page frame and are generally zeroed by the kernel whenever such an ALC mismatch is found. A zeroed key is a data key with a data value of zero. There is one circumstance, though, when it is not necessary to increment a disk frame's ALC when the corresponding object is deleted. This is when all keys to the object are in core and thus can be zeroed when the object is deleted. In this case there can be no keys left referencing the deleted object and there is no need to increment the ALC. To implement this ALC conservation scheme, a special bit flag (called ALC-INC) is used in each core table annex 43 entry to indicate if any key to the corresponding page has been written onto disk. Periodically it will be necessary to go through the whole system 21 to search out and destroy all keys in disk memory 25 pointing to deleted objects, so that the ALC values of disk node and page frames are not exhausted. Using up all the ALC value of a single page frame would require reusing the object $2^{24}$ times in the present embodiment. Since a typical disk access takes 30 milliseconds, this would take at least fifteen days of constant work (writing into the disk object, writing a key to it into disk memory, and then deleting the object, thereby requiring at least three disk accesses per ALC value). The kernel detects when an ALC is about to recycle to zero (by testing the value of the ALC) and takes that disk object out of circulation until the disk memory 25 is purged of all old keys and all the ALC values are reset to zero.

The format of a prepared key is shown in FIG. 3a. Pointer IX is an index used to point at the entry in index space 27 referenced by the key. In the preferred embodiment the index is relative to the beginning of item space 27. Pointers F-LNK and B-LNK are forward and backward pointers forming a doubly linked list with all the other keys pointing to the same object. The doubly linked list, an example of which is shown in FIG. 3d, facilitates quick access to all keys referencing the same object. In FIG. 3d, index pointers 51a, 51b, and 51c, from keys 52a, 52b, and 52c, all point at the item space entry of the object 53. Forward pointer 54a, 54b, 54c, and 54d form one thread of the doubly linked list, and backward pointers 55a, 55b, 55c, and 55d form the other thread. The item space entry for the object 53 always includes forward 54d and backward 55d pointers in its data structure for this purpose.

The first bit of each key, labeled "p" in FIGS. 3a and 3b, indicates whether the key is in a prepared or unprepared state. The second bit of each key, labeled "i" in FIGS. 3a and 3b, indicates whether the key is "involved", which helps prevent a domain from using a capability that has changed or deleted, as will be explained in the discussion of the involved bit near the end of this specification.

The rationale for having prepared keys is that they facilitate quick access to the referenced object by eliminating the need to recalculate—based on its CDA (coded disk address)—where in core 24 or item space 27 the object is. The location of a page in page space 33 or a node in node space 41 is initially determined by hashing the CDA, using hashing techniques well known to systems programmers. For instance, in a preferred embodiment, when a node key is first used (i.e. the key pointing at the node is in an unprepared state), the location of the node is computed by extracting certain bits of the CDA to calculate the location of a node header (stored in a hash table 29) which forms the hub of a singly linked list of all the nodes that hash to the same value. If the node is not found in the hash list the node is then copied from disk into the next available node frame 61 and linked to the end of the hash list. In either case the unprepared node key is then prepared, eliminating the need to recalculate the location of the node in node space 41 when that key is used again.

There are several basic types of keys. The uses of each type will be explained in greater detail below. The type of the key is determined by bits 2-7 of byte 0 of the key. See FIG. 3a. Since the exact bit value of each key type is irrelevant for the purposes herein, each key type will be identified by a functional name.

Data keys, as already explained, merely carry six bytes of data and convey no other authority. See FIG. 3c.

Page keys convey authority to use a page in memory. In the preferred embodiment a page comprises 4096 bytes. Segment keys convey authority to use a set of pages. The segment key points at a type of node called a segment node. The number of pages and the type of authority conveyed thereto by the segment node is described below in the discussion of memory trees. Page keys and segment keys are collectively called memory keys.

Node keys convey the authority to "read" (i.e. copy) and write any slot in the node referenced by the key. Fetch keys convey the authority to read any slot in the referenced node, and thus are a weakened version of a node key. A sense key conveys the authority to ready any slot in the referenced node, but the key read is weakened so as to be effectively a read-only key conveying no authority to change the referenced node or any of the objects pointed to by its keys. Note that segment keys provide no authority to read or write keys; they only provide access to pages.

Domain keys convey the authority to do anything to the referenced domain that does not interfere with basic kernal functions for domains. This is weaker than a node key, but it should be noted that the kernel makes it impossible to ever get a node key to the root of a domain and therefore a domain key is the strongest key one can have to a domain.

Entry and Exit keys are used by "subroutine" type calls or jumps from one domain to another. Builder's and requestor's keys are special entry keys used with factories. There are several types of exit keys, too.

Meter keys convey authority to use system resources, such as CPU time and core-memory usage. A meter key points at a special type of node called a meter, as described below.

Badge keys are used to identify the brand of domains.

Hook keys are used to link domains that are waiting for system resources to the relevant queues.

Device I/O keys convey authority to use physical input and output devices. Their structure is shown in FIG. 3e. Unlike other keys they do not have a data byte. In addition to an allocation count, these keys have a two-byte device number which uniquely identifies the device corresponding to the key.

Item Space. Referring to FIGS. 4a-4d, the data structures of item space include node frames 61, core table entries 72 and 73, and queue headers 74. Node space 41 comprises an array of node frames 61. A node frame 61 is an array of slots for holding a node 15. Referring to FIG. 4a, in the preferred embodiment a node frame 61 occupies the space of nineteen key slots, including a 24-byte (i.e. three key-slot) node header 62 and sixteen key slots KS0 to KS15. The node header 62 includes: a prep code 63, indicating the manner in which the node was prepared; a CALLCOUNT 64, used in conjunction with the root node of domain to indicate the number of times the domain has called other domains, and which must match the CALLCOUNT of the exit key used to return to the domain (see discussion of gate jumps below); a forward pointer F-LNK and backward pointer B-LNK used to form the hub of a doubly linked list of all keys pointing to the node 61; a FLAG parameter 64, containing several bit flags indicative of the state of the node; a prep lock 65, indicating that the kernel is currently operating on the contents of the node, thereby preventing the kernel from inadvertently performing two conflicting operations of the node at the same time, or from getting stuck in a circular loop of key references; a coded disk address CDA indicating the node's disk address; an allocation count ALC, used to ensure that keys to the node 15 are not keys to a previous node that has since been deleted from the system; a hash chain pointer 66, pointing to the next node with the same CDA hash table 29 entry; a DIB offset index 67, used if the node 15 is the root node of a domain to locate the domain's derived information block (DIB) in the DIB area 31; a meter level 68, indicating the number of meters above the meter for this domain there are in the hierarchy of meters; a core LOCK 69, used by the kernel to temporarily prevent the node from being swapped out to disk; and STOT PTR 70, used to point to a table of segment table entries corresponding to the memory segment defined by this node.

The flags in the FLAG 64 parameter include the following. X-QUEUE (used only for domain root nodes) indicates whether another domain which was waiting on this one was removed from item space in order to relieve congestion. GRATIS indicates that the use of this node is free (i.e., does not consume meter resources). DIRTY indicates that this node has been either created or updated since the last system checkpoint (see discussion of checkpointing below) and therefore will need to be copied during the next checkpoint. ALC-INC indicates that the allocation count of this node must be incremented when the node is deleted because there has existed an unprepared key (other than an exit key) to it (e.g. a key to it residing in disk-node space 34) (see discussion of the ALC parameter in keys, above). CALLCOUNTUSED indicates that an unprepared exit key to this node has existed with the current call count. REJECT is turned on when another process tried to enter this domain when it was busy. REJECT will be on when there is an internal stall queue for this node (see discussion of gate jumps below). DRYMETER indicates that there are no caches in DIBs below this meter (see discussion of meters and the scavenge procedure below).

Referring to FIGS. 4b and 4c, core table items 71 are divided into two data structures, a core table entry 72 (in core table 42) and a core annex entry 73 (in core annex 43). Referring to FIG. 2a, page space 33 is divided into page frames 34 of 4096 bytes each. For each page frame 34 there is a corresponding core table item such that the first core table item is used for the first page frame 34 in page space, the second item for the second page frame, and so on. Therefore there is no need for a pointer from the core page item 71 to the page frame 34.

Referring to FIG. 4b, each core table entry 72 contains the following parameters: a pointer PT to the page table, if any, corresponding to the page (see discussion of memory trees); a pointer HSH to the next page, if any, having the same CDA hash; and head and tail pointers F-LNK and B-LNK forming the hub of a doubly linked list of all page keys pointing to the core table entry 72.

Referring to FIG. 4c, each core annex entry 73 contains the following parameters: A FLAG byte has several bit flags, including: USED, indicating if there has ever been an unprepared key to this page with the current allocation count (thereby indicating that when the page is deleted its allocation count (ALC) should be incremented); the coded disk address (CDA) of the page; the allocation count (ALC) of the page; and KERNEL-REAL-ONLY used by the kernel during checkpointing to prevent any domain from writing on the corresponding page. A lock byte (LOCK) for the core table and annex entries 72 and 73 is turned on by the kernel to indicate that the corresponding page should not be swapped out to disk.

Referring to FIG. 4d, each queue header 74 contains the following parameters: a QTYP label in the first byte, distinguishing the queue header from a node header by containing a value that would constitute an illegal PREP CODE 63 in a node header 62 (see FIG. 4a); and F-LNK and B-LNK index pointers to the first and last items (which are usually the root nodes of domains) in the queue corresponding to the queue header (see discussion of stalled domains, below). These queues are accessible only to the kernel, and are generally used only for resource scheduling, keeping track of what each active domain is waiting for, what domains do not have a process in them, input/output (i/o) requests, and keeping track of those domains which appear to be in limbo and may require special action. No domain can obtain a list of the domains in any of these queues because the kernel contains no function for passing such a list to a domain. A partial list of typical queues includes: domains waiting for CPU; domains waiting to write on kernel read-only pages (see discussion of checkpointing below); domains wanting pages or nodes that are not mounted; domains waiting for node frames to become available; domains waiting for page frames to become available; domains waiting for disk i/o; domains waiting for checkpoint or migration; and domains that need worrying about.

Memory Trees. Referring to FIG. 5a, there is shown a memory tree of a domain 11. The key in slot C3 of the root node 12 points at the memory tree 81 of the domain. If there is no memory tree 81 the key has a zero value. If the tree 81 comprises a single page, then C3 contains a page key. Otherwise C3 contains a segment key, which points to a segment node 82. Each slot of the segment node 82 can contain either a page key or another segment key, depending on the size of the domain's address space. Generally, the size of the address space pointed to by any segment key equals $16^{3+d}$ bytes, where d is the depth of the of memory tree 81 in terms of the number of layers of segment nodes between the segment key and the page keys in its memory segment. The derivation of this formula is that one page contains $16^3$ or 4096 bytes, and each segment node addresses 16 pages or 16 segment nodes. For the purposes herein, a memory segment comprises a memory tree or any portion of a memory tree defined by a segment key. Accordingly, in the memory tree shown in FIG. 5a the size of the address space defined by the segment key in slot C3 is $16^5$ bytes or 1 Megabyte. However it is not necessary that all the segments or pages of the address space of the domain 11 be actually defined or used. In the memory tree 81 shown in FIG. 5a only the first five and the last of the slots in segment node 82 are defined and only a few of the pages in each of the second tier segment nodes 83a-83f are defined.

Referring to FIGS. 5b and 5c, there is shown the format of an unprepared segment key. It should be noted, though, that only the last six bytes of segment key are changed when the corresponding segment node is brought into core and the key becomes prepared. The only distinctive aspect of a segment key besides its key type is its data byte. The first bit RO indicates whether the authorized access to the memory segment is read-only or read-write. The second bit NOCALL indicates how a page fault (i.e., an attempt to address a page not defined in the memory tree, or an attempt to write on a page that is accessed by a read-only key) should be treated, as described in the discussion on segment keepers below. Basically, if the nocall bit is on then all segment keepers lower in the memory tree are disabled.

The remaining six bit SSC is a "slot size code" corresponding to the size of the memory segment addressed by each key (or slot) 85x in the segment node 86 pointed to by the segment key 87, where SSC=$\log_{16}$(number of bytes in the memory segment). Generally, all the segment keys 85x in any particular segment node (e.g. node 86) will have an SSC equal to one less than the SSC of the segment key (e.g., segment key 87) pointing to that segment node 86. As described below, when the segment key points to a special type of segment node called a red segment node its SSC equals zero.

Page keys have the same general format as segment keys in that the data byte has the same structure as shown for segment keys in FIG. 5b. The SSC of a page key is equal to 2 but is not used because page key does not define the size of the memory segments addressed by keys in a segment node and because a page always has 4096 bytes. Furthermore, the nocall parameter is not used in conjunction with page keys.

The scope of authority that a domain 11 has to a particular page is filtered by each layer of segment and page keys. If any key in the tree path to a page is read-only then access to that page is read-only; similarly, if any key in the tree path to a page is nocall then access to that page is nocall (i.e., all segment keepers below the highest nocall key in the memory tree are inactivated; see discussion of segment keepers). As is true throughout the system, capabilities can be narrowed but not broadened through the use of a chain of keys.

A segment node is an ordinary node in that it has the basic structure of all nodes, as shown in FIG. 4a. However there are two types of segment nodes, labelled herein as black and red. Ordinary segment nodes (also called black segment nodes), such as those shown in FIG. 5a, use all sixteen slots to hold either segment keys or page keys. Generally, all the segment keys in a segment node will have an SSC equal to one less than the SSC of the segment key pointing to that segment node. This is, however, not always the case and it is not an error to violate this general "rule" in complex memory structures. Where this "rule" is not followed, the scope of the address space of a segment node is defined by the segment key pointing to it.

Referring to FIG. 5c, if a key 85a in a slot of a segment node 86 points at more pages than allowed by the segment key 87 to the segment node, then only the first N pages of the memory segment pointed to by key 85a will be used, where N is the number of pages allocated to its slot by the SSC of the segment key 87 (i.e., N equals $16^{SSC-3}$ pages). If a key 85b in the segment node 86 points at less pages than allowed by the segment key 87 then the pages addressed by the key 85b will fill only the initial portion of the address space allocated to that slot and the rest will be undefined.

Referring to FIG. 5d, there is shown a memory tree structure 91 where two domains A and B share memory. Ignoring page key 92 for the moment, such a structure could arise by domain A passing a read-only copy 93 of segment key 94 to domain B so that domain B could see, but not write over, the data or program in the memory segment defined by segment key 93. Domain B could then put its copy 93 of segment key 4 anywhere in its memory tree that it had an empty space of the right size. The page key 92 is included only to show that a single page P can be used more than once in the address space of a domain B. At least two more sophisticated forms of memory sharing are discussed below in the context of segment keepers and factories.

Referring to FIG. 5e, there is shown the structure of the special segment node called a red segment node 96. Red segment nodes solve three types of problems: windowing, defining address spaces that have a size not equal to a power of 16, and defining a process for resolving memory faults. Slot 15 of the red segment node 96 is a data key called the format key 97. The format key 97 defines which of the remaining slots of the segment node are used for what purpose. Each of the parameters in the format key 97 fills 4 bits.

INTL is the number of "initial" slots (i.e. starting with slot 0) that define the address space of the segment. These initial slots can hold segment, page and window keys. WSSC is the slot size code of the memory segments defined by each of the initial slots. As stated above, segment keys pointing to red segment nodes have an SSC equal to zero. Thus the WSSC is a substitute for the SSC normally specified in data byte of the segment key pointing to the segment node. BKRND is the slot number of the background key, the purpose of which is explained in the discussion of segment keepers, and equals 15 if there is no background key. KPR is the slot number of the segment keeper key for this node (see discussion of segment keepers below), and is equal to 15 if there is no segment keeper defined for this node. MTR is the slot number of the meter key, if any, for this node (see discussion of meters below) and is equal to 15 if there is not meter defined for this node. PN is a bit flag which, if on, causes a call to the segment, which is effectively a call to the segment's segment keeper, to pass as the second key parameter to the segment keeper a node key to the segment node.

Window keys 98a-98b have two formats, both of which are data keys. When WTYP equals 2, the segment defined by the key 99 in slot number SLT is the one that is windowed. When WTYP equals 3, the background key defines the segment that is windowed. Furthermore, window keys with WTYP=3 can be used in either red or black segment nodes that are lower in the memory tree than a first red segment node 96 to refer back to the background key defined in the first red segment node 96. The background key used will be the one closest to the window key that is at the same node level or higher in the memory tree.

For either type of window key, the window starts at page number OFFSET within the memory segment and has a size of $16^{WSSC}$ bytes. Generally WSSC must be less than or equal to the SSC of the segment key (e.g., key 99) which it is windowing, since the window must be smaller than the memory segment defined by the segment key 99. Also, OFFSET should be equal to a multiple of $16^{WSSC-3}$. The slot SLT referenced by the window key 98a can be one of the initial keys but is typically in one of the lower slots, as shown in FIG. 5e.

The red segment node 96 defines an address space which has a size equal to the number of slots used for memory (i.e. segment or page) keys times the slot size defined by WSSC. Thus the size of the address space will not be a power of 16 (unless only one initial slot is used). For example, as shown in FIG. 5e, a red segment with only four initial keys (i.e., INTL equal to 4) and a WSSC equal to 4 has a segment size of 256k bytes. As one skilled in the art will see, a memory segment of any preselected number of pages can be defined by using one or more layers of red segment nodes.

An example of revocable memory sharing is shown in FIG. 5f. Domain A shares part of its memory with domain B but retains the right to revoke its sharing by: buying a node 101, putting in node 101 a key 102 to the shared memory 103, and giving domain B a segment key 104 to the segment node 101. Domain B will place this key 104 into an appropriate slot in a segment node 106 of its memory tree. Normally this segment key 104 will be read-only unless domain A intends domain B to write into the shared memory area 103. Note that since domain A owns a node key 105 to node 101 it can give domain B a weakened version of that key 105, such as a read-only segment key 104. To revoke the sharing, domain A need only delete the segment node 101 or erase the key 102 in the segment node 101 to the shared memory 103.

In the preferred embodiment, the hardware addresses physical core memory 24 for a particular virtual address space by reference to segment and page tables 28 into a dedicated area of core 24. Furthermore, each domain contains in its DIB 119 a pointer to a STOT, which is a table of the segment tables used by the domain. The exact scheme involved is not important to the invention so long as each segment node, core table entry and domain contains a reference to the proper tables needed by the hardware.

In the preferred embodiment, segment keys in a memory tree can be replaced by node keys, fetch keys and sense keys. Any key performing the function of a segment key is also called a "segmode" key. The structure of the data byte of all segmode keys is the same as shown in FIG. 5b for segment keys. Sense keys used as segmode keys always are read-only and nocall. As will be explained in the discussions on segment keepers and virtual copy segment keepers, the use of segmode keys enables one domain to use a memory tree solely for accessing its virtual address space (with no access to the keys in the segment nodes in the tree), while a second domain (e.g., a segment keeper) uses the memory tree as a tree of nodes whose keys can be read and, if the segmode key is a node key, replaced with other keys.

Derived Information Blocks (DIBs). The derived information block (DIB) 119, as shown in FIG. 6, is a special array used to provide fast access to important parameters used by active domains. Every domain that currently has recently had a process in it, and whose root node is still in core (i.e., has not been swapped out due to system congestion or some other condition), has a DIB 119. The location of the domain's DIB 119 is specified in the node header 62 of the domain's root node 12. Use of a DIB-type facility greatly reduces the overhead involved in multitasking by avoiding the need to recompute certain parameters needed every time a domain is restarted after waiting on a queue and by accounting for certain potential changes to the domain's state while the domain was waiting for system resources.

The first 60% of the DIB 119 comprises slots for storing the values of the CPU registers REG0-REG15 and FLT REG0-FLT REG6 in a form ready for fast loading into the CPU registers (e.g. each time the domain resumes operation after waiting on a queue for system resources). The PSW is the address of the next instruction in the domain's process to be executed. The CPU, memory and pagefault caches contain a parameters indicating how much CPU time, memory usage (e.g., core-page-microseconds) and page i/o the domain can use before it will fault and have to call its meter for more resources. SEGTABLE is a pointer to the segment table for the domain. CHG SET is a pointer to the charge set for the domain. The charge set, which defines how much system resources have been used, can be used by many domains which belong to a single user or a set of users from group of users which pays for system resource use jointly. The root node, regs node and keys node parameters are the absolute addresses of these nodes in core memory. The READY BITS include several flags including: BUSY, indicating if the domain is not now available for entry by another domain; DEBUG, indicating if the system debug hardware should be turned on when this domain is running; STALE, indicating if the cache values were changed while the domain was not running in the CPU and thus need to be updated by reference to the domain's meter; MONITOR, indicating that certain software maskable interrupts (typically caused by accessing certain predefined address locations, and used to monitor the amount of activity in a particular section of code) should invoke the domain's domain keeper (see discussion of domain keepers below); and HOOKED, indicating that this domain is in a queue.

Faults and Keepers. An important feature of the invention is the use of additional domains to respond to system "faults". Faults are error conditions that, if not remedied, will result in the termination of the process in a domain. For the purposes herein, these faults are divided into three classes: meter faults, wherein the domain exhausts its authorized quota of system resources; segment faults, wherein the domain attempts to read a page that is not defined or attempts to write on a page for which the domain has read-only access; and system or domain faults, wherein the domain encounters a divide-check or similar hardware error or where one of the other types of faults is not successfully resolved.

For each type of fault, the system provides the ability to define a "keeper". Each keeper is a domain with a process than can either resolve the fault that triggered a call to the keeper or, in the last resort, can gracefully terminate or suspend the process in the domain. Thus for meter faults there is provided a meter keeper, for segment faults there is provided a segment keeper, and for other faults there is provided a domain keeper. As shown in FIG. 7, slot C1 of domain A contains a key to the domain's meter 121 (which is a node containing a key 121c to a meter keeper 123), slot C2 contains a key to a domain keeper 124, and slot C3 contains a key to the domain's memory tree 125.

The memory tree 125 in FIG. 7 can contain one or more red segment nodes 126 and 127 having keys 128 and 129 to segment keepers 131 and 132 (see FIG. 5e showing a red segment keeper). Faults in node 133 and pages 134 and 135 invoke segment keeper 131, while faults in pages 136 and 137 invoke segment keeper 132. Generally, a fault in any node or page invokes the closest segment keeper to that node or page which is not any lower than it in the memory tree. Furthermore a nocall type key to any segment node or page deactivates only those segment keepers lower in the memory tree than the nocall type key. Referring back to FIG. 5f, if key 104 to node 101 is a nocall type key, then segment keeper 107 is deactivated insofar as domain B is concerned but not insofar as domain A is concerned. Furthermore, segment keeper 108, which is presumably loyal to domain B, will be invoked if there is a page fault while domain B is accessing the shared memory 103; but segment keeper 109 will be invoked if there is a page fault while domain A is accessing the shared memory 103 (assuming that the memory path went through node 110 and not node 101).

When a domain is first formed (see discussion of domain creators below) it does not have a domain keeper key, it does not have a meter key, and it does not have a memory tree nor a segment keeper. It is up to the domain which is setting up the new domain to create and/or provide access to a meter and to keeper domains by means of the appropriate keys. For instance, without a meter the domain will not be able to run a process because as soon as the process it is started there will be a meter fault-caused by the lack of any resources being allocated to the domain.

The rationale behind the use of keepers is that they permit the user to explicitly handle faults and to handle them in the way best suited for his needs. Furthermore, it makes possible certain types of memory sharing which would otherwise be difficult (see discussions of copy-on-modify and multi-processor data-base sharing below).

Since keepers are also domains, they too can have meters, meter keepers, segment keepers and domain keepers. Generally, though, most systems incorporating the invention will provide copies of well-debugged keeper programs for general use and therefore will rarely be more than two layers of keeper domains: the users custom-designed keeper and the general use keeper as the ultimate backup.

Referring to FIG. 8a there is shown an example of the use of segment keepers to implement the sharing of a data base by two domains running in separate CPUs. For the purpose of this example it is assumed that the two CPUs are sufficiently far away from one another that they cannot share memory. Both domain A and domain B have a memory tree including a red segment node 111a and 111b, memory pages 112a and 112b that are not shared and memory pages 114a-115a and 114b-115b that are shared (i.e. share a common data base 113). The goal of the system is to allow both domains to share the common data base 113, allowing both domains to both read and write into the data base without causing either to read out-of-date data, and at the same time to minimize data transfers between the two systems. It is assumed that the two systems are linked together by a network such as Tymnet where there is a charge dependent on the amount of data transmitted.

Assume that at time zero both domains have identical copies 113a and 113b of the data base 113 and that the both have read-only keys to each of the shared pages 114 and 115. When one domain (e.g., domain A) tries to write onto a page (e.g., 114a) in the date base a page fault occurs because the domain's key to the page is read-only. This causes an implicit jump to its segment keeper 116a. The segment keeper 116a in this example has the authority to write into any page in the data base 113a. First the segment keeper 116a sends a message to the segment keeper 116b of the other domain, causing it to zero out domain B's page key to page 114b, thereby preventing domain B from reading that page until it gets an updated copy. Then the segment keeper changes domain A's page key to page 114a into a read-write key and returns control to domain A. Domain A does not even know that anything has interrupted the flow of its process, unless it inspects the system clock and notices how much time passed. Now domain A can write into and update the data in page 114a without further interruption.

The read-write status of domain's A key to page 114a is not changed and a copy of the updated page is not sent to domain B until domain B attempts to read page 114b. This causes a page fault because page 114b is no longer defined in domain B's address space (because the key to the old version of page 114b was zapped by segment keeper 116b when domain A first wrote into its page 114a). The page fault causes an implicit jump or transfer of control to segment keeper 116b. Segment keeper 116b responds by sending a message to segment keeper 116a requesting a copy of page 114. Segment keeper 116a responds first by changing domain A's page key to page 114a into a read-only key and then sending a copy of the page to segment keeper 116b. Segment keeper 116b puts the data into a new page 114b and gives domain B a read-only page key to it in the proper place in its memory tree. The system has now returned to the original status quo.

As will be appreciated by those skilled in the art, the arrangement described minimizes data transmission between the two CPUs by sending data only when one domain tries to access data that has been updated by the other domain. Furthermore, the arrangement assures that neither domain can access invalid old data by first disabling access to the data by one domain before allowing the second domain to update it, and by disabling write access to the data by one domain before sending the second domain a copy of the updated data. This arrangement is easily extended to a multiple (i.e., more than two) CPU system merely by causing a write access by one domain to be preceded by the zapping of the corresponding data in all the other domains, and by causing a read access by any domain to an updated page to be preceded by the disabling of write access to the updated page by the domain that had write access to it.

Referring back to FIG. 7, consider how the system 21 handles a page fault caused by an attempt by domain A 11 to access data in a page whose page key (e.g., page key 138) is unprepared because page 134 is not in core. The page fault is resolved by the kernel, not the segment keeper 131, by bringing the page 134 into core and preparing the key 138. This situation is to be distinguished from the situation where slot 139 in segment node 133 is empty. Thus the terms memory fault and segment fault are used herein to refer to (1) faults caused by references to addresses undefined by the memory tree and (2) faults caused by attempts to write on read-only segments or pages, but not references to unprepared memory keys. If slot 139 in segment node 133 is empty and domain A attempts to access data in that part of the domain's address space defined by slot 139, then the kernel will cause an implicit jump to the segment keeper 131, passing to it as parameters a node key to red segment node 126 (i.e., the node containing the key to the invoked segment keeper 131) and the address (i.e., the address relative to the red segment node 126) of the page which caused the fault. Segment keeper 131 must find, or compute or otherwise come up with a page, according to some predefined process, and put a page key to it in slot 139. However, in order to be able to write a key into any slot of node 133, the segment keeper 131 must have access to a node key to node 133. As stated above in the discussion of keys, segment keys give their owner only the ability to access the data (i.e., the contents) of the segment addressed thereby, not to change the contents of the slot in the segment node addressed by the segment key. One resolution of this apparent difficulty to use a node key in red segment node 126 to access segment node 133 instead of a segment key. In other words, whenever a segment keeper is going to be used, node keys are used wherever segment keys would have been used in the part of the tree under the segment keeper. These node keys are called segmode keys (as are fetch keys and sense keys when used instead of segment keys) and have a data byte with said structure as shown for segment keys in FIG. 5b.

The use of segmode keys enables one domain to use a memory tree solely for accessing its virtual address space (with no access to the keys in the segment nodes in the tree), while a second domain (e.g., a segment keeper) uses the memory tree as a tree of nodes whose keys can be read and, if the segmode key is a node key, replaced with other keys. The type of authorized access (i.e., the nature of the capability) to the memory tree by either domain A or any another domain using the red segment node 126 (e.g., in a memory sharing arrangement) to define a virtual address space (or a portion thereof) can by narrowed by using a segment key to access red segment node 126. Thus the key in slot C3 to the memory tree will generally be a segment key even if the other "segment keys" in the memory tree are really node keys. Furthermore, the true nature of the segmode keys in the memory tree is unknowable to the domain A because of the limited authority conveyed by the segment key to node 126. But a segment keeper 131 with a node key to the red segment node 126 can access and replace the keys in memory tree 125. Such a memory tree can be constructed either by initially setting up a segment keeper 131 and an empty memory tree defined by red segment node 126, with segment keeper 131 programmed to build memory tree 125 as domain A accesses it. Alternately the builder of domain A (see discussion of domain creators below) could build the tree itself by explicitly buying the nodes and pages from a space bank (see discussion of space banks below) and then putting a segment key to the memory tree 125 in slot C3.

An alternate solution to the problem just discussed is to continue to use segment keys to define the memory tree 125 but to have the segment keeper 126 retain node keys to each of the segment nodes in the portion of the memory tree under its jurisdiction.

Referring to FIGS. 8b, there is shown an example of how segment keepers can be used to implement a copy-on-modify facility. The situation is that domain A wants domain B to be able to read and use, but not modify, its memory tree 151. The process defined in the memory tree 151 includes variables whose addresses are in many locations throughout the memory tree 151, but there are also many pages that either include no variables or which will not be used by domain B. Therefore domain B would like to use the process without having to duplicate the whole tree.

One solution is to arrange for a segment keeper 152 that will duplicate only those pages in the memory tree 151 that domain B tries to write into. This is called a copy-on-modify arrangement. To set it up, domain A sends domains B a sense key 153 to its memory tree 151. The sense key will allow domain B to fetch a weakened version of the keys in node 154: fetched page keys will be read-only; fetched segment keys will be read-only and nocall; and fetched data keys (such as the format key) are unchanged.

Domain B puts the sense key 153 in a red segment node 155 in its memory tree 156 as a "background key" (see discussion of red segment keys above). The implicit nocall parameter of the sense key will prevent any segment keepers (e.g., segment keeper 157) in domain A's memory three from being invoked by page faults caused by domain B. Using its sense key 153, domain B can determine the size of the address space defined by node 154 and, using that information, construct the number of window keys 155x needed to define the same address space with node 155. Assuming that the size of the address space defined by segment key 153 is 10 Megabytes, the WSSC in red segment node 155 will be equal to 5 (thereby making each slot size 1 Megabyte). Ten window keys W0-W9 (with offsets of 0 pages, 256 pages, 512 pages, etc., respectively) will be needed in the initial slots 155a-155j of node 155 to define the address space. Also, there must be set up a segment keeper 152 referenced by red segment node 155.

Segment keeper 152 will be programmed to resolve page faults caused by domain B trying to write onto pages to which it has read-only access by: (1) buying nodes and/or pages to be added to domain B's memory tree at the addresses that cause the fault; (2) copying the old pages into the new pages; and (3) substituting the new pages for the old pages in domain B's memory tree 156 by replacing the old memory keys in the memory tree 156 with new keys giving domain B read-write access to the duplicated pages. For instance, if domain B tries to write into page P2-1-4 158, the following steps will be taken. The page fault will invoke segment keeper 152 which will see that the page 158 is addressed by the window key W2 in slot 2 155c of red segment node 155. The segment keeper 152 will buy a new node 161, which will be treated as a black segment node, and put a node key WRS2 (with SSC=4) to segment node 161 in slot 2 of red segment node 155. It will then fill all 16 slots of node 161 with window keys W2-0 to W2-15 (with offsets of 512 pages, 528 pages, 544 pages, . . . 752 pages, respectively) referencing the background key 153 in red segment node 155 (by setting WTYP=3) and exit to the domain B.

Upon exiting to domain B, the page fault will again occur and the segment keeper 152 will be called again. The procedure in segment keeper 152 will be repeated, but one layer lower in the memory tree 156. This time the segment keeper 152 will see that page 158 is addressed by the window key W2-1 in slot 1 of segment node 161. The segment keeper will buy a new node 162, which will be treated as a black segment node, and (using node key WRS2 to node 161) put a node key WRS2-1 (with SSC=3) to segment node 162 in slot 1 of node 161. It will then fill all 16 slots of node 162 with window keys W2-1-0 to W2-1-15 (with offsets of 528 pages, 529 pages, 530 pages, . . . 543 pages, respectively) referencing the background key 153 in red segment node 155 (by setting WTYP=3) and exit to the domain B.

Upon exiting to domain B, the page fault will again occur and the segment keeper will be called again. The procedure in segment keeper 152 will be repeated, but this time at the lowest level in the memory tree—the page level. The segment keeper 152 will see that the page 158 is addressed by the window key W2-1-4 in slot 4 of segment node 162. The segment keeper 152 will buy a new page 163, copy the contents of page 158 into it, and (using node key WRS2-1 to node 162) put a read-write page key WRP into slot 4 of node 162. This time, when the segment keeper 152 exits to the domain B the fault will not recur and domain B will be able to proceed with its process. When other page faults occur during domain B's process, domain B's memory tree 156 will be expanded using the above described method-duplicating only those pages that domain B needs to write on.

Segment keepers allow domains to minimize memory usage by waiting to allocate memory until it is first used. When a domain is firt formed or first swapped in it can initially be given just the bare skeleton of a memory tree. Upon the occurrence of a memory fault the segment keeper can "buy" nodes and pages from a space bank (discussed below) and/or perform a program to compute or retrieve or otherwise produce the pages needed to resolve the memory fault, as the situation warrants.

Another important aspect of segment keeper usage is that it allows data to be retrieved, computed, or otherwise obtained through the use of any predefined process upon the occurrence of a page fault. This allows a domain to delay the performance of the process used to obtain the data until the data is needed. Furthermore, since page faults result in implicit jumps to the domain's segment keeper, the domain need not be concerned with the process required for obtaining the data and will automatically restart when the segment keeper finishes its task. This provides a clean division of tasks with a minimum of overhead.

Domain keepers are usually invoked only when something happens that was not anticipated by the process in the domain. An indication of what went wrong, called a trap code, is put by the kernel into slot C5 (see FIG. 1) of the domain's root node before control is passed to the domain keeper. Referring generally to FIG. 7, when the implicit jump is made to the domain keeper, the domain keeper obtains both a domain key and an exit key to the domain. Since the domain key gives the domain keeper access to all the capabilities of the domain, the domain keeper must be completely trusted. Using the domain key, the domain keeper reads the trap code in slot C5 and determines what action to take. If the cause of the fault is repaired or avoided, the process in the domain can be restarted using the exit key. Otherwise the domain keeper will terminate the process in a predefined manner. Since the domain keeper has a domain key to the trapped domain and the author of the domain keeper is free to use all of the domain's capabilities, the author of the domain keeper's process is free to design any response to any type of fault that is within the capabilities of the domain.

If there is a memory fault and the domain's memory tree includes no segment keeper for the segment wherein the fault occurred, then the virtual address that was being referenced is placed in the right-hand four bytes of the trap code and an error code, indicating the type of memory fault that occurred, is placed in the other two bytes of the trap code. The non-zero value of the trap code causes an implicit call to the domain's domain keeper.

Meters and meter keepers are mostly useful in systems where users will be charged for their use of the system's resources. If this is no concern, then meters and their keepers can probably be dispensed with. However, one useful function they would still serve in such an environment would be to constrain "runaway" domains from hogging system resources or from getting stuck in an infinite loop. Naturally, there are alternative methods of dealing with runaway domains.

In the preferred embodiment, a domain cannot run a process unless it has a meter allocating resources to it. The three types of resources which are metered are: CPU usage (in units of CPU microseconds), memory usage (in units of page-microseconds), and channel usage (in units of pages transferred between core and disk). In general, domains are charged only for resources used in the process of performing useful functions, not for time spent performing system overhead functions, but resource usage by any particular process will usually still be somewhat dependent on what else is going on in the system at the time.

Referring back to FIG. 7, the general scheme for meters is that every domain (e.g., domain A) has an immediate meter 121, and the meters are linked in a hierarchial meter tree 141 or chain with a master meter 142 at the top of the the tree. Whenever a domain has a cache fault, the kernel allocates a predetermined portion of the domain's meter resources to the domain. Resources are added to the domain's CPU, memory and pagefault caches (see FIG. 6) and subtracted from the corresponding resource caches in every meter in the tree at and above the level of the domain's immediate meter 121 (see FIG. 7). for example, if meter 142 has 5000 units of CPU time in its cache, meter 143 has 1000 CPU units in its cache and meter 121 has 100 CPU units, then when domain A has a meter fault and acquires 5 CPU units for its own CPU cache those 5 units will be subtracted from each meter 121, 143 and 142 (leaving master meter 142 with 4995 CPU units, meter 143 with 995 CPU units, and meter 121 with 95 CPU units). Note that the meter cache values need not monotonically increase as one proceeds up the meter tree. The first meter to be exhausted may not be the lowest meter in the tree. In fact, as discussed below, the higher lever meters must be exhausted in order that the policies incorporated in the programs of the higher level meter keepers be carried out.

When a meter runs out of resources the kernel invokes the meter's meter keeper. The meter keeper can then invoke whatever policy has been programmed into its process to decide how to treat the meter fault. For instance the meter keeper, which receives from the kernel a node key to the meter causing the fault and an exit key to the domain which was interrupted by the meter fault, could just add more units to meter caches and exit back to the domain that was interrupted. Alternately it could terminate the process in the interrupted domain or could delay its restart for a while so that certain other domains can get more CPU resources in the the mean time. The design of the meter keeper process is limited only by the capabilities of the meter keeper and the imagination of the author of the meter keeper's process. The use of a tree of meters allows the design of complex meter policies useful for system management.

In the preferred embodiment, in order for a meter to "run out" of resources, all the domain's under that meter must be out of resources. Thus when a meter first appears to run dry (i.e., when any cache in the meter is zero) a "scavenge" routine in the kernel searches the meters lower in the tree, if any, and in the DIBs of the domains dependent on those meters and takes as much of those resources as necessary. Referring to FIG. 7, if meter 143 appears to run dry, the scavenge routine will first look in the meters 121 and 144 (using the doubly linked list of meter keys to node 143 to find all such meters) to see if they have any resources. If they do, it will take what it needs. If not, it will then search in the DIBs of the active domains which are dependent on the meter 143. If it finds resources in any such DIB it takes the resources, subtracting what it takes from the DIB's corresponding cache and setting the DIB's STALE flag so that when the DIB's domain is restarted the kernel will know that its resource caches have been depleted in the interrum and will therefore need replenishing. If there are no caches in DIBs below this meter 143, then the DRYMETER flag in the meter's node header 62 (if FIG. 4) is turned on to prevent the scavenge routine from unnecessarily performing a search in this part of the meter tree 141.

In the preferred embodiment, a red segment node may be made to depend on a meter so that the storage resources associated with the node (i.e., the segment associated with the segment node) can be treated separately from the other resources used by a domain with access to that node (see meter key shown in FIG. 5e).

Space banks. Space banks are special domains that allocate and manage memory resources. Space banks provide fresh pages and nodes to domains and accept nodes and pages for recycling. As part of the system there are provided primordial (also called official) space banks, which, among other things, can be can be trusted. A space bank transformer function can be used by domains having a corresponding key to create new space banks that have access to more limited resources or which can automatically reclaim all nodes and pages previously sold thereby.

Primordial or official space banks obey predefined commands and provide basic storage resource allocation services. Space banks are in a position to institute policies that segregate some classes of storage on special real-storage devices. For instance, if it were felt desirable to put one customer's storage on an especially reliable type of disk, that customer would be given access to a space bank that would allocate his space there. Other storage attributes that might provide grounds for segregation include physical backup, speed, and busyness (access conflicts). Some space banks may provide pages that are safer than others (e.g., the pages may be stored on inherently more reliable equipment). Other space banks may provide pages with the attribute that "write verification" is performed when they are written.

A user may create his own space bank, which will be used as an intermediary to, for example, ratio pages, sell pages, lease or rent them, or otherwise implement a storage utilization policy. The same goes for nodes. This fits the general scheme of the invention, wherein each type of policy and the process for implementing it is placed in a well defined part of the system and is also segregated from other domains responsible for carrying other distinct policies.

Gate Jumps. Referring generally to FIGS. 9a and 9b, gate jumps are used when a domain needs to call other domains for services that the first domain cannot provide. Sometimes this is because the second domain has access to data or to a particular computer program that the first domain does not have access to. For instance, gate jumps can used by a first domain to call a subroutine in a second domain. Another example is a domain that runs a data base service for other domains.

For the purposes herein, domains are always in one of three states: ready, running and waiting. While a process is in a domain it is running. After a process leaves domain A by calling domain B, but before the process returns, domain A is said to be waiting. After a process in a domain B is done and it returns to the domain A that called it, the domain B is said to be ready (i.e., for someone to call it).

While a domain is running or waiting it is said to be busy and a flag is set in slot C13 of the domain's root node to ensure than no new process will enter the domain until it is finished with the process it is currently handling (i.e., until it becomes ready). When a domain is ready, slot C13 of the domain's root node contains a data key with a data value of zero. If C13 contains a data key with a non-zero data value then the domain is running or waiting; if C13 contains a hook key the domain is either running, but waiting on a queue for CPU or other resources, or is stalled (i.e., waiting for a domain that is not ready). The hook key either points to the queue header of the queue it is on, or to the root node of the domain that it is stalled on.

There are two types of gate keys: entry keys and exit keys. Entry keys give their holder the authority to transfer a process to a ready domain. Exit keys give their holder the authority to return a process to the domain that initiated the transfer of the process to the holder of the exit key. For any particular gate jump, the domain that invokes the gate key is called the "jumper" and the domain designated by the gate key is called the "jumpee". In the preferred embodiment the data byte in entry and exit keys is used to distinguish between several subtypes of entry and exit keys. The distinctions between the several types of entry and exit keys are explained below.

There are three kinds of gate jumps: calls, returns and forks. A call leaves the caller in a waiting state. A return leaves the jumper in the ready state. A fork leaves the jumper in the running state. Forks are used for starting up a second process in another domain without stopping the process in jumper, thereby increasing the number of processes in the system.

Either an entry or an exit key can be used with any of the three types of gate jumps. Normally, one calls an entry key and returns with an exit key. However, one can return with an entry key, thereby leaving the jumper ready. Referring to FIG. 9b, this is useful when a domain B wants to return to the domain A that called it indirectly through a domain C. It does this performing a return to domain C, passing to domain C exit key to domain A, whereby domain C will return to domain A instead of domain B. In this example, only domain B need known that anything about the gate jump scheme used.

Initially, it may not appear very useful for a jumper to call an exit key because that would appear to leave the jumper in a waiting state without any domain set up to return to it, but can be used for setting up co-routines where the domain being called is set up to accept an exit key back to the caller. Similarly, a fork with an exit key can be used by a domain B to return a message to the domain A that called it without stopping the process in domain B.

Like most other keys, entry and exit keys can be either prepared or unprepared. For entry keys the determination of whether the key is obsolete is performed in the same manner as described in the above discussion of prepared and unprepared keys: the ALC allocation count parameter of the entry key is compared (e.g., when it is being prepared) with the ALC of the domain's root node. If the ALC values match then the entry key is still valid, otherwise it is obsolete (i.e., the key refers back to a domain that no longer exits and whose nodes have been recycled).

For exit keys, the determination of whether the key is obsolete is slightly different. The ALC parameter field of unprepared exit keys is called the CALLCOUNT parameter. Referring temporarily back to FIG. 4a, the CALLCOUNT parameter 64 of a domain A is stored in the node header 62 of the domain A's root node and is incremented every time domain A invokes an entry key to transfer a process to a different domain B, unless there are no unprepared exit keys deriving from the current CALLCOUNT value. When an exit key is invoked all the other prepared exit keys to the same domain are automatically zeroed by the kernel, using the doubly linked list of keys pointing to the domain's root node. If all the exit keys deriving from the current CALLCOUNT value are still prepared, then they are all zeroed by the kernel when one of the exit keys is invoked and there is no need to increment the CALLCOUNT the next time the domain invokes an entry key. If, however, there were ever any exit keys deriving from the current CALLCOUNT value which were unprepared (e.g., stored on disk), then the CALLCOUNT will have to be incremented because there may still be one or more unprepared copies of exit keys to the domain with the old CALLCOUNT value in the system. As explained in the above discussion of node frame headers, the CALLCOUNTUSED flag in the domain's root node header 62 is used by the kernel to indicate whether an unprepared exit key to this domain has existed with the current CALLCOUNT.

The CALLCOUNT is also incremented whenever the domain is deleted and the node is recycled, thereby preventing "coincidental" references by an obsolete exit key to a new domain which could potentially occur if the CALLCOUNT were reset to zero when the domain is deleted. When a unprepared exit key is prepared, its CALLCOUNT is compared with the CALLCOUNT of the domain A. If the values match then the exit key is valid. If the values do not match then the exit key is obsolete and is zeroed by the kernel. Thus if domain B manages to keep a copy of the exit key to domain A after it returns control to domain A (e.g., by passing a copy to another domain C that is swapped out of core before the exit key is invoked and then copying the key back from domain C after invoking the exit key), domain B will not be able to reinvoke that exit key again in the future. In summary, the CALLCOUNT parameter not only prevents references by exit keys to obsolete domains but also prevents domains from using copies of exit keys that have already been used.

When domain A performs a call to domain B, domain B is automatically passed an exit key back to domain A so that it can later transfer control (i.e., the process) back to domain A. As shown in FIG. 9b, the transfer of control back to domain A may be indirect: domain B may pass the exit key 171 to domain A to domain C by performing return to domain C (instead of a call), which will then exit directly back to domain A.

In the preferred embodiment there are three basic types of exit keys: return exit keys, fault exit keys, and restart exit keys. The kernel determines which type of exit key is created, and labels the key as such by providing a predefined value for the key's data byte.

Return exit keys are the normal type of exit key which is issued when a domain performs an explicit call jump. It may be used by the jumpee domain or his deputy to return control to the jumper and to return some parameters, as described in more detail below.

Referring to FIG. 7, a fault exit key is issued by the kernel when a domain's segment keeper is called by the kernel as a result of a memory fault. A fault exit passes only one parameter back to the domain that caused the fault: a trap code, which is put in slot C5 of the domain's root node 12, indicating whether the memory fault was successfully resolved. A zero trap code value indicates the segment keeper successfully performed its task. Any non-zero trap code value will cause the domain to immediately trap to its domain keeper when the domain is restarted. The trap code value can be used by the segment keeper to communicate to the domain keeper the nature of the problem that prevented the segment keeper from successfully resolving the memory fault.

Still referring to FIG. 7, a restart exit key is issued by the kernel when there is an implicit jump to either the domain's meter keeper 123 or domain keeper 124. A non-zero trap code in slot C5 of the domain's root node 12 causes an implicit jump to the domain's domain keeper 124. The domain keeper also automatically receives from the kernel, in addition to the restart exit key, a domain key to the domain that suffered the fault. The expiration of a cache in a meter 122, caused by a domain 11 trying to use the expired resource, results in an implicit jump to the meter's meter keeper 123. In both cases, the keeper domain 123 or 124 is given a restart exit key to the domain 11 that caused the fault. The restart exit key can be used to restart the program but not to pass parameters back to the domain 11.

Referring now to FIGS. 9c and 9d, explicit gate jumps are generally accompanied by the passing of parameters from the jumper to the jumpee. The parameters that are passed can include both data and keys. The designation of which parameters are to be passed is controlled by an exit block 178 in the jumper. The designation of where to put the parameters received in the jumpee's domain is controlled by an entry block 179 in the jumpee. Thus the terms exit and entry in this context (i.e., in the context of parameter control blocks 178 and 179) are somwhat different than used in the context of gate keys: the exit block 178 is used to designate the parameters being sent by the jumper regardless of whether the jumper is using an exit key or an entry key and regardless of the type of gate jump being used; the entry block 179 is used by the jumpee regardless of the type of gate key used by the jumper and regardless of the type of gate jump used by the jumpee.

In the preferred embodiment, the jumper can pass to the jumpee up to to four keys and a block of bytes, from either the domain's address space or the domain's registers. The jumper also passes to the jumpee an order or return code. Furthermore, the jumpee can, at its discretion, read the data byte of the gate key used to make the jump, usually to determine the type of entry key used—as explained below in the discussion of factories.

Order codes are generally used in conjunction with the invocation of an entry key to indicate to the jumpee the type of action or function the jumper wants the jumpee to perform. Return codes are generally used in conjunction with the invocation of an exit key to indicate to the jumpee whether the jumper successfully performed the action requested by the jumpee, or, if not, the type of problem that was encountered. In both cases, the order/return code 181 is found in general register 1 GR1 of the jumper.

Referring to FIG. 9c, the exit block 178 of the jumper is stored in general registers 0 and 1 GR0 and GR1 of the jumper. GR1 contains the order/return code 181.

Each register is 32 bits long, and each letter or symbol in the figure represents one bit. The letters $M_0M_1M_2M_3$ are mask bits, each indicating whether there is a corresponding key to be passed to the jumpee. If the mask bit $M_i$ is on (i.e., equal to 1) then the corresponding $KKKK_i$ parameter indicates which slot in the keys register 13 the parameter key resides in. In other words, if $M_1$ is on, then the value of $KKKK_1$ indicates which slot (e.g., KKKK =0110 designates slot 6) of the keys register holds the second key parameter.

The GGGG parameter indicates which slot of the keys register holds the gate key to be invoked. The AA parameter indicates the location of the data bytes to be passed to the jumpee. If AA equals 00, then a zero length string is sent. If AA equals 01, then general registers 2 and 3 GR2 and GR3 hold the virtual address (in the jumper domain's address space) and length of the byte string, respectively. If AA equals 11, then the byte string resides in the domain's registers and GR2 and GR3 hold the address and length of the byte string within the registers. In this case, address 0 is the left byte of GR0, address 63 is the right byte of register GR15, address 64 is the left byte of floating point register FLT0 and address 95 is the right byte of FLT6.

Referring to FIG. 9d, the entry block 179 of the jumpee is stored in the first four bytes of floating register 2 FLT2. The mask parameter $M_0M_1M_2M_3$ and $KKKK_i$ parameters serve the same general purpose as the same named parameters serve in the exit block: each $M_i$ parameter indicates whether the i'th key parameter is to be accepted and the $KKKK_i$ parameter specifies which slot in the jumpee's general keys register 13 to place the key in if it is to be accepted.

The R parameter indicates if it is on to put the received parameter byte string in the jumpee domain's registers, and otherwise to put it in the jumpee domain's virtual address space. General registers GR4 and GR5 hold the address and length of the parameter byte string, respectively. That is, they designate where in the jumpee domain the passed parameters should be placed by the kernel, and the maximum number of bytes that should be stored there. If the received parameter byte string is to be stored in the jumpee's registers, the storage that holds the argument string (i.e., the designation of the address and length of the parameter string) need not be distinct from the storage that holds the parameter string. The effect is as if the argument string were entirely fetched before any part is stored.

If the C parameter is on then the order/return code sent by the jumper will be place in GR1 of the jumpee. Otherwise GR1 is unchanged. However, if the C parameter is off and the order/return code is non-zero, the jumpee's trap code is reset by putting a 2 in the left-hand byte of the trap code and putting the order/return code in the four right-hand bytes of the trap code. The non-zero trap code will cause the domain's domain keeper to be implicitly called by the kernel.

If the D parameter is on then GR2 of the jumpee is reset by putting zeros in the left-hand three bytes of GR2 and, if the gate key is an entry key, putting the value of the data byte of the gate key into the right-hand byte of GR2, and if the gate key is an exit key, putting zeros in the right-hand byte of GR2. This enables the jumpee to determine the type of gate key used by the jumper.

If the S parameter is on then the actual length of the byte string sent by the jumper is put in GR3 of the jumpee domain.

Generally, exit and entry blocks are set up, following the above described design, by running domains just prior to invoking a gate jump. Entry blocks are also set up by running domains just before they turn themselves off or become dormant so that they will be ready for another domain to jump to them in the future. The command in the domain's program just after the gate jump command should be the first instruction to be executed when the domain is restarted. The address of this next command will be preserved in the domain's PSW in slot C4.

When a domain attempts to jump to a domain that is busy (i.e., running or waiting) the jumpee must wait until the jumpee becomes ready. In this circumstance the jumper is said to be "stalled". A hook key is placed by the kernel in slot C13 of the jumper's root node pointing to the jumpee domain. If several domains are stalled on a single domain, the stalled domains form a queue represented by their order in the doubly linked list of keys pointing to the jumpee's root node. If any of the stalled domains is swapped out to disk to relieve congestion in the system, the X-QUEUE flag (see FIG. 4a) in the jumpee's root node is turned on to remind the kernal to retrieve the stalled domain from disk when the jumpee becomes ready. In the preferred embodiment, the jumper becomes stalled if the jumpee is busy even if the gate jump is a fork. In other embodiments the jumper could be allowed to continue its process after invoking the fork by having the kernel save a copy of the parameters being passed to the jumpee. Also, in the preferred embodiment the prepared keys to a domain root are segregated on the back-chain into three groups: hook keys, exit keys and other keys. The MIDPT parameter in the jumpee domain's DIB (see FIG. 6) points to the first hook key in the chain, if any, and the other end of the hook chain (where new stallees are added) is pointed to by the B-LNK of the root's node header.

In the preferred embodiment, a call jump to a red segment node is treated by the kernel as a jump to segment keeper whose key is held in the red segment node. This feature, which is mostly just a convenience, is demonstrated in the discussion of virtual copy segment keeper factories, below.

Whenever a call jump is made, key parameter three is always a return exit key to the jumper. If the jumper tries to specify another key as this parameter its choice is overridden. All domains are responsible for setting up their entry blocks to accept key parameter three. This is can handled by establishing a convention, such as that slot zero of the jumpee's keys node is where the exit key to jumper will always be placed.

When implicit calls are performed by the kernel as the result of a fault certain parameters are automatically passed to the called keeper. Domain keepers receive, as key parameters 2 and 3, a domain key and a restart exit key, respectively to the domain that faulted. Meter keepers receive, as key parameter 2, a node key to the meter that faulted, and as key parameter 3, a restart exit key to the domain that faulted. Segment keepers receive, as key parameters 2 and 3, a node key to the red segment node in whose segment the memory fault occurred and a fault exit key to the domain that caused the fault.

Domain Creators. Domain creators are special domains that have a unique key, called the domain tool, required for creating new domains. Domain creators basically buy three nodes from a space bank, bind the three nodes together, and create a domain key from the node key to the root node. The domain tool is the only key that carries the authority to turn a node key into a domain key. It is also the only key that carries the authority to turn exit keys (except restart exit keys) and entry keys into a domain key (but only if the key points to a domain of the same brand as a specified badge key). This latter capability is used in a two-key security system described below.

Any domain with an entry key to a domain creator can request (using, for example, order code 0) that the domain creator build a new domain for it and return to the requestor the domain key to the new domain. In the preferred embodiment, most if not all domains have access to, or have the ability to acquire, an entry key to a domain creator. See the discussion of the "womb" key below.

Referring to FIG. 10a, domain A 191 calls a domain creator 192 to get a new domain X 199 by calling entry key 193 (with order code 0) to the domain creator 192. As a parameter, domain A passes to the domain creator 192 a key 194a to a space bank 194. The domain creator 192 calls the space bank domain 194 to get three new nodes 195a-c, and the space bank 194 returns to the domain creator 192 three node keys 196a-c to nodes 195a-c. To form a new domain X 199, the domain creator then puts node key 196b in slot 14 and node 196c in slot 15 of node 195a, thereby binding the three nodes such that node 195a is the new root node, node 195b is the new general keys node and node 195c is the new general registers node. The domain creator 192 then places in slot 0 of root node 195a a badge key 192a indicating the "brand" of the domain creator 192 (see discussion of domain creator creators below). Using its domain tool key 197, the domain creator 192 then creates a domain key 198 to the root node 195a from the node key 196a and puts it in one of the domain creator's general key register slots in preparation for exiting back to domain A. Finally, the domain creator 192 exits to domain A 191, passing back as a parameter the domain key 198 to new domain X 199.

In the preferred embodiment, there can be many domain creators. Each domain creator has a unique "band" which is a unique badge key given to it by the the domain creator creator (see discussion below). All domains created by a particular domain creator have the same brand and thus the same badge key in slot C0 of their root node. Furthermore, only the domain creator of a particular domain has the authority to destroy that domain or to turn an exit or entry key to that domain into a domain key. In other words, a domain creator has certain special functions that can be used only with respect to domains of its own brand. The use of these special functions is protected by a two key system: the user must have both a key to the domain creator and to the "target" domain in order to have the authority to use the function. These special functions, which can invoked by any domain with an entry key to the domain creator, are as follows.

The domain creator will verify to the caller (using order code 2) that an key E is entry key to a domain of its brand and, if so, return a domain key D to the domain.

The domain creator will verify to the caller (using order code 3) that a key E is a return or fault exit key to a domain of its brand and, if so, return a domain key D to the domain. Restart exit keys cannot be used to obtain a domain key, because that would allow meter keepers into domains where they are not welcome.

The domain creator will, at the request of a caller (using order code 1) with a domain key D to a domain of its brand, destroy domain D.

The domain creator will, at the request of a caller (using order code 1000), destroy the caller if the caller is of its brand, and exit using a specified exit key RE, thereby allowing the caller to inform another domain that the caller committed suicide.

The domain creator will, at the request of a caller (using order code 4), destroy itself if the entry key to the domain creator has destroy rights (i.e., a particular predefined data byte; see discussion of the domain creator creator below).

Since the domain creator has such powerful rights over domains of its brand, it is essential that entry keys to a particular domain creator be distributed only to domains that trust one another.

Figure 10B:
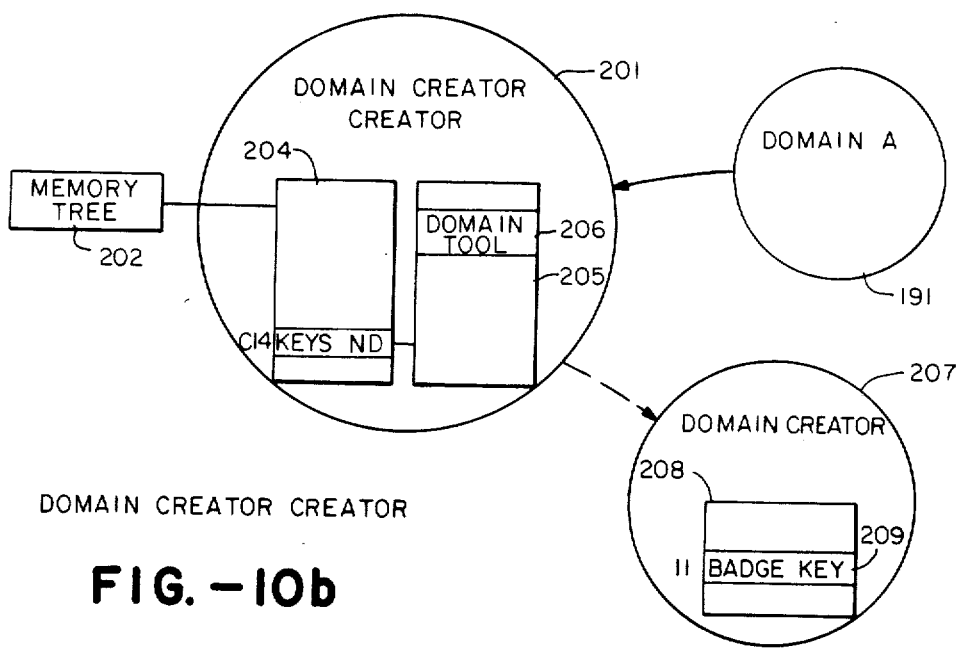
FIG. 10b is a block diagram of the process of forming domain creators.

Referring to FIG. 10b, each system has a special domain called the domain creator creator 201. This a primordial domain that exists when the system is first created; there is generally only one domain creator creator 201 in a system. The domain creator creator 201 contains a memory tree 202 with the process for creating new domain creators, a brand counter 203 in a key slot such as slot 3 of its keys node 205, and a domain tool 206 in a key slot such as slot 1 of its keys node 205. Each time the domain creator creator 201 is called to create a new domain creator 207 it calls the kernel to create a unique badge key (e.g., by incrementing the value of a brand counter) and puts it into a predetermined key slot (e.g., slot 11 of the keys node 208) of the new domain creator 207. This key 209 will be used as the badge key of all domains created by the new domain creator 207.

When the domain creator creator 201 is called by a domain A 191 to create a new domain creator 207, it passes to back to domain A 191 two entry keys 211 and 212 for calling domain creator 207, one key 211 with destroy rights and one key 212 without destroy rights. The key 211 with destroy rights can cause the domain creator 207 to self-destruct (i.e., cease to exist as a domain); the key 212 without destroy rights can invoke all the domain creator functions except this self-destruct function.

Factories. Factories are special domains designed to solve the following problem. Domain A wants to use a program residing in domain B but wants to be absolutely certain that domain B will not keep a copy of his data. In fact, domain A does not want domain B to know anything about how domain A is using the program. Domain B is willing to let domain A use his program (possibly in exchange for a royalty), but does not want domain A to be able to make a copy of the program.

In a computer system where code can be labelled "execute only", it is possible to satisfy domain B's requirement that domain A not be able to copy his program. Domain A, however, is still forced to trust domain B not to copy his data. It is usually not practical for domain A to inspect the logic of all the computer programs written by others to determine that his data is secure. In computer systems without the ability to label code as "execute only" both types of security problems (A stealing from B, and B stealing from A) exist.

Referring to FIG. 11a, there is shown a block diagram of two domain's A 222 and B 221 that want to share resources but do not trust one another. As will be explained in detail below, the following procedure allows domain A 222 to be able to use domain B's program 227 without either domain having to trust the other not to steal its proprietary information. This procedure uses special domains known as a factory creator 211, a factory 213, and a factory product 223. The goal of the procedure is to create a domain, herein called the factory product 223, to process domain A's data using domain B's program without compromising the security of either domain.

The factory creator 211 is a primordial domain whose main task is to create factories (e.g., factory 213). When the factory creator 211 is called by a "builder" domain (e.g., domain B 221) using an entry key 212 to the factory creator 211 (and passing as parameters an entry key 224 to space bank 215 and a meter key 225 to meter 226), the factory creator 211 builds a new factory 213. To build a new factory it first calls a domain creator 214 to build a new domain 213. It then calls a space bank 215 to buy additional nodes 216 and 217 and at least one page 218 for scratch pad space. It then calls the domain creator creator 201 to make a new domain creator 220, with its own unique brand, for use by the new factory 213. Next it links up nodes 216 and 217 to the factory domain 213, puts a variety of keys in the general keys node 242 of the factory 213 (see FIG. 11b and the discussion thereof below), and forms the core of the factory's memory tree with red segment node 217.

Note that all factory domains in the system are created by a single domain creator 214. This allows all factories to ascertain whether or not another domain is a factory, by calling the factory domain creator 214 and asking it to confirm that a particular key is an entry key (e.g., a requestor's key) to a factory.

After the factory creator 211 creates the factory 213 (the detailed structure of which is described below) it returns to domain B 221 a builder's key 228. Using this builder's key 228, domain B 221 puts a key to the program 227 (also called a process) that it wants to let others use into the factory 213. Domain B 221 can also put into the factory 213 any keys needed or used by the program 227 (using a procedure described below). Domain B 221 then seals the factory 213 and receives a requestor's key 229 in return. Once the factory 213 is sealed, the builder 221 cannot add any more non-sensory keys to it. Domain B 221 can give domain A 222 a copy of the requestor's key 229 so that domain A 222 can use the factory 213.

Domain A 222 uses the factory 213 by invoking its requestor's key 229 with one of several order codes. It can use the requestor's key 229 to determine if the factory 213 has any "holes" (i.e., non-sensory keys, as will be explained below) whose nature is not known to domain A 222. If the result of the hole check is satisfactory, it can ask the factory 213 to generate a factory product 223. As parameters to the factory 213 it passes a space bank key 234 to space bank 235, a meter key 236 to meter 237, and an optional wild card W key 238. The space bank 235 will be used by the factory 213 to buy the nodes and pages needed to build the factory product 223. The meter 237 will be used as the factory product's meter. The wild card key 238 is sent only if the builder 221 requires that one be provided. This wild card key 238 can be used to let the requestor 222 define one or more capabilities needed by the program 231.

After the factory product is built the requestor 222 will receive one or more keys 233 to the factory product 223. (As will be explained below, the key(s) 233 returned to the requestor 222 are actually sent by the factory product 223, rather than the factory 213.) The factory product 223 is typically a domain with a program 231 in it, the program being defined by the builder 221. However the factory product 223 can be any data structure that one can construct using this computer system. Assuming for the moment that the factory product 223 is a domain with the code for running a process, the key 233 to the factory product will be an entry key. As will be shown, domain A 222 will be able to process his data 232 using the factory product 223 without having to worry that the factory product 223 will leak a copy of his data 232 to domain B 221 or any other domain not trusted by domain A 222. Furthermore, domain A 222 will not be able to make a copy of the program 227 deposited by domain B 221 into the factory 223 because his entry key 233 conveys no authority to see that program 227. The detailed structure and workings of factories are next described.

Referring to FIG. 11b, there is shown a block diagram of a factory 213. It has a standard domain configuration including root node 241, general keys node 242, general registers node 243, meter 226 (supplied by the builder), and a domain keeper 245. Node 217 is a red segment node used as the top node of the factory's memory tree. A read-only key 246 to the factory program 219 (the program used by factory domains to carry out their defined functions) and a read-write key 247 to the scratch pad 218 are put in the top segment node 217. Node 216 is called the components node, the uses of which will be described after the basic structure of the factory 213 is explained. A node key 242e to the components node 216 is put in slot 4 of the factory's general keys node 242. A fetch key 242p to a special node called the tools node 244 is put in slot 13 of the factory's general keys node 242.

When a factory is first built by the factory creator 211, it is "virgin". Until it is sealed by its builder, it is "nascent". After it is sealed it is "complete" or "sealed".

Referring still to FIG. 11b, a virgin factory has the following features and capabilities. Its domain keeper 245 is the common domain keeper for all factories. An entry key 244j to this domain keeper 245 is kept in the tools node 244 for use by the factory creator 211 and by any other domain with access to the tools node 244.

In the preferred embodiment every factory automatically gets a new domain creator 248 when it is built. The entry key 242q to this domain creator 248 is kept in a slot (e.g., 14) of the factory's keys node 242. This domain creator 248 is used to build all the factory products 223 produced by this factory. Therefore all factory products from the factory 213 will have the same brand. This characteristic is useful if a factory product fails (e.g., because its program has a defect in it) in the following manner. First, it should be noted that the builder is allowed to obtain an entry key to this domain creator 248 from the factory 213 (e.g., by using an order code of 69 with its builder's key). This alone gives the builder no authority over the factory products. But if the owner of a failed factory product is willing to give the builder a key to the failed factory product then the builder will be able to obtain a domain key to the factory product (by sending the domain creator 248 the entry key for verification) and use it to try to discover the source of the problem that made the factory product fail.

A virgin factory 213 also has access to the keys in the tools node 244 via a fetch key 242p in the keys node 242. The capabilities supplied by the tools node 244 include the following. The descrim key 244a allows its holder to determine (using order code 0) if a specified key K is a data key, exit key, memory or sense key, meter key or other key; (using order code 1) if a specified key K is a read-only page key or read-only nocall segment key.

The entry key 244b to the factory creator 211 allows a factory 213 to make other factories. There are also entry keys 244h, 244i and 244j to the domain creator creator 201, the domain creator 214 for factories and the domain keeper 245 for factories, respectively.

The Never key 244g is a key usable in slot C2 of factory product and other domains that do not have a domain keeper. (Note that not every domain can have a domain keeper or there would be an infinite number of domains in the system.) The returner key 244e is a special key to a special kernel facility that allows a domain (such as a factory) to exit without having to risk that it will become stalled because the jumpee is busy or is on a disk pack that has been dismounted, or is otherwise not ready. A copy of the returner key 242i is kept in the keys node 242.

The entry keys 244f and 242k to the space bank transformer can be used to determine if a space bank is "official" (i.e., one of those provided by the system and which responds to requests promptly), and also to make weaker versions of an official space bank. One type of weaker space bank is one with a smaller range of available pages and nodes. Another type is called a "guarded space bank". It remembers all the pages and nodes that it gives out and can reclaim them upon command.

Several of the keys node 242 slots are reserved for use while building factory products. Slot 0 holds the exit key to the caller (i.e., the requestor). Slot 1 holds the key to the domain keeper for the factory product, if one is specified by the builder, and the never key 244g if one is not specified. Slot 2 holds the key (usually a segment key) to the program installed by the builder. If none is installed, the factory is called a "fetcher" factory and this key points to a special program called the fetcher factory program. The yield of a fetcher factory is one of sixteen keys selected by the order code (between 0 and 15, inclusive) specified by the requestor. Fetcher factories are used herein in conjunction with the components node but can be used anywhere.

Slots 5, 6 and 7 of the keys node 242 are used to hold the space bank key 242f, meter key 242g and wild card key 242h supplied by the requestor when he calls the factory. Slot 11 is used to hold the domain key to the factory product 223 and slot 15 is used to hold the segment key to the root of the factory product's memory tree.

The entry key 242j to the factory's Key Index Domain (KID) and the entry key 244c to the KID creator 239 requires explanation of the function of Key Index Domains (KIDs). These will be explained when the use of the components node 216 is explained.

Referring to FIGS. 11a and 11b, the factory functions for builders are as follows. The builder 221 can install in the factory up to 19 "components", and "alleged name" and an "ordinal". The components are keys; they provide the factory products with capabilities. The alleged name 265 and ordinal 264 are both 32 bit numbers stored in the scratch pad 218 (see FIG. 11c). The alleged name 265 is merely a tag that can be read by a requestor 222. It is used to identify the factory 213 to a requestor 222. The ordinal 264 is similar to an order code except that it is supplied by the builder 221. It can be used by the program installed in the factory 213 for any purpose, but generally it is used in the sense of an order code: to define which of the program's functions are available for use by requestors of the factory 213. If several copies are made of a factory 213, each can have a different ordinal and thus a different set of functions even though they all share the same program.

There are three types of components (i.e., keys) that the builder 211 can install in a factory: sensory keys, factory requestor keys and holes (i.e., non-sensory, non-requestor keys). A separate function is provided (i.e., a separate order code is used) for installing each type of component: install-sensory, install-factory and install-hole.

Sensory keys are keys that cannot be used, directly or indirectly, to write or transmit data. Sensory keys include read-only page keys, read-only nocall segment keys, and sense keys. A segment key must include the nocall attribute to be sensory because otherwise an implicit call to the segment's keeper (which can many capabilities) could be used to transmit information. Sense keys are similar to fetch keys except that they weaken the keys fetched: page keys are weakened to be read-only; segment keys are weakened to be read-only nocall; node and fetch keys are weakened to be sense keys; data keys and sense keys (and a few miscellaneous keys such as the descrim key 244a and the returner key 244e) are fetched unchanged; and all other keys (including entry, exit, domain, and meter keys) are fetched as a data key with a zero data value (i.e., they are not fetched). The factory 213 uses the descrim function (described above) to determine if the key presented by the builder as a sensory key is in fact sensory.

The factory 213 can determine whether the domain calling it is a requestor or builder by inspecting the copy of the data byte of the entry key that is put in general register 2 GR2 by the kernel (see explanation of the D parameter in the entry block 179, above). Only domains with builder keys can invoke builder functions and only domains with requestor keys can invoke requestor functions.

In the preferred embodiment, calls on the builder's key work as follows. To install a component, the builder passes an order code of A+N (where N is between 0 and 18, inclusive, and represents the number of the component) and the key K to be installed. Three values of the parameter A (0, 32 and 128) are used by the builder to indicate how the component is to be installed: as a sensory key, as a requestor's key or as a hole, respectively. N represents which component the key K is to become in the factory. Components 0 thru 15 are keys to be placed in the components node 216 for use by the factory product 223. Component 16 is a key to the factory product's domain keeper, if any. Component 17 is a key to the factory product's program, if any. When the program component is installed the builder must pass as a parameter a four-byte address value to be used as the starting address of the program. This starting address will be placed in the PSW of the factory products produced by the factory 213. Component 18 is a key to be placed in slot C10 of the factory product's root node and is available to the factory product's domain keeper, such as a debugger. In response to the call on the builder's key, the builder 221 receives a return code RC indicating whether the key was installed, and what problem, if any, caused the key not to be installed. An RC equal to zero is used to indicate the successful installation of a key.

If A equals 0, then the component to be installed should be a sensory key. If the key K is not sensory, the key is not installed. If A equals 32, then the component to be installed should be a requestor's key. If the key K is not a requestor's key, then the key is not installed. If A equals 128, then the component to be installed will be treated as a hole regardless of whether it is a hole or not. Thus a requestor's key can be installed as a hole. This can be advantageous in cases where the requestor factory is more trustworthy than its holes (e.g., where the requestor factory is a public utility provided by the system and therefore fairly trustworthy). The factory 213 uses the descrim function (described above) to determine if a key is sensory. To determine if a key is a requestor's key it calls the factory domain creator 214 to verify that the requestor's key is an entry key to a factory domain.

In the preferred embodiment, once the factory is sealed the builder can continue perform all the functions permitted by the builder's key expect installing new holes, installing new requestor's keys and sealing the factory. Therefore the builder can change any of the other components, and can even replace a hole with a sensory key. Since a factory does not issue a requestor's key until it is sealed, installing a requestor's key to factory B as a component in factory A does not violate the principle that once a factory is sealed no more holes can be added to it (because factory B is also sealed and therefore no holes can be added indirectly to factory A by adding holes to factory B).

Referring to FIG. 11c, there is shown a block diagram of a factory A 213 and some of the factory components that can be installed therein. When a requestor's key 257 is installed in factory A 213, it is necessary to determine what holes the referenced factory B 251 contains, because the holes of factory B 251 are effectively also holes for factory A 213. A special domain called the Key Index Directory (KID) 249 performs this function. In the preferred embodiment, a KID 249 is provided with every factory for the purpose of keeping track of the factory's holes and providing some related services (described below). It is created when the factory creator 211 is building a new factory 213 by calling the KID creator 239 (using entry key 244c in the tools node 244) which builds a new KID 249 returns an entry key 242j to the factory creator 211 for installation in the factory's keys node 242). In an alternate embodiment, a new KID 249 is created when, and if, the builder 221 installs the first hole in the factory 213.

Each time a component is added or replaced in the factory 213, the nature of the component is stored in a table in the factory's scratch pad 218. If the component is a hole, the KID 249 is called by the factory 213 and asked to add the component (i.e., the key) to its list 262 of holes. The KID 249 adds the key to its list 262 only if the hole is not already in its list 262 of holes. In other words, the list of holes 262 in the KID 249 is the union of the set of all holes every added to the factory 213. If the key is a requestor's key (e.g., key 257 to factory G 251) the holes of the referenced factory A 251 are added to the list of holes in the KID 249 because all the holes in the referenced factory B 251 could potentially be used by factory A 213. As just indicated, keys are added to the KID's list 262 only if they are not already in the list. The method by which the factory 213 and the KID 249 perform this function of adding holes to the KID's list 262 is described in detail in the section on factory processes. It is noted here, however, that all the system constructs for performing the necessary links between the various domains and data structures necessary for performing this function have already been presented.

The builder's functions that have not yet been described are as follows. Referring to FIG. 11d, the builder 221 can (using order code 67) obtain a "copy key" KF 266 from the factory A 213. Using the copy key 266 the builder 221 can produce either (1) a complete copy 267 of the factory 213 (i.e., including a copy of all its components and thus including all its holes) which is unsealed (by using order code 0 with key KF), or (2) produce a virgin factory 268 (using order code 1). In both cases the copy factory 267 or 268 will share the same domain creator 220 as the first factory 213. In the case where the copy 267 is the same as the original factory 213, the builder can add holes, change the ordinal 264, change the alleged name 265, and so on to make a factory 267 that is a modified version of the original 213. In the other case the main purpose of the copy is that the new factory 268 is a "brother" of the first factory because all the factory products of both will eminate from the same domain creator 220 (and thus have the same brand).

The builder 221 can destroy a factory 213 in one of two ways. The first way (using order code 68), all factories using the same domain creator 220 are destroyed and so is the common domain creator 220. All builder's and requestor's keys to the destroyed factories are disabled. The second way (using order code -FFFFFFFB), the factory 213 is destroyed, but its domain creator 220 and any other factories using the domain creator 220 are not destroyed.

In another preferred embodiment several features of factories are changed. First, the domain creator 220 used by the factory can be specified by the builder. A new domain creator is produced only if one is not specified by the builder. This eliminates the need for the second type of factory copy function (to produce virgin copies) and also can reduce the number of domain creators built by the system. Since the builder can always get a key to the factory's domain builder (for making factory products) this introduces no additional security risks. Another changed feature is that the factory can be "locked", thereby preventing the builder from changing the factory after it is locked and preventing the builder from deleting the program used by the factory (by making a copy of the program for use by the factory products). A third changed feature is that when a hole or requestor component in the factory is deleted, the KID will perform a search to determine if no other sources of that hole or the requested factory's holes exist in the factory and, if there are none, will delete that hole or holes from its list of holes. This allows the builder to delete a hole in response to a protest by a potential user who refuses to use the factory until the hole is removed. A fourth changed feature is that a builder will be able to add or change a hole or requestor component after the factory is sealed if the KID determines that no new holes will be added to the factory.

Although it was not discussed above, it is evident that the program component 271 and the domain keeper component 272 installed in the factory 213 can comprise holes. Note that any entry key is always a hole. This problem is resolved in the following way. If the program or keeper component 271 or 272 is a requestor's key, the factory products of the factory 213 will each receive as a program component or as a keeper component the yield of the referenced factory 255 or 256. Thus, for example, if factory D 256 is a factory for making domain keepers which has no holes (or only holes that the expected requestors can trust): (1) the requestor's key to factory D 256 will add no holes to the factory A 213, and (2) the factory products will have as a domain keeper a domain produced by factory D 254.

If the builder 221 needs to install more than 19 components in the factory 213 the problem is solved using a "fetcher" factor 253 as follows. As indicated above, a fetcher factory 253 is a factory in which its builder 221 installs no program components, thereby leaving the original program component (which is a pointer to the fetcher factory program 273) in the factor 213. A request to a fetcher factory 253 does not produce a new domain. Instead it produces one of sixteen keys. The requestor need not supply a space bank, meter or wild card key when calling the fetcher factory. All it supplies is an order code N between 0 and 15. In response, the fetcher factory 253 will fetch the N'th key in its components node and return it to the requestor.

Therefore, to build a factory A 213 with more than 19 components the builder 221 proceeds as follows. The builder first builds and seals fetcher factory 254 with the extra components needed. It then builds factory A, installing as a component the requestor's key 258 to the fetcher factory 253. Of course, if more than 35 components are needed, then more than one fetcher factory can be used. This scheme can be used to install up to $259(=(16\times16)+3)$ components in a factory. Other ways to add even more components can be easily devised using the tools already described.

Referring to FIG. 11e, there is shown the relationship between a requestor 222 and a factory 213 and a factory product 223. The functions available to the holder of a requestor's key 229 are as follows. Using order code "kt" (equal to the largest allowable 32 bit negative number), calling the requestor's key 229 (to factory A 213) returns the alleged name 265 of the factory 213. Using order code $-1$ and passing as a parameter a requestor's key 229 for factory A 213, a call to factory REF requestory's key 281 will return a return code equal to: 0 if factory A 213 has no holes other than those in factory REF 281; 1 if factor A 213 has at least one hole not in factory REF 281; 2 if key 282 is not a requestor's key. The method used by factory A 213 to perform this "hole comparison" function is described below in the section on factory processes. Using this "hole comparison" function, a requestor 222 can determine if a factory A 213 has any holes whose nature it does not know about. It does this be referring to or building a factory REF 281 that contains all the holes that it trusts or is willing to tolerate.

Referring back to FIG. 11a, to obtain a factory product 223, the requestor 222 calls the requestor's key with any positive value order code. It must pass as parameters as key 234 to an official space bank (see above discussion of space banks), a meter key 236 and, if required by the specifications of the factory 213, a wild card key W 238. The factory 213 will use the space bank 235 and its private domain creator 220 to build a factory product 223, the initial structure of which is shown in FIG. 11e. It will then exit with a "return" gate jump to the factory product 223.

Referring again to FIG. 11e, the structure of the factory product 223 after the factory 213 exits to it but before it begins to run its process is as follows. In its root node 283, the factory product 223 has a badge key 283a with the brand of the domain creator 220 for its factory 213, a meter key 283b to the meter 235 supplied by the requestor 222, a domain keeper key 283c if one was supplied by the builder 221 (and the never key 244g otherwise), a memory key 283d to the program 227 installed by the builder 221 (which will often comprise a read-only key to a red segment node 285 that points to a program 286 that includes the initial program 287 and the regular factory product program 288), and a PSW data key 283e set to the starting address of the factory product's program 227. The general keys node 284 of the factory product 223 initially has: a fetch key 284a to the components node 216 in the factory 213, a copy 284b of the wild card key 238 sent by the requestor 222, the exit key 284c to the requestor 222, a domain key 284d to itself, a copy 284e of the space bank key 234 sent by the requestor 222, a copy 284f of the meter key 236 sent by the requestor, and an entry key 284g to the domain creator 220 that made the factory product 223.

When the factory 213 exits to it, the factory product 223 runs an initial process defined by its program 227, whereby it can change the structure of the factory product 223. It changes the factory product in any way not inconsistent with the kernel functions for domain keys since it has a domain key 284 to itself. Generally, this requires that the program 227 replace the memory tree key 283d (e.g., with one of the components in the components node) and/or define a different starting address in its PSW (program status word) register than was set up by the factory 213 before exiting to the requestor 282. In other words, the builder of the factory must define two programs 287 and 288 (which may be separate only conceptually): one 288 which the requestor 282 will run whenever he calls the factory product 223, and one 287 that initializes the factory product 223 when the factory 213 first exits to it. While running the initialization program 287, the factory product 223 is likely to use the requestor's space bank key 284e to buy nodes and pages for read-write storage.

When the factory product 223 exits to the requestor 222 it typically passes to the requestor 222 an entry key 233 to the factory product 223. But since the initial process in the factory product 223 can do anything the builder 221 designs it to do, it could pass several keys and a byte string instead of just an entry key. For instance, the initial process in the factory product might be designed to: (1) build a special data base or other data structure with the factory product domain 223 becoming the segment keeper for the data structure, and (2) exit to the requestor 222, passing a read-write segment key for the new data structure as a key parameter.

Virtual Copy Segment Keeper Factory (VCSKF). Referring to FIG. 11f, there is shown a block diagram of the apparatus involved in the use of a virtual copy segment keeper factory (VCSKF) 301. The purpose of using the VCSKF 301, which is a special factory provided by the system, is to solve the same problem described with respect to FIG. 8b in the context of a factory. In other words, it solves the problem of a builder 302 that wants to put a program in a factory 305 that contains variables and therefore needs read-write storage space but also wants the program to be trusted by others.

Virtual copy segments and virtual copy segment keeper factories (VSCKF's) are like the chicken and the egg; each is designed to generate a new copy of the other. Virtual copy segments afford a mechanism to provide copies of data that can be modified but where the cost of each copy is little more than the cost of the modified pages.

There is generally available in the system a primordial virtual copy segment factory VCSKF 301. This factory is sealed and has no holes. Since it has no holes it can be trusted. The VCSKF 301 produces virtual copy segments as its factory product. For example, as shown in FIG. 11f, the product of VCSKF 301 is an empty (i.e., it has no memory keys in its initial slots) red segment node with a segment keeper VCSK0 303 that is a virtual copy segment keeper (VCSK). It produces this factory product by creating a new domain with a special VCS (virtual copy segment) program 314.

The virtual copy segment 318 is used by copying one's data into it. When all the data has been copied, the user then asks for a factory (e.g., VCF 304). This operation also seals the segment so that the user can write no more data into it. The new factory VCF 304 has the same program component 327 as the primordial VCSKF 301. The only difference between the two factories is that VCF 304 has a sense key 328 (to node 318) as a key component where the VSCKF 301 has a zero data key. The VCF 304 will produce factory products (e.g., segment 333) with virtual copies of the contents of the sealed segment 318. The users of these factory products cannot change the contents of segment 318 but can modify the virtual copy in segment 333. After making such modifications the user of the factory product can ask the segment's keeper 307 to produce a factory for generating copies of the modified segment 333. Thus the whole process is reiterative.

A very broad overview of the use of the VCSKF 301, from the perspective of a domain B 302 which wants to rent out its program 322 using a factory 305, is as follows. Domain B 302 calls the VCSKF 301 and copies its program 322 into the segment 318 produced by the VCSKF 301. This copy of the program will have the node and structure 324 needed for making "virtual copies" of the program 322. Next, domain B 302 asks the segment 318 to give him the key 329 that it needs to put into a factory 305 as the program component. This key 329 is a requestors key to a new virtual copy segment keeper factory VCF 304. VCF 304 is a copy of VCSKF 301 having the same program component as the VCSKF 301 with one new key component: a sense key 328 to segment 318. Domain B then buys a new factory 305 from the factory creator 211, installs the key 329 as the program component, and seals the factory 305. When a requestor 306 uses this factory 305, the resulting factory product 307 will have a virtual copy of the builder's program 322. Any pages that the factory 305 needs to write into in order to run the program 322 will be copied and inserted into the factory's memory tree at the time they are first modified.

The basic mechanics of using the VCSKF 301 are as follows. Builder 302 calls its requestor's key to the VCSKF 301, passing a space bank key 312 and meter key 313. The VCSKF 301 responds by building a new domain VCSK0 303 (which is a virtual copy segment keeper) and exiting to the VCSK0. The program component of the new domain 303 is a sensory key to the VCS program 314. The VCS program 314 has three major parts: an initialization program 315, a VCSK (virtual copy segment keeper) program 316a for use when there are memory faults in the memory segment 318, and a factory copy program 316b for producing a new VCSKF (e.g., VCF 304) with a sensory copy of the segment 318. When the VCSKF 301 exits to the VCSK0 303 (i.e., when the factory 301 exits to its factory product 303 and starts the factory product 303 running) the initialization program 315 performs the following steps. First, it buys a red segment node 318 and puts an entry key 317 to itself (derived from the domain key 319 to itself which was given to it by the VCSKF 301, see FIG. 11e) in the red segment node 318 as the segment's segment keeper. Then it checks to see if a preselected component (e.g., component 1) of the VCSKF 301 is a sense key. If it is, it then uses that sense key to copy into the initial slots of node 318 sensory copies of the initial keys in the node pointed to by the sense key. If the component is a zero data key (e.g., key 342), as it will be if the factory is the primordial VCSKF 301, the node 318 is left empty. Then it returns to the builder 302 (which was a requestor insofar as the VCSKF 301 was concerned), passing as a parameter a read-write segment key 321 to the red segment node 318 instead of an entry key to itself. Thus the factory product of the VCSKF 301 is a red segment node 318 with a virtual copy segment keeper 303.

The builder 302 puts the segment key 321 in an appropriate position in its memory tree 322 and copies its program 322 into the segment defined by the red segment node 318. Since the red segment node 318 is initially empty, each new page written into it will cause a memory fault. These memory faults will be resolved by the VCSK0 303 by buying the necessary nodes and pages to build the segment defined by the node 318.

The scheme for building this segment 317 and 324 is similar to the one used generally by segment keepers: wherever there would normally be segment keys in the segment the segment keeper VCSK0 303 uses node keys. Thus the keys in red segment node 318 to the nodes and pages in 324 will be node keys and so will be the keys in each of the nodes in segment 324, except that in the lowest layer of the tree the segment nodes will be filled with read-write page keys. Since only the builder 302 and the VCSK0 (a trusted domain created by a factory VCSKF 301 with no holes) will have non-sensory keys to this segment 318 and 324 there is no security risk involved in using the memory structure just described.

After the builder 302 has finished copying its program 322 into the node 318, it calls the VCSK0 303 by calling the segment key 321 using an order code of 17. Note that, as described in the section on gate jumps, a call to a red segment node key is treated as a call to the node's segment keeper. (If this special function were not available the same result could be achieved by having the VCSK0 303 pass to the builder 302 two keys after it runs its initialization program 317: a segment key 321 and an entry key to the VCSK0.) The VCSK0 303 responds to this call by: (1) replacing all the node keys in the initial slots of red segment node 318 with corresponding sense keys and setting a special SEAL bit in the segment keeper VCSK0 303 to prevent it from adding or replacing pages in the segment defined by the red segment node 318, thereby "sealing" the segment (so that the builder's read-write segment key 321 to the segment 318 can no longer be used to write new data into the segment); (2) calling the copy key 343 in the VCSKF component's node 344 to create a new "virtual copy" factory VCF 304 and receiving in return a builder's key 326 to VCF 304; (3) using the builder's key 326 to install in the VCF a sense key 328 to red segment node 318; (4) sealing the VCF 304 and receiving in return a requestor's key 329 to the VCF 304; and (5) exiting to the builder 302, passing back to it the requestor's key 329 to the VCF 304.

Note that the copy key 343 is not a hole in VCSKF 301 because it only gives the factory products the ability to reproduce the factory. In the preferred embodiment, all factories are given at their birth a copy key to themselves as key component 3. It is up to the builder to decide whether to overwrite this key or to let the factory products use it.

Next the builder 302 calls the factory creator 211, which makes a new factory 305 and returns to the builder 302 a builder's key 331 to it. Using the builder's key 331, the builder 302 installs the requestor's key 329 (to VCF 304) as the factory's program component. As described above, when a factory's program component is a requestor's key the factory products 307 from the factory 305 will receive as their memory tree key the yield of the factory VCF 304. In this case, the yield of the VCF 304 will be a read-write segment key 332 to a new red segment node 333 that is a sensory copy of red segment node 318. The segment keeper of the node 333 will be a new virtual copy segment keeper VCSK1 308 having the same VCS program 314 as VCSK0 303.

The formation of the VCSK1 308 and node 333 is as follows. When the factory product 307 is formed the requestor's key 329 that comprises the program component of the factory product 307 is invoked with an order code of 2. The VCF 304 creates a domain VCSK1 308. As VCF's factory product, VCSK1 has access to VCF's components node 345 which includes the sense key 328 to node 318. When the VCSK1 runs its initialization program it: (1) buys a red segment node 333; (2) uses the sense key 328 to "copy" the contents of node 318; (3) put an entry key to itself in node 333 as its segment keeper; and (4) exits to the factory product 307, passing as a parameter a read-write segment key 332 to the red segment node 333.

The node 333 will have sense keys in its initial slots because when a sense key 328 is used to fetch sense keys (e.g., the sense keys in the initial slots of node 318) the keys received are sense keys, as discussed above. The factory product 307 will have read-only nocall access to the segment defined by nodes and pages 324 through the sense keys in node 333, but will have read-write access to the node 333 itself.

Thus a requestor 306 will receive from factory 305 a factory product 307 with a memory tree defined by read-write segment key 332. When the requestor 306 runs the factory product 307 the copy of the program 322 defined by the builder 302 will be used. Whenever the factory product 307 tries to write into one of the pages in the program it will fault to the VCSK1 308 which will replace a portion of the segment defined by the segment node 333 with a copy that the factory product 307 has read-write access to. For instance, if factory product 307 tries to write into page 339 the VCSK1 308 will replace the sense key in the slot 337 that defines the portion of the virtual address space including page 337. In its place it will put a node key to a new node 338. Then it will use the sense key 333c that was in slot 337 to "copy" (i.e., obtain weakened versions of) the keys referenced by sense key 333c (which are in the segment 324) into node 338. It will continue this process of replacing one sense key with a node key to a newly bought node and filling it with "sensory" copies of the corresponding node in segment 324 until it gets down to the page level. The VCSK1 will then buy a new page 341, put a read-write page key to it in the proper slot of the last purchased node (e.g., node 338), and copy the corresponding page in segment 328 into the new page 341. Finally it will exit back to th factory product 307 which will then be able to continue its process, writing into the new page 341. All this happens without the factory product 307 needing to know that its processing was interrupted by a memory fault.

A number of the details of the process for using the VCSKF 301 which were skipped are as follows. First, all required uses of space banks, including the passing of space bank keys and meter keys to factories, are the same as described above with respect to factories. Thus the space bank specified by the builder 302 to the VCSKF 301 will used to build domains 303 and 304 and these domains will use the meter specified by the builder 302. The space bank specified by the requestor 306 will be used to build domains 307 and 308 and these domains will use the meter specified by the requestor 306.

Second, when the requestor 306 checks to see what holes factory 305 has, the check will also include all the holes (if any) in VCF 304 due to the use of the requestor's key 336 as the factory (305) program component. The sense key 328 in VCF 304 is not a hole because sense keys, by definition, give no authority to write or transmit data. If the builder puts no holes in the factory 305 (or at least no holes that the requestor 306 does not trust) then it has accomplished its purpose: to create a factory with a "virtual copy" of its program 322.

Factory Processes. The following is description of two processes used by factories: one to handle requestor key components, and one to compare the holes of a first factory with the holes in another factory.

Referring to FIG. 11g, when a builder adds requestor key 371 (to factory B 357) as a requestor component to a factory A 351 the factory's KID 352 adds to its list of holes 356 the holes in factory B 357. The process for doing this is as follows. First factory A 351 calls the factory domain creator 214 to verify that requestor key 371 is an entry key to a factory. If key 371 is an entry key to a factory the factory domain creator 214 will return to the factory A 351 a domain key 373 to factory B 357. (Also, by inspecting the data byte of the key 371, using the method described above, the factory A 351 can confirm that this is a requestor type of entry key.)

The factory A 351 then uses the domain key 373 to the factory B 357 to fetch the key 372 to its KID 358 from its keys node (see FIG. 11b). It then calls its KID 352, passing this key 372 as a parameter and using an order code that tells the KID 352 to compare its holes with the holes in the KID 358 referenced by the key 372.

The KID 352 verifies that the passed key 372 is an entry key to a KID by calling the domain creator for KIDs 375. Assuming that key 372 is a proper entry key to a KID the domain creator 375 will give KID 352 a domain key 376 to KID 358. Using this domain key 376 the KID 352 will fetch the memory key 378 to the list of holes 377 in KID B 358. The KID 352 now has access to both its list of holes 356 and the other KID's list of holes 377. It is then a simple process, well within the ordinary skill of one skilled in the art, to: (a) step thru each key in KID B's list of holes 377 and to determine if that hole is already in its own list of holes 356; and (b) if not, add that hole to its list 356.

Next described is the process used when a requestor 306 asks factory REF 353 to determine if factory A 351 has any holes that factory REF 353 doesn't have. This process is almost identical to the process just described for handling the addition of a requestor component to a factory. The requestor 306 calls the factory REF 353, passing as a parameter a requestor's key 361 for the factory A 351.

Using the process just described, factory REF 353 uses the key 361 to obtain a domain key 381 to factory A 351. Using the domain key 381, factory REF 353 fetches an entry key 364 to factory A's KID 352. The factory REF 353 passes this key 364 to its KID 354, using the order code for the "hole comparison" process.

Using the process already described, KID 354 uses the passed key 364 to obtain a domain key 382 to KID 352. And using this domain key 382, the KID 354 fetches a memory key 383 to KID A's list of holes 356. It is then a simple process, well within the skill of one of ordinary skill in the art, to: (a) step through each of the keys in list 356; (b) comparing each said key with the keys in its own list 355; and (c) if for any said key in list 356 there is not an identical key in its own list, return a non-zero return code to factory REF (indicating that factory 351 has at least one hole not in factory REF 353); otherwise it exits to factory REF 353 with a zero return code. Factory REF 353 then passes this return code on to the requestor 306.

Miscellaneous System Features. Next described are several miscellaneous system features referred to earlier in the specification.

Referring to FIG. 12, there is shown a block diagram of a newly formed domain 391. It is assumed that this is the domain for a new user who needs access to a standard set of system utilities. Access to these utilities is achieved by the use of a "womb" key 392. The womb key 392 is a fetch key that points to a womb node that includes at least three keys: a fetch key 393 to a node 394 that contains keys to certain fundamental facilities needed by most user domains; an entry key 395 to a supernode 396; and a fetch key 397 to a node 398 that contains the particular keys that this user needs, such as a meter key, as space bank key, and keys to use a terminal, a printer and so on. A "womb" key is given to most new users on the system.

A supernode is a domain which can store up to $2^{31}$ keys. By calling it with an order code of 1 and a numerical four-byte parameter N, it will fetch and return key N to its caller, where N is any number between 1 and $2^{31}$. To store a key, the user calls the supernode with an order code of 2, a numerical four-byte parameter N and a key parameter (i.e., the key to be stored as key N). The store capability can be disabled by the supernode's builder, making it a read-only supernode. Thus the supernode 396 that contains all the standard keys needed to use factories and other facilities available to most users is a read-only supernode. Using the system features described above, it is well within the ability of one with ordinary skill in the art to design a supernode creator factory.

Involved keys are basically keys that convey information that is being used elsewhere in the system. Thus if the involved key is changed it is important for the kernel to know that it must check elsewhere in the system to account for this change. Similarly, whenever an involved keys is about to be used to convey authority, the kernel must check to see if the logical key value is the same as what is in the key. Some explanatory examples are as follows. Whenever a domain is running or is active and therefore has a DIB, all the keys in the regs node and the PSW key are involved. This is because while the process in the domain is running the true values of the PSW and the general registers are in the DIB, not in the domain's root and regs nodes.

Whenever a page key or segment key points to pages that are actually in core the key is involved. This is because the real reference to the core pages are held in page and segment tables in a special array in core. Before using an involved memory key the kernel always checks in the associated page and segment table to check that the page or segment hasn't been deleted or changed (for instance by another domain) or swapped out while the domain was dormant.

System checkpointing is a procedure the system performs periodically (e.g., every five minutes) to save the state of the system so that if the system crashes it can be restarted in the state that existed at the time of the last checkpoint. The basics of system checkpointing are as follows. The disk memory contains two swap areas called swap area A and swap area B. Between checkpoints, one swap area (e.g., A) is used holding all pages written to disk and the other swap area (b) is not written into. This second swap area B is involved in a process called migration, which is basically the process of writing into disk-node and disk-page space all the pages and nodes written into the swap area B before the previous checkpoint. Before the next checkpoint, the migration process in swap area B must be completed. When the migration is complete, disk-node and disk-page space incorporate all changes made to the system up to the last checkpoint. Thus the disk memory can be used to restart the system in the state as of the time of that checkpoint. If the system crashes in the middle of migration, the migration process will first completed and then the system will be reloaded.

At checkpoint time all pages and nodes in core which were changed since the last checkpoint but not yet written to disk are flagged as kernel-read-only. These pages and nodes are written into the swap area B, which is now empty (because migration must be completed before the next checkpoint) as time allows. Swap area A is now the migration area and the migration process is restarted. In the mean time the system continues running. But pages and nodes that are marked as kernel-read-only cannot be written into until they are written out by the kernel into swap area B for checkpointing, whereupon the page or node will marked as no longer being kernel-read-only. There is a separate queue for domains stalled because they need access to kernel-read-only pages or nodes.

Special tables are maintained on the disk to indicate which pages and nodes are in the swap areas. These are used so that the current version of a page or node will be accessed when the system calls for that page or node to be read into core.

A potential problem in all capability based systems is circular reference chains. These arise when a first key points to a key that directly or indirectly points back to the first key. In the preferred embodiment a bit flag called the prep-lock is included in all node frames and core page entries. Whenever a key reference is being performed by the kernel it turns on this bit for all the keys involved in the reference. If while it is resolving the reference (which may be many levels deep) it runs into a key with its prep-lock on, the kernel knows to check if the reference is circular. Not all such references are necessarily circular, but the prep-lock determines when the kernel needs to worry about this problem.

In a multiple-CPU system incorporating the invention there are already several built-in features that help resolve potential inconsistent actions by the various CPU's. First, the core-lock flag included in each node frame and table table entry prevents another CPU from altering or swapping out a page or node that another CPU is currently using. Second, domains are inherently separate entities that should not depend on other domains not running while it is running. Where other domains may share its resources, such as a meter, the domain's DIB should contain a flag that will be set if another domain alters those resources (see, for example, the discussion of the STALE flag in the DIB 119). Generally, the multiple-CPU system should be arranged so that, as often as possible, both domains involved in each gate jump are being run in the same CPU.

The main security issues involved in the described invention are proving mathematically that the basic system architecture provided is secure, and deciding which of the primordial domains must you the other domains trust. The inventor believes that the security provided by the basic system architecture can be proven. As for which domains must be trusted, these include only the domain creator creator, the factory creator, and the KID creator. The security of all other system functions can be tested using basic kernel functions and the products of these three primordial domains.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. In a capability based data processing system having at least one central processing unit, memory means and a multiplicity of keys, each key providing authority to its holder to use a specified portion of said system's resources, an arrangement comprising:
   a plurality of domains for performing predefined processes, each including means for holding a plurality of keys; and
   kernel means coupled to said domains for providing said domains with a predefined set of kernel functions, said kernel means having the exclusive means for creating keys and the exclusive means for resolving the authority conveyed by each said key; wherein
   a plurality of said domains comprise factories for creating factory products comprising new domains for performing specified tasks;
   a multiplicity of said keys are non-sensory keys, which convey the authority to directly or indirectly cause data to be transmitted to, or changed within, a domain other than the domain invoking said key; and
   predefined ones of said kernel functions allow a requestor domain with a key to a specified one of said factories to determine whether said specified factory has any non-sensory keys not included in a first predefined set of keys;
   whereby a requestor domain can determine if use of a specified factory could compromise the confidentiality of data provided by said requestor domain to said factory.

2. An arrangement as set forth in claim 1, wherein said kernel functions include
   a factory verification function for determining whether a specified factory has the ability to invoke, directly or indirectly, any non-sensory keys which are not included in a first predefined set, whereby a requestor domain can determine if a specified factory has access to any non-sensory keys whose nature and authority are not known to said requestor domain.

3. An arrangement as set forth in claim 2, wherein said kernel functions include a set of predefined builder's functions;
   each said factory includes means for responding to the invocation of a corresponding builder's key by a builder domain by performing a selected one from said set of predefined builder's functions in accordance with a parameter selected by said builder domain;
   said set of builder's functions includes the functions of
      installing components in said factory, including a program component defining a program to be performed by the factory products produced thereby, and key components for use by said program; and
      sealing said factory, thereby preventing said builder domain from thereafter installing non-sensory components in said factory, and returning to said builder domain a corresponding requestor's key which the builder domain may distribute to other domains.

4. An arrangement as set forth in claim 3, wherein said kernel functions include
   a factory verification function for determining whether a first specified factor has the ability to invoke, directly or indirectly, any non-sensory keys which a second specified factory does not have the ability to invoke.

5. An arrangement as set forth in claim 4, wherein each of a plurality of said factories includes key identification (KID) means for maintaining a list of all non-sensory keys, if any, installed by a builder domain in said factory.

6. An arrangement as set forth in claim 5, wherein said set of builder's functions includes the function of installing a requestor's key as a key component in said factory; and
   said factory verification means function includes in the set of non-sensory keys that can be invoked by said first specified factory the non-sensory keys that can be invoked by each factory corresponding to a requestor's key installed as a key component in said specified factory.

7. An arrangement as set forth in claim 6, wherein said set of builder's functions includes the function of installing a requestor's key as the program component of a factory; and
   the factory product of a factory having a requestor's key as a program component will have as its program component the key produced by invoking said requestor's key.

8. An arrangement as set forth in claim 3, wherein a plurality of said domains each have means for specifying a domain keeper to be called by said kernel means upon the occurrence of domain faults in said domain, said domain keeper comprising a domain having means for resolving domain faults and for restarting said domain;
   said set of builder's functions includes the function of installing a domain keeper component defining the domain keeper for the factory products to be produced by said factory;
   wherein if said domain keeper component of a factory is a requestor's key, then the factory products of said factory will each have as its domain keeper the domain produced by invoking said requestor's key.

9. An arrangement as set forth in claim 2, including a factory creator for creating new factories, responsive to the invocation of corresponding key by a builder domain by creating a new factory and passing to the builder a builder's key to said new factory.

10. An arrangement as set forth in claim 2, wherein said arrangement includes at least one domain creator, each said domain creator including domain tool means for creating new domains, and means for transmitting to the invoker of a key corresponding to said domain creator a key corresponding to a newly created domain;

whereby a domain with said key corresponding to said domain creator can request the creation of a new domain and obtain a key thereto.

11. An arrangement as set forth in claim 10, wherein a plurality of said keys are domain keys, each domain key conveying the maximum amount of authority over a corresponding domain; and at least one said domain creator having said key verification means includes means for responding to the invocation of a key corresponding to said domain creator, by returning the invoker a domain key if the specified key corresponds to a domain having the same brand as domains created by said domain creator, and by returning an error code otherwise.

12. An arrangement as set forth in claim 10, including domain creator creator means for creating new domain creators, each new domain creator having a unique brand, responsive to the invocation of a corresponding key by a first domain by returning to said first domain a key to a new domain creator.

13. An arrangement as set forth in claim 2, wherein a plurality of said domains comprise segment keepers; said memory means includes a multiplicity of memory segments; and a multiplicity of said memory segments each include segment keeper means for specifying a program to be performed upon the occurrence of a memory fault in said memory segment, whereby said memory fault can be resolved and the domain that was interrupted by said memory fault can be restarted.

14. An arrangement as set forth in claim 2, wherein a plurality of said domains comprise segment keepers; said memory means includes a multiplicity of nodes for holding said keys; and a multiplicity of memory segments for storing data;

a plurality of said nodes comprise segment nodes that define a memory segment;

a plurality of said segment nodes contain an entry key to a segment keeper, said entry key to be invoked by said kernel means upon the occurrence of a memory fault in the memory segment defined by said segment node; and a plurality of said segment keepers have a program for resolving memory faults and exiting back to the domain which was interrupted by the memory fault.

15. An arrangement as set forth in claim 14, wherein at least one of said segment keepers is a virtual copy segment keeper (VCSK); and said VCSK includes means for resolving memory faults caused by an attempt to write on a read-only memory area by making a write-enabled copy of said read-only memory area and replacing the portion of the memory segment corresponding to said segment keeper that comprises said read-only memory area with said write-enabled copy.

16. An arrangement as set forth in claim 15, wherein at least one of said factories is a virtual copy segment keeper factory (VCSKF);

said VCSKF yielding a factory product comprising a memory segment (S1) with a corresponding VCSK.

17. An arrangement as set forth in claim 16, wherein the VCSK produced by said VCSKF includes a function for producing, in response to the invocation of a entry key thereto, a copy (VCF) of said VCSKF, said VCF having a sensory key to the memory segment (S1) corresponding to said VCSK;

said VCF producing, in response to the invocation of a corresponding requestor's key, a predefined memory segment (S2) with a corresponding VCSK (VCSK1);

said predefined memory segment (S2) comprising a sensory copy of the memory segment (S1) corresponding to said VCSK;

said VCSK1 having a program for sending to the requestor of said VCF a key to said predefined memory segment (S2).

18. An arrangement as set forth in claim 2, wherein a plurality of said domains each have means for specifying a domain keeper to be called by said kernel means upon the occurrence of domain faults in said domain, said domain keeper comprising a domain having means for resolving domain faults and for restarting a domain interrupted by a domain fault.

19. An arrangement as set forth in claim 1, wherein a plurality of said domains each have means for specifying a domain keeper to be called by said kernel means upon the occurrence of domain faults in said domain, said domain keeper comprising a domain having means for resolving domain faults and for restarting said domain.

20. An arrangement as set forth in claim 1, wherein each of a plurality of said factories contains a program component defined by a builder domain, said program component being useable for processing data by one or more requestor domains which hold a requestor key corresponding to said factory; wherein said requestor key does not provide the authority to obtain a copy of nor to otherwise inspect said program component in said factory and said builder domain has no authority to obtain a copy of nor to otherwise inspect the data processed by said program component in said factory for each said requestor;

whereby the combination of said factories and said requestor keys provide means for requestor domains to use program components provided by builder domains while protecting the confidentiality of both said program components and the data from said requestor domains processed thereby.

21. An arrangement as set forth in claim 20, wherein each of a plurality of said factories includes factory product generation means for creating a new factory product domain when a requestor domain invokes a corresponding requestor key, said factory product domain having access to said program component of the corresponding factory for the processing of data provided by said requestor domain;

whereby the provision of separate factory product domains ensures that data from each said requestor domain can be kept confidential from other requestor domains.

22. An arrangement as set forth in claim 1, wherein each of a plurality of said factories includes factory product generation means for creating a new factory product domain when a requestor domain invokes a corresponding requestor key; and a start-up program component defining a start-up program which is invoked by each said factory product of said factory upon its formation for modifying the structure of said factory product and for returning to said requestor domain a key to the modified factory product.

23. In a capability based data processing system having at least one central processing unit, memory means and a multiplicity of keys, each key providing authority to its holder to use a specified portion of said system's resources, an arrangement comprising:

a plurality of domains for performing predefined processes, each including means for holding a plurality of keys; and kernel means coupled to said domains for providing said domains with a predefined set of kernel functions, said kernel means having the exclusive means for creating keys and the exclusive means for resolving the authority conveyed by each said key; wherein a plurality of said domains comprise segment keepers;

said memory means includes a multiplicity of nodes for holding said keys; and a multiplicity of memory segments for storing data;

a plurality of said nodes are segment nodes, each segment node defining a memory segment of a specified size;

a plurality of said keys are memory keys;

a plurality of said memory keys are page keys, each said page key providing access to a page of memory, each said page comprising a preselected number of basic memory storage units;

a plurality of said memory keys are segmode keys, each said segmode key providing access to a segment node having a plurality of slots for holding memory keys;

a plurality of said domains each have means for defining a memory tree defining the virtual address space of said domain;

each said memory tree includes at least one memory key;

each said memory tree which includes more than one memory key includes at least one segmode key and at least one segment node;

a plurality of said segment nodes each include means for specifying a segment keeper to be called by said kernel means upon the occurrence of memory faults in the memory segment defined by said segment node, said segment keeper comprising a domain having means for resolving memory faults and for restarting the domain wherein the fault occurred.

24. An arrangement as set forth in claim 23, wherein said segmode keys include a size parameter indicating the size of the address space defined by the corresponding segment node.

25. An arrangement as set forth in claim 24, wherein said means for defining a memory tree includes a memory key at the root of said memory tree.

26. An arrangement as set forth in claim 25, wherein each said memory tree can overlap at least a portion of another memory tree corresponding to a second domain, whereby access to the common portion of said memory trees is shared.

27. An arrangement as set forth in claim 26, wherein said page and segment keys include an RO parameter indicating whether the key provides read-only or read-write access to the corresponding portion of said memory means.

28. An arrangement as set forth in claim 23, wherein said memory means comprises core memory and disk memory;

an unprepared key comprises a key that specifies the location in disk memory of the object corresponding to the key;

a prepared key comprises a key that specifies the location in core memory of the object corresponding to said key; and when an unprepared key is used by one of said domains to obtain access to an object, said kernel means either locates the corresponding object's location in core memory or moves said object into core memory, and replaces said unprepared key with a prepared key.

29. An arrangement as set forth in claim 28, wherein said core memory and said disk memory each has a plurality of page frames for holding pages of information, and node frames for holding nodes;

each page frame and each node frame on disk has a corresponding unique disk address (CDA);

each page in core memory has a corresponding page frame on disk memory;

each node in core memory has a corresponding node frame on disk memory;

each key on disk memory, which corresponds to a node or page, and each key in core memory, which corresponds to a node or page not in core memory, is unprepared; and said kernel means includes means for preparing an unprepared key when said unprepared key is used;

said kernel means includes means for calculating the location of a node or page in core memory corresponding to an unprepared key; and a prepared key can remain prepared so long as both the key and the corresponding node or page remain in core memory;

whereby the location of an object in core memory corresponding to a key need not be recomputed once a key for said object is prepared until and unless said key is unprepared.

30. An arrangement as set forth in claim 29, wherein said kernel means includes means for destroying all prepared keys corresponding to an object when said object is deleted;

each page frame and node frame on disk has a corresponding allocation count parameter (ALC);

each said ALC is incremented when the corresponding object is deleted if any keys to said deleted object were ever unprepared; and said kernel means includes means for destroying unprepared keys corresponding to deleted objects, including means for determining when an unprepared key corresponds to a deleted object by comparing the ALC of said key with the ALC of the disk page or node frame at the disk address specified by said key's CDA;

whereby keys to deleted objects convey no authority.

31. In a capability based computer system,
first means serving as a factory for accepting a specific software program and using that program to process data; and
second means serving as a requestor for providing data to said factory and requesting that said data be processed in accord with said software program;
wherein said first and second means cooperate with one another such that the requestor can determine in advance, without inspection of said software program, that the data being processed and the processed data will be made available only to said requestor and such that said software program is not available to said requestor.

32. In a computer system having at least one central processing unit, memory means and a multiplicity of domains for performing predefined processes,
a plurality of first domains for running corresponding predefined software programs; and
a plurality of segment keeper domains for running a corresponding specific software program when one of said first domains suffers a memory fault;
wherein
said memory means includes a multiplicity of memory segments;
a multiplicity of said memory segments include means for specifying the segment keeper domain to be used upon the occurrence of a memory fault in said memory segment.

33. In a capability based computer system having a first means serving as a factory and second means serving as a requestor, a method comprising the steps of:
(a) verifying that said first means is capable of sending either data or processed data only to the provider of said data;
(b) accepting data from said requestor for processing by said first means in accord with a specific software program;
(c) processing said data; and
(d) returning the processed data to said requestor;
wherein said step (a) is performed without inspection of said specific software program.

34. In a computer system having at least one central processing unit, memory means, a kernel, a plurality of domains, each domain comprising at least one node, each node providing slots for a plurality for keys, each key providing a token of authority to use a specified portion of said system's resources;
a method of securing the integrity of the data and the processes therein, the steps of the method comprising:
(a) filtering all uses of keys through said kernel, said kernel having the exclusive means for creating said keys and the exclusive means for resolving the authority conveyed by each said key, whereby domains can only indirectly manipulate and obtain keys through the invocation of said kernel functions;
(b) responding to the invocation by a (builder) domain of a first (factory creator entry) key by creating a factory and returning to the builder a builder's key;
(c) responding to the invocation by a builder of a builder's key corresponding to a specified factory, using a predefined parameter value, by installing in said factory a specified key as a specified component of said factory;
(d) responding to the invocation by a builder of a builder's key corresponding to a specified factory, using a predefined parameter value, by sealing said factory, thereby preventing the installation of any additional non-sensory keys in said factory;
(e) responding to the invocation by a (requestor) domain of a second (requestor's) key corresponding to a specified factory, using a first parameter value, by producing a predefined factory product, said factory product comprising a domain or a predefined memory structure having access to at least certain ones of the components installed in said factory; and
(f) responding to the invocation by a requestor of a requestor's key corresponding to a specified factory, using a second parameter value, by determining whether a specified factory has the ability to invoke, directly or indirectly, any non-sensory keys which are not included in a first predefined set, and returning to the requestor a parameter indicative of whether said factory has any such non-sensory keys.

35. A method as set forth in claim 34, wherein
said step (c) includes the step of installing a key defining a program component;
said step (e) includes the steps of
(e,1) creating a new (factory product) domain;
(e,2) defining the program component of said factory product and the starting address of said program component, said factory product's program component corresponding to the program component installed in the corresponding factory;
(e,3) providing access to certain predefined ones of the components installed in said factory; and
(e,4) starting the program in said factory product at said starting address;
whereby said program can modify the structure of said factory product and return a key to the modified factory product to said requestor.

36. A method as set forth in claim 35, wherein
said step (f) includes the step of comparing the set non-sensory components installed in a first (reference) factory with the set of non-sensory components installed in a second factory.

37. In a capability based data processing system having at least one central processing unit and memory means, said memory means including
a multiplicity of memory segments; and
means for holding a multiplicity of keys, each said key providing authority to its holder to use a specified portion of said system's resources;
an arrangement comprising:
a plurality of domains for performing predefined processes, each including means for holding a plurality of keys; and
kernel means coupled to said domains for providing said domains with a predefined set of kernel functions, said kernel means having the exclusive means for creating keys and the exclusive means for resolving the authority conveyed by each said key;
wherein
a plurality of said domains comprise factories for creating factory products comprising new domains for performing specified tasks;

a multiplicity of said keys are non-sensory keys, which convey the authority to directly or indirectly cause data to be transmitted to, or changed within, a domain other than the domain invoking said key;

a multiplicity of said keys are sensory keys, which convey the authority to directly or indirectly, sense or copy, data values or keys within specified objects in said system;

said arrangement includes factory setup means for a builder domain to install a software program and keys in a specified factory and to thereafter retain no keys which would provide access to the factory products produced by said specified factory; and predefined ones of said kernel functions allow a requestor domain with a key to a specified one of said factories to determine whether said specified factory has any non-sensory keys not included in a first predefined set of keys;

whereby a requestor domain can determine if use of a specified factory could compromise the confidentiality of data provided by said requestor domain to said factory.

38. In a computer system having a multiplicity of domains for running specific software programs and memory means including a multiplicity of memory segments, a method comprising the steps of:

(a) defining for each of a multiplicity of said memory segments a segment keeper domain, including a predefined memory fault resolution software program, for resolving memory faults occurring in said memory segment;

(b) running in each of a plurality of said domains a process in accord with a corresponding specific software program;

(c) upon the occurrence of a memory fault in any of said plurality of domains during the operation of said running step, transferring the process from the domain in which said memory fault occurred to the segment keeper domain corresponding to the memory segment in which said memory fault occurred for running in accord with the memory fault resolution software program therein;

whereby said memory fault can be resolved and the process returned to the domain in which said memory fault occurred; and the method of memory fault resolution can differ in accordance with the memory segment in which the memory fault occurs.

39. In a computer system having at least one central processing unit, a multiplicity of domains for performing predefined processes, and memory means including a multiplicity of memory segments, a method comprising the steps of:

running a process in accord with predefined software programs in each of a plurality of first domains; and upon the occurrence of a memory fault in one of said first domains, transferring said process to another of said multiplicity of domains, selected in accord with the memory segment in which the memory fault occurred, for running a corresponding specific software program;

whereby said memory fault can be resolved and the process returned to the domain in which said memory fault occurred; and the method of memory fault resolution can differ in accordance with the memory segment in which the memory fault occurs.

* * * * *